US009607278B2

(12) United States Patent
Zaveri

(10) Patent No.: US 9,607,278 B2
(45) Date of Patent: Mar. 28, 2017

(54) SYSTEMS AND METHODS FOR SUPPORTING SOCIAL PRODUCTIVITY USING RELEVANCY SCORING

(71) Applicant: CloudOn Ltd, Herzliya (IL)

(72) Inventor: Jay Zaveri, Campbell, CA (US)

(73) Assignee: CLOUDON LTD., Herzliya (IL)

( * ) Notice: Subject to any disclaimer, the term of this patent is extended or adjusted under 35 U.S.C. 154(b) by 0 days.

(21) Appl. No.: 14/788,383

(22) Filed: Jun. 30, 2015

(65) Prior Publication Data

US 2015/0302338 A1    Oct. 22, 2015

Related U.S. Application Data

(63) Continuation-in-part of application No. 14/185,571, filed on Feb. 20, 2014, now Pat. No. 9,253,130, and
(Continued)

(51) Int. Cl.
*G06F 15/16* (2006.01)
*G06Q 10/06* (2012.01)
(Continued)

(52) U.S. Cl.
CPC ..... *G06Q 10/06393* (2013.01); *G06Q 10/101* (2013.01); *G06Q 50/01* (2013.01);
(Continued)

(58) Field of Classification Search
CPC . G06F 17/30165; H04L 51/32; H04L 51/046; H04L 67/22; H04L 12/1895; G06Q 10/101; G06Q 50/01
(Continued)

(56) References Cited

U.S. PATENT DOCUMENTS 8,938,669 B1    1/2015 Cohen
9,208,153 B1 * 12/2015 Zaveri ............... G06F 17/30011
(Continued)

FOREIGN PATENT DOCUMENTS

GB    2451057    1/2009
WO    2006127660    11/2006

OTHER PUBLICATIONS

International Application No. PCT/US2014/036857, International Search Report and Written Opinion mailed Sep. 19, 2014.

*Primary Examiner* — James Conaway
(74) *Attorney, Agent, or Firm* — Stephanie Wang; Page Ponsford; DLA Piper LLP US

(57) ABSTRACT

A system comprises a workspace associated with content objects and users, the workspace enabling actors to perform operations on the objects; a data capture module configured to capture scoring factors associated with operations performed, the scoring factors including a number of times a target user has performed operations on the objects, the target user being possibly interested in receiving a notification about the operations performed; a relevance scoring module configured to evaluate the scoring factors associated with the operations performed to generate a relevance score associated with the target user and associated with the operations performed; and a notification module configured to provide a notification to the target user upon satisfaction of a notification threshold condition, satisfaction of the notification threshold condition based on identification of particular operations performed that satisfy relevance threshold conditions, satisfaction of the relevance threshold conditions based on the relevance score associated with the operations performed.

20 Claims, 33 Drawing Sheets

Related U.S. Application Data a continuation-in-part of application No. 14/185,592, filed on Feb. 20, 2014, and a continuation-in-part of application No. 14/187,141, filed on Feb. 21, 2014.

(60) Provisional application No. 61/834,381, filed on Jun. 12, 2013, provisional application No. 61/843,920, filed on Jul. 9, 2013, provisional application No. 61/881,398, filed on Sep. 23, 2013.

(51) Int. Cl.
*G06Q 50/00* (2012.01)
*G06Q 10/10* (2012.01)
*H04L 12/58* (2006.01)
*H04L 29/08* (2006.01)
*H04L 12/18* (2006.01)
*G06F 17/30* (2006.01)

(52) U.S. Cl.
CPC ............ *H04L 51/046* (2013.01); *H04L 51/32* (2013.01); *H04L 67/22* (2013.01); *G06F 17/30165* (2013.01); *H04L 12/1895* (2013.01)

(58) Field of Classification Search
USPC ........................................................ 709/206
See application file for complete search history.

(56) References Cited

U.S. PATENT DOCUMENTS

| | | | |
|---|---|---|---|
| 9,374,326 B2 * | 6/2016 | Barton | H04L 51/00 |
| 2003/0167443 A1 * | 9/2003 | Meunier | G06F 17/30899 |
| | | | 715/255 |
| 2004/0002972 A1 * | 1/2004 | Pather | G06F 9/542 |
| 2004/0010808 A1 * | 1/2004 | deCarmo | H04L 51/04 |
| | | | 725/139 |
| 2006/0101321 A1 | 5/2006 | Friedrichowitz et al. | |
| 2006/0242581 A1 | 10/2006 | Manion et al. | |
| 2007/0179945 A1 * | 8/2007 | Marston | G06Q 10/107 |
| 2008/0059539 A1 | 3/2008 | Chin et al. | |
| 2008/0301228 A1 * | 12/2008 | Flavin | G06Q 10/10 |
| | | | 709/204 |
| 2009/0006948 A1 | 1/2009 | Parker et al. | |
| 2010/0017701 A1 | 1/2010 | Bargeron et al. | |
| 2010/0037172 A1 | 2/2010 | Griffith et al. | |
| 2010/0070607 A1 * | 3/2010 | Khan | G06Q 30/02 |
| | | | 709/217 |
| 2011/0029521 A1 * | 2/2011 | Thayne | G06F 17/30943 |
| | | | 707/737 |
| 2011/0035323 A1 | 2/2011 | Hamilton et al. | |
| 2011/0047484 A1 | 2/2011 | Mount et al. | |
| 2011/0161425 A1 * | 6/2011 | Xiao | G06F 17/30368 |
| | | | 709/206 |
| 2011/0209052 A1 | 8/2011 | Parker et al. | |
| 2012/0110080 A1 * | 5/2012 | Panyam | G06Q 50/01 |
| | | | 709/204 |
| 2012/0143917 A1 | 6/2012 | Prabaker et al. | |
| 2012/0166452 A1 * | 6/2012 | Tseng | G06F 17/30867 |
| | | | 707/749 |
| 2012/0192055 A1 | 7/2012 | Antebi et al. | |
| 2012/0192086 A1 | 7/2012 | Ghods et al. | |
| 2012/0240061 A1 | 9/2012 | Hillenius et al. | |
| 2012/0278401 A1 | 11/2012 | Meisels et al. | |
| 2012/0284344 A1 | 11/2012 | Costenaro et al. | |
| 2012/0296971 A1 | 11/2012 | Brown | |
| 2013/0080912 A1 | 3/2013 | Job et al. | |
| 2013/0139048 A1 * | 5/2013 | Dhawan | G06Q 30/0278 |
| | | | 715/234 |
| 2013/0218845 A1 | 8/2013 | Kleppner et al. | |
| 2013/0254658 A1 | 9/2013 | Nestler et al. | |
| 2013/0268849 A1 * | 10/2013 | Du | G06Q 10/10 |
| | | | 715/255 |
| 2014/0059141 A1 * | 2/2014 | Belkin | H04L 51/12 |
| | | | 709/206 |
| 2014/0067828 A1 * | 3/2014 | Archibong | H04L 65/4084 |
| | | | 707/748 |
| 2014/0082610 A1 | 3/2014 | Wang et al. | |
| 2014/0250058 A1 * | 9/2014 | Thiruvidan | G06F 17/30011 |
| | | | 707/608 |
| 2014/0281870 A1 | 9/2014 | Vogel et al. | |
| 2014/0289645 A1 * | 9/2014 | Megiddo | G06F 3/048 |
| | | | 715/753 |
| 2014/0365579 A1 * | 12/2014 | Thrasybule | H04L 67/26 |
| | | | 709/205 |
| 2015/0213082 A1 * | 7/2015 | Frankel | G06F 17/3053 |
| | | | 707/758 |
| 2015/0356449 A1 * | 12/2015 | Vainstein | G06N 5/047 |
| | | | 706/48 |

* cited by examiner

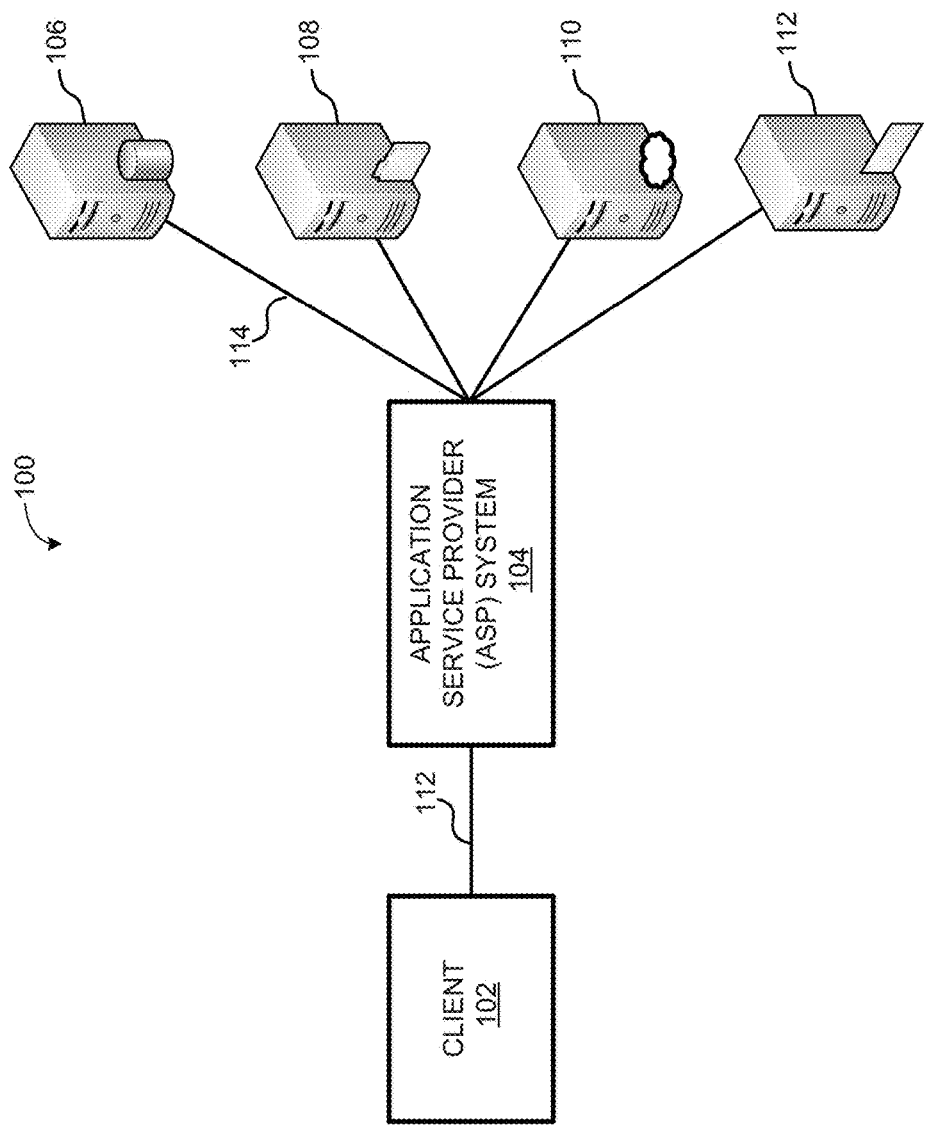

Target-to-Object Relationship and Time Distance Scoring

| Priority | Action | Score |
|---|---|---|
| 1 | Strength Score + Recency* | |
| 2 | You interacted with the Specific Object Recently | |
| 3 | You have created or were the last person to modify the object | |
| 4 | You own the object or its parent object (file, folder or account) | |

*Recency is a curated number to begin with, then is machine learned

FIG. 26

Target-to-Actor Relationship Scoring

| Priority | Description | Score |
|---|---|---|
| 1 | Direct contact or Strength Score | |
| 2 | Share docs or contacts | |
| 3 | Several degrees of separation | |

FIG. 27

SYSTEMS AND METHODS FOR SUPPORTING SOCIAL PRODUCTIVITY USING RELEVANCY SCORING

CROSS-REFERENCE TO RELATED APPLICATIONS

The present application is a continuation-in-part of U.S. patent application Ser. No. 14/185,571, filed on Feb. 20, 2014 and entitled "Systems and Methods for Supporting Social Productivity Using a Dashboard"; U.S. patent application Ser. No. 14/185,592, filed on Feb. 20, 2014 and entitled "Systems and Methods for Supporting Social Productivity Using Thresholding"; and U.S. patent application Ser. No. 14/187,141, filed on Feb. 21, 2014 and entitled "Systems and Methods for Supporting Social Productivity Using a History Buffer"; each of which claims the benefit of U.S. Provisional Patent Application Ser. No. 61/834,381, filed Jun. 12, 2013 and entitled "System and Method for Supporting and Tracking Social Productivity"; U.S. Provisional Patent Application Ser. No. 61/843,920, filed Jul. 9, 2013 and entitled "Systems and Methods for Supporting Social Productivity"; and U.S. Provisional Patent Application Ser. No. 61/881,398, filed Sep. 23, 2013 and entitled "Systems and Methods for Supporting Social Productivity", all of which are hereby incorporated by reference herein.

BACKGROUND

1. Technical Field

The present invention(s) generally relate to server-based computing and, more particularly, relate to providing remote clients with collaborative features, such as a workspace, that support social productivity.

2. Description of Related Art

In a server-based computing environment, hardware upgrades, application deployment, technical support, and/or data storage can be provided by one or more terminal application servers. As such, use of server-based computing to support multiple clients can reduce application costs and ensure that applications are accessible by some or all of the supported clients. Server-based computing also provides enhanced security and eliminates the need for patch through software upgrades to a plurality of different clients. Traditionally, server-based computing has been implemented by way of remote desktop computing or remote application computing.

With remote desktop computing, one or more terminal application servers provide one or more clients with access to a plurality of software applications, and manage data transfers to each client through a separate data communication line. Generally, users access the terminal server through their end user devices (also known as "clients" or "client devices") by authenticating into a network with a username and password, with an access card, based on biometric information, or by any other authentication method. Upon establishing a remote desktop computing session, each client serves as a remote desktop display capable of displaying applications which are provided by the terminal application server. The remote desktop is created by and handled within the terminal application server based on applications installed on the terminal application server. The clients also allow users to input data through a mouse, keyboard, or the like, such that the users can interact with the application provided by the terminal application server.

Unfortunately, traditional remote desktop computing is limited by the inability of the terminal server to provide access to disparate operating systems (e.g., a traditional terminal server configured to provide Microsoft® Windows® operating system is not capable of providing Apple® OS X®-operating system), thereby requiring a user of remote desktop computing to interface with different terminal servers for access to different operating systems. Traditional remote desktop computing is also limited by the inability of the terminal server to provide the operating system with embedded access to a third-party, cloud-based storage (e.g., those provided by Dropbox, Box, or Google® Docs).

Additionally, traditional remote desktop computing is limited in features that enable teams of two or more users to collaboratively work on documents and other files, thereby hindering social-based productivity with respect to those documents and files. Various forms of communication, hardware, and software fragmentation often exist among users who work remotely, and such fragmentation often hampers the collaborative efforts of those users.

To illustrate, where a team of users is working collaboratively on one or more documents, associated conversations between users is often fragmented as a result of team users using different means of communication to facilitate such conversations (e.g., e-mail or chat) or team users not including all team users in conversations (e.g., an e-mail thread relating to the collaboration includes some but not all of the team users). In another example, when individual team users utilize different devices, software, or software services (e.g., one team user utilizes Google® Docs and another utilizes Microsoft® Word) during collaboratively efforts, such fragmentation can lead to document compatibility or document access issues. In addition, the fragmentation of communication, software, and hardware often results in useful information (e.g., metadata) generated during collaborative efforts to go un-captured or to go unnoticed by other team users.

SUMMARY

Various systems and methods described herein relate to server-based computing and, more particularly, providing remote clients with collaborative features that support social productivity. Social productivity can include creating, reviewing, and sharing documents (or other types of data content objects) with a team of users working collaboratively on those documents. Various systems and methods can support social productivity by capturing, maintaining, and/or providing a history of comments, changes, communication, and other events with respect to various types of data content objects being collaboratively accessed (e.g., worked upon) by groups of users. The systems and methods can use the history to provide the group of users with various forms of context regarding changes and other events in relation to a given data content object being collaboratively accessed. Additionally, based on the history, various systems and methods can create and present an activity stream for the given data content object, thereby providing for intelligent presentation of context regarding the given data content object as the given data content object is are being collaboratively accessed (e.g., collaboratively edited by a team of users).

According to some embodiments, systems and methods can detect an event that occurred with respect to a data content object (e.g., by receiving indication of the event occurring) as a result of an action (e.g., verb) performed on the data content object at a request of a first user (e.g., actor). Subsequently, the systems and methods can capture contextual information relating to the event in a history buffer. Thereafter, the systems and methods can provide a reference based on the contextual information, where the reference enables a second user to traverse to a location in the data content object relating to the event. Examples of events can include changes implemented to content of the data content object, a user commenting regarding the data content object, a user reading content of the data content object, a user creating the data content object, a user saving the data content object, a user sharing the data content object with another user, and communicating in connection with a data content object. As used herein, comments can include text, audio, or video based comments, which can be associated with a data content object. The contextual information can include metadata relating to, and possibly generated during, the event. For example, where the event is a change implemented to the data content object, the metadata may relate to the change implemented.

In some embodiments, the systems and methods can present the second user with the reference in connection with notifying the second user regarding the event. Additionally, in some embodiments, the second user can access the reference once presented.

In various embodiments, the systems and methods can present at least some of the contextual information in an activity stream describing one or more events relating to the data content object. The systems and methods can receive a request from the second user to traverse the reference to the location in the data content object relating to the event. In response to the request from the second user, the systems and methods can instruct an application (e.g., application capable of processing a data-content-object) to traverse to the location corresponding to the reference. The application may be a virtualized application instance executing in a virtual computing environment.

As used herein, "data content object" can refer to a file or can refer to an object relating to a user, a group of users, a tag configured to associate with another data content object, or a project. In some embodiments, the data content object can be a document file, such a word processing file, a spreadsheet file, a presentation file, or a post-script document file. Additionally, in some embodiments, the data content object can be an electronic communication, such as an e-mail, a text-based message, multimedia message, or an instant chat message. In addition, in some embodiments, the data content object can be a file or other data structure that can include content relating to a profile, where the profile is associated with a person (e.g., user) or a group of people (e.g., group of users). In various embodiments, a data content object can include content relating to a project and can be configured to facilitate management of a project. Management of a project can include management of data content objects in connection with the project, such as collecting or otherwise associating one or more data content objects with a project. Another example of managing a project can include associating one or more users with a project and controlling access to a data content object associated with a project. Further, in some embodiments, the data content object can be a tag configured to be associated with another data content object. As user herein, a "tag" can be one or more keywords that describe the data content object to which it is associated. Examples of tags can include user-defined tags and hash tags, which may be compatible with one or more social networking-based services (e.g., Facebook®, Twitter®, etc.). Those skilled in the art will appreciate that data content object can include types of data objects other than those listed or described herein.

As used herein, a "space" is an environment configured to provide access to content of a data content object while providing contextual information relating to the data content object. The environment of a space may be further configured to organize or exchange data content. For some embodiments, the configuration of a space can vary based on the type of data content object being augmented. For example, each type of data content object can have an associated space (e.g., a "file space" augments file objects accessed therethrough, "people space" augments people objects accessed therethrough, "group space" augments group objects accessed therethrough, "project space" augments project objects accessed therethrough, and "tag space" augments tag objects accessed therethrough). Depending on the embodiment, a space may include a graphical user interface (GUI) that facilitates user interaction with the space. Additionally, for some embodiments, when a space is focused on (e.g., accessing) a data content object of a particular type (e.g., people object), a space (e.g., file space) associated with a different type if data content object (e.g., file type) can be used to provide access to content of the data content object while providing contextual information relating to the data content object but as it relates to the different type (e.g., from the perspective of the type of data content object to which the space relates).

For example, where a file space is being used to access a specific people object, the file space may provide contextual information relating to the specific people object but as it relates to file objects. In this example, such contextual information provided by the file space may include providing a listing of file objects associated with the specific people object, or a listing of changes to file objects performed by the person associated with the specific people object. In another example, where a people space is being used to access a specific project object, the people space may provide contextual information relating to the specific project object but as it relates to people objects. In this second example, the contextual information provided by the people space may include a listing of the people objects associated with the specific project object, or a listing of changes to objects associated with the specific project object according to the people objects relating to such changes. Those skilled in the art will appreciate other combination of spaces and data-content-object types are possible.

For example, a file space may capture content and information changes by one or more people on a data content object that is a file. In another example, a people space may capture content and information changes with a given user. In another example, a project space may capture content and information changes by groups of people on groups of file associated with a data content object that is a project.

As used herein, a "workspace" can refer to a general space (e.g., system or user-created) that can hold spaces relating to data content objects of one or more different types (e.g., file space, people space, group space, etc.), and that can agnostically augment different types of data content objects accessed through the workspace. Workspaces can be associated with one or more users (e.g., through workspace sharing), and can be associated such that the users can have varying levels of access to data content objects accessible through the workspace. When accessing a workspace, a user can choose to access a data content object associated with the workspace, and the workspace may augment such access with contextual information historically gathered in relation to the data content object. A workspace can include a dashboard configured to assist users in productively navigating issues and items of relevance regarding data content objects access through the workspace, for example to create, present, publish or share content in data content objects (e.g., documents, spreadsheets and presentations).

For various embodiments, a user can choose to access one or more data content objects through the perspective of spaces associated with different types of data content objects (e.g., file space, people space, group space, project space, tag space, etc.), and can choose to pivot between spaces according to the type of data content object being accessed. Additionally, a user can choose to access a collection of different types of data content objects through the perspective of a single workspace, and can choose to pivot from a workspace to a specific space by selecting a data content object associated with the space (e.g., selecting a data content object having a type associated with the space). The user can also choose to pivot from a specific space to a workspace.

Through the context-related features, spaces, such as workspaces, can facilitate collaborative efforts, by two or more users, with respect to a data content object.

In some embodiments, the context (also referred to herein as "contextual information") relating to a data content object can include an event occurring in relation to the data content object, such as a temporal-oriented, location-oriented, or relationship-oriented change for the data content object. For example, an event can include an operation relating to accessing content of the data content object or a change that results in content of the data content object. Examples of accessing can include a user reading, creating, modifying, removing, inserting, and moving content of the data content object. For instance, where the data content object is a word processing file, accessing content of the data content object can include opening and reading the word processing file and reading a section of the opened word processing file. Other examples of events can include creating a data content object and removing a data content object. Examples of events can also include a user uploading a data content object (e.g., from client computing device to a cloud storage service and in connection with a workspace), a user downloading a data content object (e.g., from a cloud storage service to a client computing device and in connection with a workspace), a user sharing a data content object with another user (e.g., sharing access to some or all of the content of data content object with another), and associating or disassociating a data content object with respect to a tag, a project, or a workspace.

Where a plurality of events have occurred in relation to a data content object, the events can be generally referred to as "activity" of the data content object, which can be provided or visually presented through a space as an activity stream or thread in connection the data content object. For some embodiments, such an activity stream or thread can be presented as context by a space (e.g., workspace) used to access the data content object.

According to some embodiments, systems and methods can detect a first event that occurred with respect to a first data content object as a result of an action performed on the data content object at a request of a first user. Subsequently, the systems and methods can determine whether an attribute of the first event satisfies a criterion. Thereafter, the systems and methods provide a first card relating to the event if the attribute is determined to satisfy the criterion (e.g., meet or exceed a threshold condition), where the first card is configured to be presented to a second user.

As used herein, a "card" and "event card" can refer to a unit of summarized information regarding an event in association with a data content object. Depending on the embodiment, an event card may be presented according to a bounded window of continuous activity relating to the data content object. The window can be bounded by time, date, relevance to the percipient user (i.e., user perceiving the event card), or the type of data content object. The window can be bounded by one or more criteria defined by the second user perceiving the event card.

In some embodiments, the systems and methods can present the first card to the second user, where the first card can be presented in a dashboard configured to present a second card relating to a second event. The second event may relate to a second data content object. The first card can comprise a secondary action configured to perform an operation with respect to the first card at a request of the second user. Examples of the secondary actions can include: entering a comment in association with the first card; sharing the first card with another user, deferring presentation of the first card, and assigning a task associated with the event to another user (e.g., delegating).

In various embodiments, the systems and methods can determine the criterion based on the second user. The criterion can define a frequency of presentation of cards relating to the event, a restriction for presenting cards based on event type, or an allowance for presenting cards based on event type. The criterion can be defined by the second user. Additionally, the criterion can be utilized to define relevancy of events to the second user.

According to some embodiments, systems and methods can associate a data content object with a workspace. Subsequently, the systems and methods can detect an event that occurred with respect to the data content object as a result of an action performed on the data content object at a request of a first user associated with the workspace. Thereafter, the systems and methods can inform a second user of the event, where the second user is associated with the workspace. Depending on the embodiment, the systems and methods can involve creating the data content object, or creating the workspace.

In some embodiments, the systems and methods can share the workspace with the second user at the request of the first user. Additionally, in some embodiments, the systems and methods can share at least a portion of content in the data content object with another user at the request of the first user.

In various embodiments, the systems and methods can delegate, at the request of the first user, a task to another user in association with at least a portion of content in the data content object. The systems and methods can receive a response to the task from the other user. The systems and methods can to integrate the response into the portion of content. The systems and methods can to inform the first user of the response.

In some embodiments, the systems and methods can provide a client computing device with access to an application executing remotely from the client computing device (hereafter also referred to as "application access"), and providing application access in conjunction with supporting social productivity features as described herein. As described herein, social productivity features can include providing context for content (hereafter also referred to as "content context") of data content objects being accessed by the application executing remotely from the client computing device. The application may be remotely executed and provided such that the application accessed by a user has native access to a cloud-based storage, and data content objects (e.g., files) residing on the cloud-based storage. As used herein, a "data-content-object processing application"

can refer to any application capable of processing or otherwise accessing a data content object.

According to some embodiments, systems and methods can determine events, performed on a first data content object, by a first user using a data-content-object processing application. The determination may be based on information provided by the data-content-object processing application. The systems and methods can store event indications identifying the events in a history buffer. Subsequently, the systems and methods can select one or more particular event indications from the history buffer, where the one or more particular event indications identify one or more particular events. Additionally, the systems and methods can determine one or more other users authorized and designated to receive a notification about the one or more particular events. Further, the systems and methods can determine whether the one or more particular event indications satisfy a one or more criteria (e.g., threshold condition) permitting notification. Eventually, the systems and methods can generate a data-content-object event notification to the one or more other users. The data-content-object event notification generated may identify the one or more particular events performed on the first data content object.

As described herein, the history buffer may be dedicated to the first data content object. Additionally, the first data content object and a second data content object may belong to a workspace object, and the history buffer is dedicated to the workspace object. The first data content object may, for example, comprises a file or an object relating to a user, a group of users, a tag configured to associate with another data content object, or a project. The events may include, for example: reading, creating, modifying, removing, inserting, or moving content of the first data content object; creating, removing, uploading, downloading or sharing the first data content object; and associating or disassociating the data content object to a workspace or a tag. The event indications may, for example, include user information, date information, time information, or location information. The data-content-object event notification may provide a summary of changes performed on the first data content object. The data-content-object processing application may be a virtualized application instance executing in a virtual computing environment.

In some embodiments, the step of determining one or more other users authorized and designated to receive a notification, about the one or more particular events, may occur only after determining that the one or more particular event indications satisfies the threshold condition permitting notification. Additionally, in some embodiments, the step of generating a data-content-object event notification to the one or more other users may occur only after determining that the one or more particular event indications satisfies the threshold condition permitting notification. Each of the one or more other users may set a respective threshold condition. The threshold condition may be one based on, for example, a notification frequency, event type, an amount of detail requested, and/or the first data content object itself.

According to some embodiments, the systems and methods can await receipt of one or more data-content-object share indications that indicate that one or more data content objects has been shared by a user at a second client device with a user of the first client device. The one or more data content objects may be stored in one or more data stores. In response to receiving a particular data-content-object share indication that a particular data content object has been shared, the systems and methods may generate a particular share notification. The systems and methods can further await receipt of one or more data-content-object edit indications that identify one or more edits to the particular data content object. In response to receiving a particular data-content-object edit indication that identifies one or more particular edits to the particular data content object, the systems and methods may generate a particular edit notification. The systems and methods can also await receipt of one or more task indications that request the user of the first client device to perform one or more tasks. In response to receiving a particular task indication, the systems and methods may generate a particular task notification. Additionally, the systems and methods can also await receipt of one or more message indications that include one or more messages from the second user at the second client device. In response to receiving a particular message indication, the systems and methods can generate a particular message notification.

Eventually, the systems and methods may present a dashboard on the first client device. The dashboard may provide a portal to the particular data content object. The dashboard may, for example, include a first section for displaying share notifications including the particular share notification, a second section different that the first section for displaying edit notifications including the particular edit notification, a third section different than the other sections (e.g., first and second sections) for displaying task notifications including the particular task notification, and/or a fourth section different than the other sections (e.g., first and second sections) for displaying message notifications including the particular message notification. The dashboard may also include a count section, the count section being for displaying a count of the number of notifications in each section. Depending on the embodiment, the dashboard may present the notifications using cards, with each card reporting at least one notification. Each dashboard may enable filtering the notifications according to one or more conditions.

In some embodiments, the one or more data stores may include cloud storage. Additionally, the one or more edits to the particular data content object may be those performed by the user at the second client device. The dashboard may provide a link to the particular data content object.

As stated above, various embodiments monitor operations of users (actors) on one or more data content objects to determine whether the operations are relevant to other users (targets) and whether the relevant operations meet certain notification threshold conditions for notifying the targets of the relevant operations. In some embodiments, the notification system obtains a notification threshold condition for a particular target and monitors the operations of actors on data content objects to determine relevance of each operation to the target and to determine whether one or more relevant operations meet the notification threshold condition. If so, the notification system notifies the target.

In some embodiments, operations on a data content object may include authoring actions such as reading, saving, deleting/erasing, editing, creating, publishing, unpublishing etc., social actions such as liking, sending/sharing, adding/removing, following/unfollowing, etc., organizational actions such as tagging, deferring, reminding, searching, trashing, etc., and/or workflow actions such as rejecting/declining/accepting/approving, assigning, reviewing/signing, commenting, resolving, @mentioning, taking/giving ownership, etc. Other operations on a data object are also possible.

The notification system evaluates scoring factors associated with each operation to generate a relevance score for a target. In some embodiments, the notification system may evaluate scoring factors for only certain types of operations, such as authoring operations involved in collaborative editing of a data content object (e.g., deleting, modifying, adding, etc.) and not organizational, social and/or workflow operations as described above. Scoring factors may include the identity of the data content object being interacted with, the actor performing the operation, the subsection/subpart of the data content object being interacted with, the number of operations with the data content object, the relationship between the actor and the target, the particular workflow to which the data content object belongs, the organization (enterprise) to which the data content object belongs, etc. Example subsections/subparts of a parent data content object may include a page, slide, sheet, paragraph, line, word, table, row, column, cell, header, footer, equation, formula, chart, shape, list, table of contents, link, synthetic content objects, and/or the like. The term "data content object" herein is used to include subsections/subparts of an parent data content object. In other words, a data content object may be a table within a document, a slide within a presentation, a paragraph within a document, an image within a video, etc.

Various relevance scoring techniques may be used to determine whether one or more operations merit generating a notification for a target.

In some embodiments, a system comprises a workspace associated with one or more data content objects and at least two users, the one or more data content objects being stored in data storage, the workspace enabling one or more acting users of the at least two users to use one or more data editors to perform one or more operations on the one or more data content objects; a data capture module configured to capture scoring factors associated with one or more operations performed by the one or more acting users on the one or more data content objects, at least one of the scoring factors including a number of times a target user has previously performed operations on the one or more data content objects, the target user being possibly interested in receiving a notification about the one or more operations performed by the one or more acting users; a relevance scoring module configured to evaluate the scoring factors associated with the one or more operations performed by the one or more acting users to generate a relevance score associated with the target user and associated with the one or more operations performed by the one or more acting users; and a notification module configured to provide a notification to the target user upon satisfaction of a notification threshold condition, satisfaction of the notification threshold condition being based on identification of one or more particular operations performed by the one or more acting users that satisfy one or more relevance threshold conditions, satisfaction of the one or more relevance threshold conditions being based on the relevance score associated with the one or more operations performed by the one or more acting users, the notification being about the one or more particular operations performed by the one or more acting users that satisfy the one or more relevance threshold conditions.

The data storage may include cloud storage. The text editors may include a cloud-based text editor. At least one of the one or more data content objects may be a subsection of a whole file. The subsection may be a table. The scoring factors may further include at least one of an amount of time that passed since the target user performed operations on the one or more data content objects, a number of persons that share the one or more data content objects, information associated with an interest of the target user, a level of contact between the target user and the one or more acting users, an importance value of the one or more acting users, or type information associated with the one or more operations performed by the one or more acting users. The relevance scoring engine may apply weights to each of the scoring factors. The system may further comprise a machine learning engine that monitors user feedback to modify the weights. The system may further comprise a machine learning engine that monitors user feedback to modify the scoring factors upon which the relevance score is generated. The data capture module may cooperate with the data storage to capture the scoring factors, with the text editors to capture the scoring factors, or with a history buffer that stores the scoring factors or information upon which the scoring factors may be generated.

In some embodiments, a method comprises enabling one or more acting users associated with a workspace to use one or more data editors to perform one or more operations on one or more data content objects associated with the workspace, the one or more data content objects being stored in data storage; capturing scoring factors associated with one or more operations performed by the one or more acting users on the one or more data content objects, at least one of the scoring factors including a number of times a target user has previously performed operations on the one or more data content objects, the target user being possibly interested in receiving a notification about the one or more operations performed by the one or more acting users; evaluating the scoring factors associated with the one or more operations performed by the one or more acting users to generate a relevance score associated with the one or more operations performed by the one or more acting users; determining whether one or more particular operations performed by the one or more acting users that satisfy one or more relevance threshold conditions, satisfaction of the one or more relevance threshold conditions being based on the relevance score associated with the one or more operations performed by the one or more acting users; determining whether a notification threshold condition has been satisfied based on the identification of one or more particular operations performed by the one or more acting users that satisfy one or more relevance threshold conditions; and providing a notification to the target user upon satisfaction of the notification threshold condition, the notification being about the one or more particular operations performed by the one or more acting users that satisfy the one or more relevance threshold conditions.

At least one of the one or more data content objects may be a subsection of a whole file. The scoring factors may further include at least one of an amount of time that passed since the target user performed operations on the one or more data content objects, a number of persons that share the one or more data content objects, information associated with an interest of the target user, a level of contact between the target user and the one or more acting users, an importance value of the one or more acting users, or type information associated with the one or more operations performed by the one or more acting users. The step of evaluating the scoring factors associated with the one or more operations performed by the one or more acting users to generate the relevance score may include applying weights to each of capturing scoring factors associated with one or more operations performed by the one or more acting users on the one or more data content objects may include cooperating with the data storage to capture the scoring factors. The step of capturing scoring factors associated with one or more operations performed by the one or more acting users on the one or more data content objects may include cooperating with the text editors to capture the scoring factors. The step of capturing scoring factors associated with one or more operations performed by the one or more acting users on the one or more data content objects may include cooperating with a history buffer that stores the scoring factors or information upon which the scoring factors may be generated.

In some embodiments, a computer-readable medium stores program code for causing a computer to perform the steps of enabling one or more acting users associated with a workspace to use one or more data editors to perform one or more operations on one or more data content objects associated with the workspace, the one or more data content objects being stored in data storage; capturing scoring factors associated with one or more operations performed by the one or more acting users on the one or more data content objects, at least one of the scoring factors including a number of times a target user has previously performed operations on the one or more data content objects, the target user being possibly interested in receiving a notification about the one or more operations performed by the one or more acting users; evaluating the scoring factors associated with the one or more operations performed by the one or more acting users to generate a relevance score associated with the one or more operations performed by the one or more acting users; determining whether one or more particular operations performed by the one or more acting users that satisfy one or more relevance threshold conditions, satisfaction of the one or more relevance threshold conditions being based on the relevance score associated with the one or more operations performed by the one or more acting users; determining whether a notification threshold condition has been satisfied based on the identification of one or more particular operations performed by the one or more acting users that satisfy one or more relevance threshold conditions; and providing a notification to the target user upon satisfaction of the notification threshold condition, the notification being about the one or more particular operations performed by the one or more acting users that satisfy the one or more relevance threshold conditions.

According to certain embodiments, a computer program product comprising computer instruction codes configured to cause the computer system to perform the operations described herein. Additionally, particular embodiments may be implemented using a digital device as described herein, such a computer system.

Other features and aspects of various embodiments will become apparent from the following detailed description, taken in conjunction with the accompanying drawings, which illustrate, by way of example, the features of such embodiments.

BRIEF DESCRIPTION OF THE DRAWINGS

Various embodiments are described in detail with reference to the following figures. The drawings are provided for purposes of illustration only and merely depict some embodiments. These drawings shall not be considered limiting of the breadth, scope, or applicability of embodiments.

FIG. 1 is a block diagram illustrating an example environment utilizing an example system for supporting social productivity in accordance with various embodiments.

FIG. 26 is a table showing example target-to-object relationship and time distance scoring in accordance with various embodiments.

FIG. 27 is a table showing example target-to-actor relationship scoring in accordance with various embodiments.

DETAILED DESCRIPTION

Figure 2A:
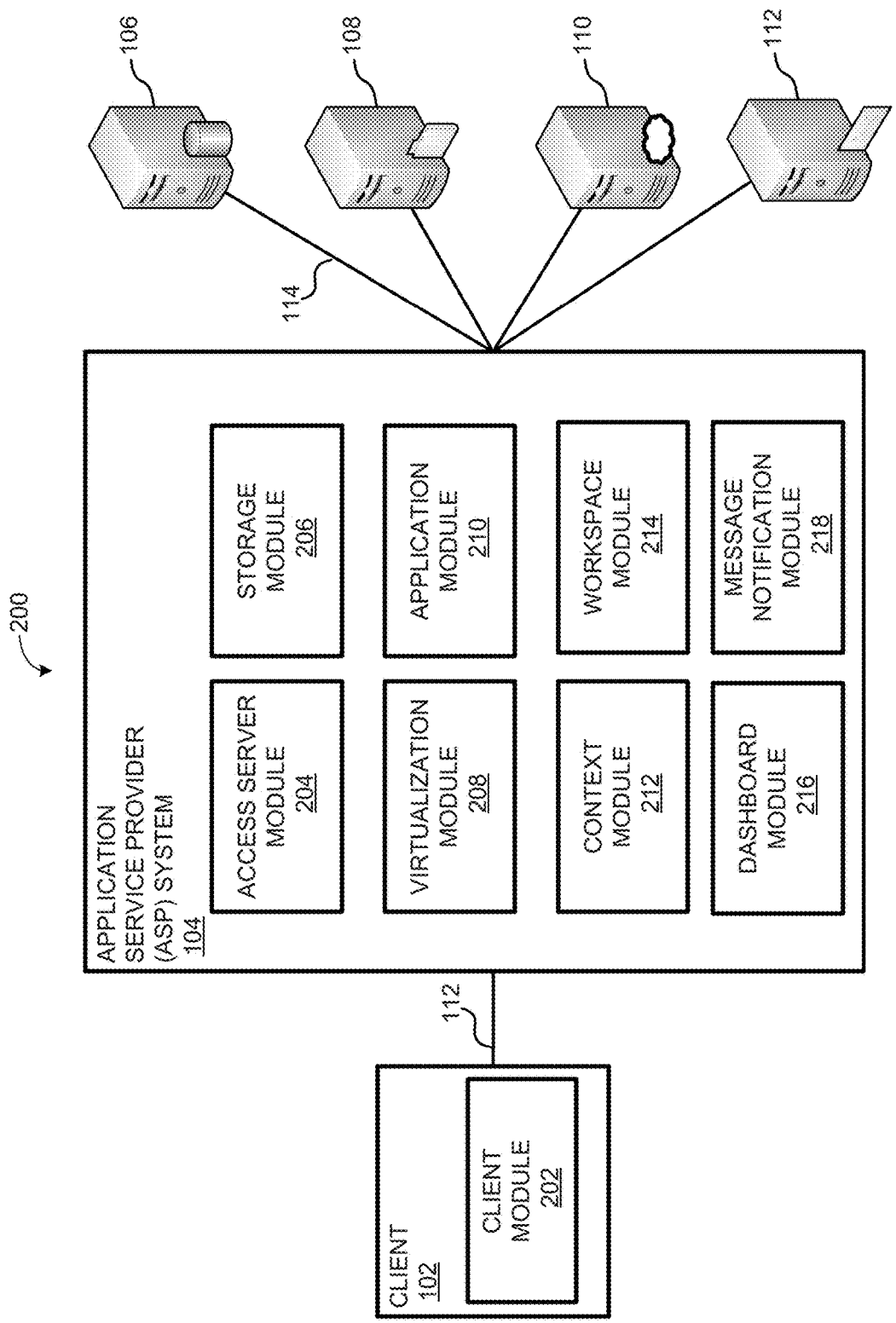
FIG. 2A is a block diagram illustrating an example environment utilizing an example system for supporting social productivity in accordance with various embodiments.

Various systems and methods described herein relate to server-based computing and, more particularly, providing remote clients with collaborative features that support social productivity. In particular, various embodiments provide for systems and methods that can provide social productivity platform that can create or modify documents and other types of data content objects using collaborative efforts, possibly where the efforts are received through a social networking service. The systems and methods can, for example, create, review and share documents, spreadsheets and presentations from any device, using any cloud storage provider. When teams of users are collaboratively working on a document or other file, various systems and methods can connect each of the team users to the document or file, and maintain a buffer of comments, changes, or other events. For some embodiments, the systems and methods can maintain a separate history buffer for every data content object, or a separate history buffer for a type of data content object.

In some embodiments, the systems and methods can enable a user to create, review, edit, or otherwise access content of data content objects (e.g., documents) and capture information regarding changes implemented during individual or group-based editing to the content. In doing so, various embodiments can capture contextual information that can be provided as a data content object is being accessed. In some embodiments, the contextual information can facilitate creation and presentation of an activity stream in connection with a data content object. Contextual information regarding a data content object can include metadata relating to an operation performed on content of the data content object. Operations can include: reading, writing, modifying, creating, removing, inserting, or moving content of the data content object; creating, removing, uploading, downloading of the data content object; sharing the data content object with another; and associating or disassociating the data content object with a workspace or another data content object (e.g., tag).

For various embodiments, the systems and methods can implement a centralized hub for data content object productivity, which may facilitate faster workflow and/or easier management of viewing and authoring data content object, particularly from a mobile digital device. For some embodiments, the systems and methods can be implemented as a layer between a client and a content authoring system configured to handle various data content objects. Additionally, in some embodiments, the systems and methods can be implemented to interact with, or be a part of, a social networking service.

The systems and methods can be configured to interact with various types of data content object, which include files, projects, people, tags, or location. As described herein, each type of data content object may be associated with a space configured to capture content and information changes with respect to a data content object of the type. For example, a file space may capture content and information changes by one or more people on a data content object that is a file. In another example, a people space may capture content and information changes with a given user. In another example, a project space may capture content and information changes by groups of people on groups of file associated with a data content object that is a project.

As described herein, a workspace may be a general space that can hold all other types of spaces (e.g., file space, people space, group space, etc.), that can be associated with one or more data content objects of one or more types, and that can agnostically augment different types of data content objects accessed through the workspace. Workspaces can be associated with one or more users (e.g., through workspace sharing), and can be associated such that the users can have varying levels of access to data content objects accessible through the workspace. A workspace can include a dashboard configured to assist users in productively navigating issues and items of relevance regarding data content objects access through the workspace, for example to create, present, publish or share content in data content objects (e.g., documents, spreadsheets and presentations). The relevance may be determined based on various factors, including the preferences of the user perceiving the dashboard (the percipient user) and the history of activity by the user perceiving the dashboard, and the like. The relevance and/or preferences for the user may be implemented by way of one or more criteria used by the dashboard when displaying event cards to the user.

In accordance with various embodiments, the systems and methods described herein provide a client computing device with access to an application executing remotely from the client computing device, and provide context for content of data content objects being accessed by the application executing remotely from the client computing device. The content context provided may be separate, distinct from, or in addition to any context provided by the application executing remotely from the computing device. In this way, various embodiments can agnostically provide contextual information regarding the access of data content objects regardless of the method of access data content objects.

According to some embodiments, the systems and methods provide a platform between the client computing device and an application server that is executing the application on behalf of the client computing device. In addition to providing the client computing device with access to the application remotely executing on the application server, the platform may maintain and provide contextual information regarding the application's access of a data content objects—contextual information that otherwise may not be maintained or provided by the application.

Additionally, the application may be accessing content of data content objects (e.g., one or more files) residing on a cloud-based storage (e.g., provided by a third-party cloud-based storage service). For some systems and methods, the application may be remotely executed and provided such that the application accessed by a user has native access to a cloud-based storage, and data content objects (e.g., files) residing on the cloud-based storage. In this way, various embodiments may provide a user on a client computing device with universal and agnostic access to applications that would otherwise be non-operable on the client computing device, and permit such applications with universal and/or agnostic access to cloud-based storage services that are otherwise disconnected from, disparate from, or incompatible with the accessed applications. Additionally, some embodiments may permit an original application, natively operating on the client computing device but incompatible with a particular data content object (e.g., an e-mail application operating on the client computing device attempting to open a spreadsheet file otherwise incompatible with e-mail application), to upload the data content object to a cloud-based storage service, and enable a remotely executed application, provided in accordance with the embodiments, compatible with the data content object, and capable of accessing the cloud-based storage service, to open the data content object on behalf of the original application.

Those skilled in the art will appreciate accessing a file, as understood herein, can include, for example, creating, deleting, viewing (e.g., opening), or modifying the file and any of content contained therein. Additionally, as understood herein, those skilled in the art will appreciate that accessing an application can include, for instance, starting, stopping, using, or otherwise controlling operation of the application, and may further include modifying the availability of the application (e.g., adding or deleting availability of the application). Any mention of a cloud-based service (e.g., storage, application) within this description will be understood to include, without limitation, services provided by private clouds, public clouds, and hybrid clouds.

FIG. 1 is a block diagram illustrating an exemplary environment 100 utilizing an exemplary system for supporting social productivity in accordance with various embodiments. As shown in FIG. 1, the exemplary environment 100 comprises a client 102, an application service provider (ASP) system 104, a database server 106, a file server 108, a cloud-based service server 110, and a messaging service server 112, each of which may be communicatively coupled with each other using communication connections 114. According to some embodiments, the application service provider (ASP) system 104 may be configured to provide the client 102 with application access in conjunction with support for social productivity as described herein. The support for social productivity may include, for example, features relating to capturing context for data content objects, dashboards, spaces, and workspaces. In some embodiments, the communication connections 114 may be implemented or facilitated using one or more local or wide-area communications networks, such as the Internet, WiFi networks, WiMax networks, and the like. Depending on the embodiments, some or all of the communication connections 114 may utilize encryption (e.g., Secure Sockets Layer [SSL]) to secure information being transferred over the connections 114 between the various entities shown in the exemplary environment 100.

Each of the client 102, the ASP system 104, the database server 106, the file server 108, the cloud-based service server 110, and the messaging service server 112 may be implemented using one or more digital devices, which may be similar to the digital devices discussed later with respect to FIG. 22. For instance, client 102 may be any form of computing device capable of receiving user input (e.g., configured for user interaction), capable of displaying a client user interface (e.g., through which an application can be viewed or controlled), and capable of communicating with the ASP system 104 over one or more of the communication connection(s) 114. Such computing devices may include a mobile phone, a tablet computing device, a laptop, a desktop computer, personal digital assistant, a portable gaming unit, a wired gaming unit, a thin client, a set-top box, a portable multi-media player, or any other type of network accessible user device known to those of skill in the art. Further, one or more of the ASP system 104, the database server 106, the file server 108, the cloud-based service server 110, or the messaging service server 112 may comprise of one or more servers, which may be operating on or implemented using one or more cloud-based services (e.g., System-as-a-Service [SaaS], Platform-as-a-Service [PaaS], or Infrastructure-as-a-Service [IaaS]).

The client 102 may be configured to communicatively connect with the ASP system 104 and be provided with access to an application and social productivity features through the ASP system 104. According to some embodiments, the ASP system 104 can maintain application sessions, gather metadata and other contextual information regarding data content objects accessed through the ASP system 104, and connect storage services (e.g., provided by third-party cloud-based storage providers) with application services (e.g., provided by application servers).

The application being provided through the ASP system 104 may be executed remotely from the client 102, and/or may be executed on or under the control of the ASP system 104. The ASP system 104 may be executing or controlling the execution of the application on behalf of the client 102 and, as such, may facilitate access (e.g., video, audio, and data access) and user interaction between the executing application and the client 102.

The ASP system 104 may also be configured to provide the client 102 with features supporting social productivity as the client 102 accesses the application executing on behalf of the client 102. For example, the ASP system 104 may capture contextual information regarding data content object as such data content objects are accessed by the client 102 through the ASP system 104, possibly using the application executing on behalf of the client 102. The ASP system 104 may provide the client 102 with a workspace, or other type space, through which the client 102 can access different data content objects while being providing contextual information regarding such objects. The ASP system 104 may provide the client 102 with a dashboard that assists a user at the client 102 in reviewing events associated with data content objects that are accessible to the client 102 through the ASP system 104 (e.g., through a space, such as a workspace) and that are relevant to the user. As described herein, a user may navigate from the dashboard to a location in the content of a data content object that relates to an event regarding the data content object (e.g., a change in content or someone reading the content).

The ASP system 104 may further execute or control the execution of the application such that the application has native access (e.g., in-application access) to one or more files or other data content objects residing on a cloud-based storage external to the client 102 and the ASP system 104. In various embodiments, such a cloud-based storage service may be provided by a third-party cloud-based storage service (e.g., Dropbox or Box), which is separate and distinct from the ASP system 104. Execution or execution control of the application may further provide the client 102 with the application having native access to databases (e.g., served by the database server 106) or to file servers (e.g., the file server 108) that are separate and distinct from the ASP system 104.

By executing or controlling execution of the application such that it has access to data separate and distinct from the execution of the application, the ASP system 104 may provide the client 102 with remote access to the application that might otherwise not be operable on the client 102 and that has access to data storage provided by third-party services. In some embodiments, this may also allow an operator of the ASP system 104 to provide user with applications as a remotely accessible service (e.g., for rent) without the need for maintaining long-term storage data on the ASP system 104 (e.g., user data opened in the applications are provided by a storage system and that is distinct from the ASP system 104; the storage system may be maintained by the user or a third-party on behalf of the user).

This may be useful, for example, when the application is incompatible with the operating system running on the client 102, when the client 102 lacks the requisite resources to locally execute the application (e.g., lack of memory space or processor performance), or when the client 102 lacks sufficient resources to properly execute the application locally.

In some instances, the cloud-based storage services accessed by various embodiments may provide additional cloud-based services in conjunction with the storage services. These additional cloud-based services may include such web-application services relating to data content objects, such as word processing documents, spreadsheet documents, presentation documents, and the like. An example of such a cloud-based service is Google® Docs. Various embodiments may utilize web-application services, in conjunction with or in place of virtualized applications, when accessing various data content objects (e.g., files) through the ASP system 104. For example, where a spreadsheet file being accessed through the ASP system 104 is stored on a Dropbox, the ASP system 104 may access the spreadsheet file from Dropbox and use a Google® Docs web application to open the spreadsheet file for viewing and/or modification purposes.

With various social productivity features provided by the ASP system 104, such as spaces (e.g., workspaces), the ASP system 104 can permit one or more users to uniformly and collaboratively access to data content objects, which may be stored on one or more of the database server 106, the file server 108, and the cloud-based service server 110 providing a cloud-based storage service. For example, one or more data content objects can be accessed by the client 102, through the ASP system 104, from storage external to the client 102 and the ASP system 104. As the one or more data content objects are accessed, the ASP system 104 can capture and collect contextual information regarding the access of the data content object. The contextual information captured for a data content object can include information provided by the application that is executing on behalf of the client 102, that is executing and remotely to the client 102, and that is accessing the data content object. The contextual information may include information regarding actions performed, at the request of a user at the client 102, by the ASP system 104 and outside of the application executing on behalf of the client 102. The contextual information can relate to operations such as uploading, through the ASP system 104, data content objects to storage external to the ASP system 104 (e.g., cloud-based storage service, such as Dropbox®), or downloading content, through the ASP system 104, from storage external to the ASP system 104. The contextual information can also relate to operations such as a user at the client 102 requesting the ASP system 104 share some or all of a data content object, or share a space with another user.

As described herein, as data content objects are accessed by the client 102 through the ASP system 104, the ASP system 104 can provide the client 102 with at least some contextual information relating to the data content objects being accessed. In accordance with embodiments described herein, the ASP system 104 may present the contextual information to the user at the client 102 as the data content object is being accessed (e.g., data content object is being viewed) via a space provided by the ASP system 104 to the client 102 and/or via a remotely executing application being accessed by the client 102 through the ASP system 104.

In some embodiments, the ASP system 104 can inform the user at the client 102 regarding events relating to data content objects being accessed through the ASP system 104, and may do so based on the relevancy of the event to the user. Events relating to a data content object may be relevant to the user based on, for example, the user's preferences (e.g., based user-defined criterion), the user's previous access of the data content objects, and/or the user's association with the data content object (e.g., user associated with data content object based through their common association with a specific workspace).

As the ASP system 104 detects an event associated with a data content object being accessed through the ASP system 104, the ASP system 104 can present one or more users with a reference to a location in the data content object that relates the event. As described herein, a reference once presented to a user at the client 102, can be traversed by the user to the location referenced. Such traversal can result in the ASP system 104 providing the client 102 with access to an application that is executing on behalf of the client 102 and that is accessing the content of the data content object at the location referenced.

FIG. 2A is a block diagram illustrating an exemplary environment 200 utilizing an exemplary system for supporting social productivity in accordance with various embodiments. In particular, FIG. 2A presents further details regarding the client 102 and the ASP system 104 in accordance with some embodiments. As shown, the client 102 comprises a client module 202. The ASP system 104 comprises an access server module 204, a storage module 206, a virtualization module 208, an application module 210, a context module 212, a workspace module 214, a dashboard module 216, and a message notification module 218.

For some embodiments, the client module 202 may be configured to facilitate communication between the client 102 and the ASP system 104, provide a user at the client 102 with a client user interface configured to facilitate user interaction with the ASP system 104, relay user input received through the client user interface (from the user at the client 102) to the ASP system 104, and relay output (e.g., video, audio, or other) from an application provided by the ASP system 104 to one or more components of the client 102 configured to receive and present the output through the client user interface (e.g., video output to the video display of the client 102, and audio data to the sound processor of the client 102).

For some embodiments, the client module 202 may provide the client user interface by generating the client user interface at the client 102 and then presenting the client user interface to a user through a display device (e.g., video display of a tablet computing device) of the client 102. Additionally, some embodiments may provide the client user interface by generating the client user interface at the ASP system 104 (e.g., in the access server module 204), and then sending the generated client user interface from the ASP system 104 (e.g., the access server module 204) to the client module 202 for presentation to the user (e.g., through a display device coupled to the client 102). In general, the presented client user interface is a graphical user interface (GUI) adapted for user interaction through the client 102 and its coupled peripherals, which may include a touch screen. Those skilled in the art will appreciate that the configuration, appearance, and behavior of the client user interface provided by the client module 202 may vary based on, among other things, the type of digital device comprising the client 102 or the computing resources of the client 102 available to the client module 202 (e.g., peripherals available to the client 102, or modes of input available through the client 102).

The client module 202 may further be configured to receive and relay control information from an input device (e.g., peripheral) coupled to the client 102 (e.g., physical or on-screen keyboard integrated into the client 102, or peripheral externally communicatively coupled to the client 102) to the ASP system 104. Likewise, the client module 202 may relay control information, or other data, between devices (communicatively) coupled to the client 102 and the ASP system 104 (e.g., the client module 202 relays print data from the ASP system 104 to a printer coupled to the client 102).

The client module 202 may be also configured to provide an interface at the client 102 operable in presenting one or more features relating to social productivity as described herein. For example, the client module 202 may provide an interface enabling access to contextual information regarding data content objects, an interface presenting or otherwise facilitating a workspace or other space, an interface presenting or otherwise facilitating a dashboard, and an interface facilitating notification services relating to social productivity through the ASP system 104.

For example, the client module 202 may be further configured to provide a workspace interface at the client 102 operable in presenting one or more data content objects (e.g., files), stored on one or more separate and disparate cloud-based storage services (e.g., third-party services) or stored locally at the client 102, for access through the client 102. For some embodiments, the workspace interface may allow a user at the client 102 to request workspace operations with respect to the data content objects presented through the workspace interface. The data content object presented may include those locally stored and/or those stored on various cloud-based storage services external to the ASP system 104. The workspace operations supported may include adding, deleting, renaming, and moving data content objects stored on one or more cloud-based storage services or locally at the client 102. Data content objects, such as files, presented through the workspace interface may be selectable for opening through the ASP system 104, possibly through a virtualized application instance accessed through the ASP system 104.

In some embodiments, the client module 202 includes a runtime application compatible with the operating system of the client 102 and that is a native application of the client 102. Additionally, the runtime application may be configured to provide facilitate access by the client 102 to data content objects, applications, and social productivity features provided through the ASP system 104. In this way, the client module 202 and its runtime application may provide access to data content objects or applications that may be incompatible with the operation system of the client 102 or that may otherwise not be operable on the client 102 without the use of the client module 202. In this way, the client module 202 may also facilitate access to uniform and agnostic access to data content objects residing on one or more different storage locations external to the client 102 and the ASP system 104, such as location provided by different cloud-based storage services (e.g., Dropbox, Box, etc.). Additionally, the client module 202 may enable various social productivity features described herein, such as those relating to context for data content objects, workspaces, and dashboards.

Those skilled in the art will appreciate that in some embodiments, access to data content objects, applications, and social productivity features through the ASP system 104 may be facilitated by a third-party communication application, such as a web browser application often used to access web pages.

The client module 202 may also be configured to provide universal and/or agnostic management access to various data content objects that are stored at separate and disparate data storage services but made available through the ASP system 104. Accordingly, in some embodiments, the client module 202 may comprise a management interface adapted to receive user requests for management operations, such as adding (e.g., by creation of a new file or by upload), deleting, moving, and renaming data content objects. For some embodiments, the client module 202 may utilize web-based application programming interfaces (APIs), which may be associated with one or more web applications (e.g., Google® Docs), to access files stored on cloud-based services. For example, in order to list data content objects accessible through the ASP system 104, the client module 202 may utilize web-based APIs for a given cloud-based service (e.g., Dropbox, Box, or Google® Docs) to directly perform management operations (e.g., listing of stored files, adding files, deleting files, or renaming files) with respect to that service. Then, when a data content object listed through the client module 202 is selected for opening through the ASP system 104, the client module 202 may instruct the ASP system 104 to obtain a copy to the selected data content object from it respective storage source (e.g., cloud-based storage source or local storage source) or directly access the data content object from its respective storage source. Thereafter, the ASP system 104 may initiate a virtualized application instance having access to the selected data content object, and the output data of the virtualized application instance may be transmitted to the client 102.

According to some embodiments, when the data content objects from different storage services (e.g., different third-party cloud-based storage services and/or locally stored at the client) are presented (e.g., through a workspace presented in a segregated manner according to their storage source (e.g., grouped according to storage source or projects), or presented in a common pane with little or no indication of a data content object's storage source. In some embodiments, when a data content object presented through the interface is selected for opening, the ASP system 104 may access the data content object directly from its corresponding storage source (e.g., cloud-based storage service or local storage at the client) or obtain a cached copy of the data content object selected its corresponding storage source, and then present the data content object for access through a virtualized application instance. Where a cached copy of the data content object is utilized for opening the data content object, the ASP system 104 may be configured to commit any changes/update performed on the cached copy to the original copy at the original storage location (e.g., commitment occurs when the virtual application instance is closed).

By providing an interface having universal and/or agnostic access to one or more disparate data storage services and/or the local storage source, various embodiments can provide users (e.g., at the client 102) with a workspace, through which data content objects stored in disparate locations can be universally/agnostically accessed for collaborative management, viewing, or editing purposes. FIGS. 18-23 present example client user interfaces that, according to some embodiments, could be presented by the client module 202 at the client 102.

Continuing with reference to FIG. 2A, the access server module 204 may be configured to facilitate user access (e.g., by a user at the client 102) to data content objects, applications, or social productivity features (e.g., contextual information, workspaces, dashboard, etc.) that are provided through the ASP system 104. In some embodiments, the access server module 204 may achieve this by performing some or all of the following on behalf of a user accessing the ASP system 104 from the client 102: (a) establishing and maintaining communication between the client 102 and the ASP system 104; (b) authenticating access to the ASP system 104 (and its various components) by the user; (c) establishing and maintaining one or more application access sessions (also referred to herein as "application sessions") for the user, whereby each application access session may comprise an instance of an application (e.g., an instance of a particular version of an application) being executed or controlled by the ASP system 104 on behalf of the user at the client 102; (d) implementing user preferences and settings for the user's access of the ASP system 104; (e) implementing and enforcing user policy on the user's access of the ASP system 104; (f) enabling access by the applications being executed or controlled by the ASP system 104 to data content objects (e.g., files) stored on or stored using third-party data storage services (e.g., third-party cloud-based storage services, such as Dropbox or Google® Docs); (g) monitoring the user's access of the ASP system 104; (h) maintaining statistics or analytics based on the user's access of the ASP system 104; and (i) facilitating billing of the user based on their access or usage of the ASP system 104.

The access server module 204 may perform some or all of the following when the ASP system 104 provides social productivity features to the client 102: (a) interacting with the context module 212 to provide or otherwise facilitate social productivity features that relate to contextual information for data content objects accessed through the ASP system 104; (b) interacting with the workspace module 214 to provide or otherwise facilitate presentation of a workspace (or another space) to the client 102 by the ASP system 104; (c) interacting with the dashboard module 216 to provide or otherwise facilitate presentation of a dashboard to the client 102 by the ASP system 104; and (d) interacting with the message notification module 218 to provide or otherwise facilitate notifications (e.g., e-mails, instant messages, or push notifications), to the client 102 in regard to events relating to data content objects accessed through the ASP system 104.

In some embodiments, the access server module 204 may on behalf of the client 102, negotiate, establish and otherwise facilitate the establishment of a connection between the client module 202 and an application being provided via the virtualization module 208 and the application module 210. Once established, the access server module 204 may continue to monitor or control the connection, possibly in accordance with user preferences, settings, and policies utilized by the ASP system 104.

The access server module 204 may further be configured to manage the overall operation of the ASP system 310 discussed further herein. For example, the access server module 204 may be operable to track and manage resources for the ASP system 104, which may involve monitoring/managing computer resource utilization (e.g., memory utilization, processor utilization, or network bandwidth utilization) by various components of the ASP system 104 or cloud-based services (e.g., SaaS, PaaS, or IaaS) utilized by various components of the ASP system 104. As another example, the access server module 204 may be responsible for distributing the workload of serving two or more clients similar to the client 102 across one or more access servers performing the operations of the access server module 204.

The storage module 206 may be configured to establish and/or maintain access to data on third-party data storage services by an application executing or being controlled by the ASP system 104 on behalf of the user at the client 102. In some embodiments, the storage module 206 may achieve this by receiving, storing, and utilizing access parameters (e.g., third-party access parameters such as protocol information, username, password, encryption key, signature file identifier, navigation address, third-party storage identifier, or the like) provided by the user (at the client 102) in association with a third-party data storage service (e.g., a cloud-based data storage service, such as Dropbox or Google® Docs) which the user wishes to access through the ASP system 104. For example, when the user requests access to data content objects (e.g., files) stored using a third-party data storage service, the storage module 206 may establish a connection with the third-party data storage service using the stored access parameters (e.g., protocol information, username, password, encryption key, signature file identifier, navigation address, third-party storage identifier, or the like) provided by the user, retrieve a listing of the data content objects stored on/using or otherwise made available through the third-party data storage service in association with the access parameters provided, and access the data content objects according to the user's access request. Depending on the embodiment, the user may cause data content objects stored on the third-party data storage service to be accessed by the ASP system 104, for example, when the user requests to review a listing of data content objects (e.g., files) stored on the third-party data storage service or when the user chooses to access data content objects (e.g., open, view, or edit a file) using an application provided by the ASP system 104 (e.g., through the application module 210).

In addition to establishing and/or maintaining access to data on third-party data storage services (e.g., Dropbox, Box, or Google® Docs), the storage module 206 may be configured to permit the ASP system 104 to manage data content objects on the third-party data storage services on behalf of the client 102. For instance, the storage module 206 may permit the ASP system 104 to implement data content object management functions (e.g., workspace functions) with respect to data content objects stored on disparate third-party data storage services, thereby enabling a user at the client 102 to perform data content objects management operations through the client module 202. According to some embodiments, the storage module 206 may be operable with the client module 202 such that users can utilize data content object management functions through a data content object manager interface (e.g., a dashboard or a workspace graphical user interface) presented by the client module 202.

The virtualization module 208 may be configured to establish, monitor, maintain, or otherwise manage execution of an instance of an application in a virtual computing environment (hereafter, also referred to as a "virtualized application instance") for access by the user at the client 102. An instance of the application may be executed in a virtual computing environment in association with an application session established for access by the user at the client 102. Accordingly, in some embodiments, the virtualization module 208 may initiate or manage execution of an instance of the application based on requests received from the access server module 204.

In some embodiments, the instance of an application, which is operated in a virtual computing environment for the benefit of user access, may be based on a particular version of the application. Depending on the embodiment, the version of the application chosen/selected for execution as the application instance may be determined by the access server module 204, the virtualization module 208, the application module 210, or some combination thereof. Factors influencing the determination of the version may include, for the example, the number of user licenses available for a given version of the application, the type of data to be accessed by the application (e.g., file has a format A that is compatible with a version B of the application), the user accessing the application (e.g., user's access privileges or user's subscription type with respect to the ASP system 104), the capabilities of the client device 102 (e.g., the client device 102 is equipped with a high-definition display compatible with the high-definition output of a particular version of an application), the computing resources presently available to the ASP system 104, or network bandwidth required to provide the client 102 with access to the given version of the application. In some embodiments, the virtualization module 208 may utilize an internal hypervisor or interface with an external hypervisor configured to manage execution of the instance of an application in a virtual computing environment. Additionally, the virtualization module may employ the use of a cloud-based services (e.g., SaaS, IaaS, or PaaS), possibly provided by a third-party (e.g., Amazon® EC2®, GoGrid®, or Rackspace®), to execute the instance the instance of an application in the virtual computing environment.

In various embodiments, the virtualization module 208 of the ASP system 104 may initiate any number of virtualized application instances. For example, the virtualization module 208 may initiate (e.g., command initiation of) any number of virtualized application instance by the ASP system 104 and/or any number of servers (e.g., other ASP systems 104 and/or other servers). In some embodiments, the virtualization module 208 creates and executes a local virtualization environment.

The application module 210 may be configured to obtain or retrieve a version of an application for execution in a virtual computing environment for access by the user at the client 102. For example, the application module 210 retrieves a version of the application on behalf of the virtualization module 208, and then provides the retrieved version to the virtualization module 208 for execution in a virtual computing environment. Depending on the embodiment, the application module 210 may retrieve the version of the application based on a request from the virtualization module 208 or the access server module 204 (e.g., which, as described herein, may be responsible for managing application sessions for the user access). The application module 210 may retrieve the version of the application from an application repository (not shown), which for some embodiments may be implemented using one or more file servers, database servers, or some combination thereof. For example, the version of the application may be retrieved from a cloud-based services configured to serve the version of the application (e.g., to the application module 210) upon request. The application repository may store a variety of versions for a given application (e.g., for Microsoft® Word®, the application repository may store Word® 2011, Word® 2008, Word® 2004, and Word® 2001), and provide the appropriate version of the given application based on the request discussed above. Each version of the application may be stored on the application repository as a single, separate application executable file, as a directory containing the version's associated executable file(s) and any supporting files (e.g., software library files), or as a binary image or compressed file containing the version's associated executable file(s) and any possible supporting files (e.g., software library files), or some combination thereof.

For some embodiments, retrieval of the version of the application may comprise the application module 210 retrieving a path or link to data (e.g., a copy of the application or an image of the application) corresponding to the version of the application to be retrieved. This path or link to the data may then be conveyed by the application module 210 to the virtualization module 208, which uses the data at the path/link to instantiate a virtualized application instance.

For some embodiments, the virtualization module 208 and the application module 210 may be implemented as single module (not shown) that utilizes a cloud-based service (e.g., SaaS, IaaS, or PaaS) to provide a version of an application executing in a virtual computer environment. Such a cloud-based service may be provided by a third-party cloud-based service, which may be manage or controlled by the ASP system 104 using APIs compatible with the service.

To utilize the cloud-based services for the virtualization module 208, the application module 210, and possibly other components of the ASP system 104, the ASP system 104 may employ application programming interfaces (APIs) (e.g., those provided by Amazon®, GoGrid®, or Rackspace®) that permit the ASP system 104 and its various components to provision (e.g., request the use of), consume, and release services provided by cloud-based services. For example, the virtualization module 208 may utilize an Infrastructure-as-a-Service (IaaS) API (e.g., driver) to provision one or more virtual machines to operate one or more virtualized application instances, while the application module 210 the IaaS API to for provisioning virtual machines to store copies/images of applications (utilized by the virtualization module 208 to instantiate virtualized application instances).

The context module 212 may be configured to provide or otherwise facilitate capturing and maintaining contextual information regarding data content objects accessed by the client 102 through the ASP system 104. In some embodiments, the context module 212 may detect an event that occurred with respect to a data content object accessible through the ASP system 104, where the event may be a result of an action performed on the data content object through the ASP system 104 at a request of a first user at the client 102. Upon detecting the event, the context module 212 may capture contextual information relating to the event in a history buffer. Subsequently, the contextual information captured by the context module 212 may be retained to support various social productivity features provided by the ASP system 104, including those provided by the workspace module 214 or the dashboard module 216. Additionally, the context module 212 may provide a reference based on the contextual information, where the reference enables a second user (e.g., at another client) to traverse to a location in the data content object relating to the event. For example, when the second user selects to traverse the reference, the traversal may cause the ASP system 104 to instruct an application, being controlled by the ASP system 104 and being executed on behalf of the second user, to access the data content object and move to the location associated with the reference.

The context module 212 may also be configured to create, or facilitate the creation of, an activity stream for data content objects based on the contextual information captured by the context module 212. For example, the context module 212 may provide the contextual information captured to the workspace module 214, which may be configured to create and present an activity stream for a data content object in connection with a workspace (or other space). Likewise, the context module 212 may provide the contextual information captured to the dashboard module 216 to update or create an activity stream in relation to a data content object.

The workspace module 214 may be configured to provide or otherwise facilitate presentation of a workspace (or another space) to the client 102 by the ASP system 104. In some embodiments, the workspace module 214 may associate a data content object with a workspace, possibly at the request of a user at a client (e.g., the client 102). The workspace module 214 may detect an event that occurred with respect to the data content object accessible through the ASP system 104. The event may be a result of an action performed on the data content object through the ASP system 104 at a request of a first user at the client 102. Based on the detect event, the workspace module 214 may inform a second user (e.g., at another client) of the event, where the second user may be associated with the workspace.

The workspace module 214 may, at the request of the first user at the client 102, delegate a task to another user (e.g., the second user) in association with at least a portion of content in the data content object. The workspace module 214 may, subsequently, receive a response to the task from the other user (e.g., the second user), and integrate the response into the portion of content. Additionally, the workspace module 214 may inform the first user at the client 102 regarding the response received from the other user (e.g., the second user), and may further inform the first user of the integration of the response into the portion of content originally delegated.

For some embodiments, when a first user delegates a task to another user in association with a portion of content in a data content object, the other user may be limited to providing a response for only that portion of content. Additionally, the integration of the response into the corresponding portion may only affect the portion associated with the task. Depending on the embodiment, the response provided by the other user may be a revised version of the content portion associated with the delegated task.

The dashboard module 216 may be configured to provide or otherwise facilitate presentation of a dashboard to the client 102 by the ASP system 104. In some embodiments, the dashboard module 216 may detect an event that occurred with respect to a first data content object accessible through the ASP system 104. The event may be a result of an action performed on the first data content object through the ASP system 104 at a request of a first user at the client 102. The dashboard module 216 may determine whether an attribute of the first event satisfies a criterion. An attribute of the event evaluated for a criterion can include, for example, attributes of the data content object relating to the event (e.g., type of data content object, size, owner, date created, date modified, etc.), the type of event, the time of the event, the date of the event, the user causing the event, the identity of the application involved in the event, and the type of application involved in the event. Where the attribute of the event is determined to satisfy the criterion, the dashboard module 216 may provide a first card relating to the event and configured to be presented to a second user at a second client. When presented, the first event card may be presented through a dashboard configured to present the second user with events relating to other data content objects in conjunction with the first event card. By the use of one or more criteria, the dashboard module 216 can implement noise and relevancy controls that determine which events are presented to the second user at the second client, and at what time.

For example, through one or more criteria, the dashboard module 216 can implement one or more threshold conditions (e.g., based on time, date, count of event, type of event, frequency of event, etc.) for determining relevancy of data content objects and events when presenting related event cards on a dashboard. The threshold condition may be defined by or evaluated according to a numerical value that controls the granularity of the threshold condition. For example, for a numerical value that ranges between 1 and 10, a numerical values closer to 1 can cause the threshold condition to be adjusted such that the dashboard module 216 presents more events regarding data content objects, and a numerical values closer to 10 can cause the threshold condition to be adjusted such that the dashboard module 216 presents less events regarding data content objects.

Additionally, a threshold condition, implemented by criteria, can define such user-based relevancy conditions as: did the user recently create the data content object, did the user recently change the data content object; has the user commented on the data content object; has the user reviewed the content of the data content object; or has the user collaboratively worked with another user that has changed or otherwise accessed the data content object.

The message notification module 218 may be configured to provide or otherwise facilitate notifications to the client 102 from the ASP system 104. In some embodiments, the message notification module 218 may be configured to cause the transmission of a message from the ASP system 104 to the client 102 that notifies a user at the client 102 of events that may have recently transpired and/or that may be of relevance to the user (e.g., based on one or more criteria). Depending on the embodiment, the message transmitted by way of the message notification module 218 may use one or more different means of communication including, for example, an e-mail, a mobile text message, a push-based notification system, and a social networking service. According to some embodiment, the message notification module 218 may interface with the messaging service server 112 to cause the transmission of the message from the ASP system 104 to the client 102. In various embodiments, the message notification module 218 may utilize a messaging system internal to, and provided by the ASP system 104.

Figure 2B:
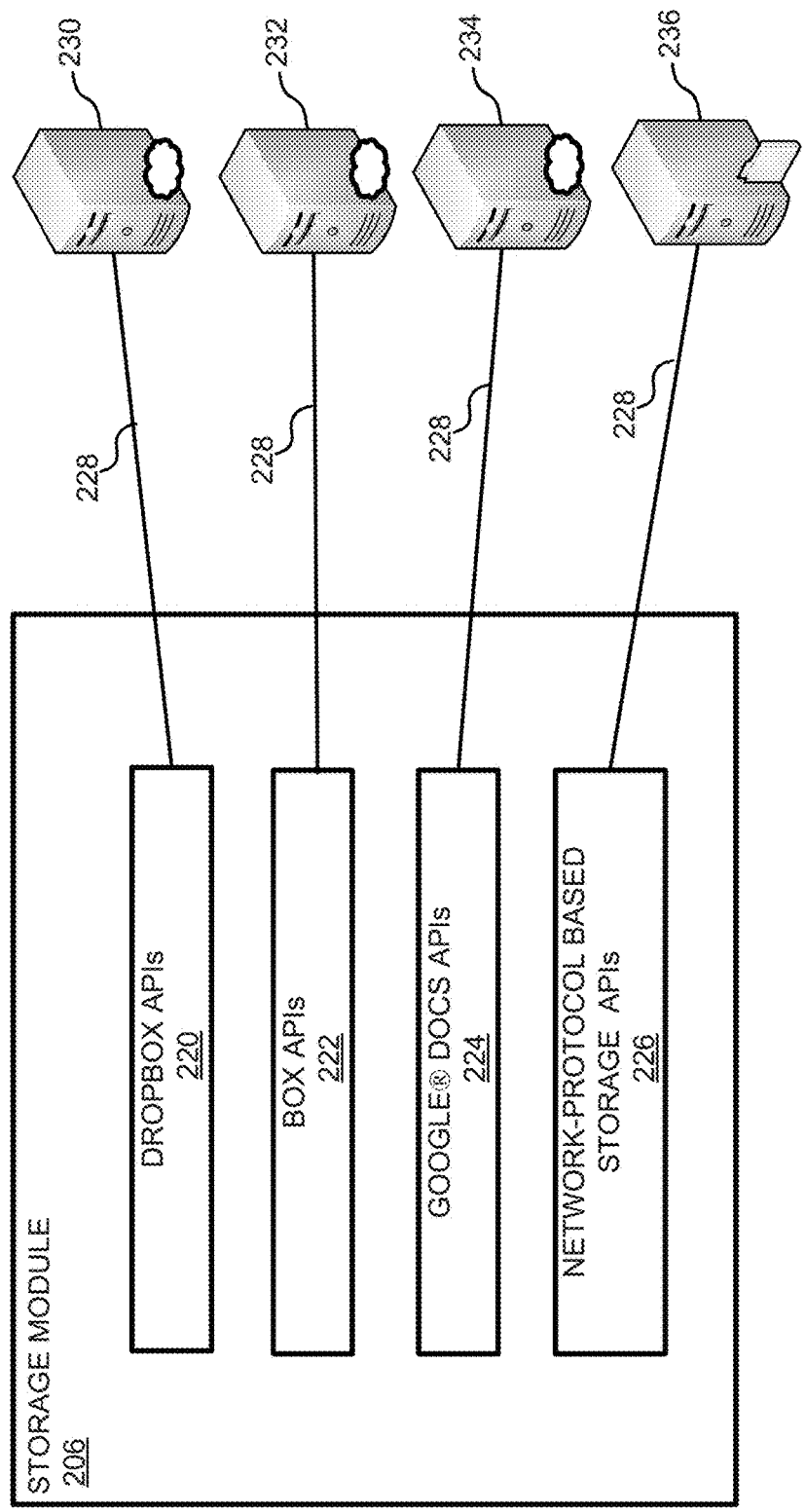
FIG. 2B is a block diagram illustrating an example storage module that is part of an example system for supporting social productivity in accordance with various embodiments.

FIG. 2B is a block diagram illustrating the storage module 206 configured to establish or maintain access to data on third-party data storage services (e.g., Dropbox, Box, or Google® Docs) by an application executing or being controlled by the ASP system 104 on behalf of the user at the client 102. In addition to storing and utilizing access parameters in association with different data storage services (e.g., third-party cloud-based storage), the storage module 206 may comprise various application programming interfaces (APIs) that facilitate access to the different storage services over network connections 228. For example, as illustrated in FIG. 2B, the storage module 206 may comprise Dropbox APIs 220 enabling access data stored at a Dropbox cloud-based storage server 230, Box APIs 222 enabling to access data stored at a Box cloud-based storage server 232, and Google® Docs APIs 224 configured to access data stored at a Google® Docs cloud-based services 234. In some embodiments, the web APIs utilized by the storage module 206 may comprise web-based APIs (e.g., web application APIs) provided by such third-party cloud service operators as Dropbox and Google® for accessing various cloud-based service, including storage services and file management services.

As also illustrated in FIG. 2B, the storage module 206 may comprise network-protocol based storage APIs 226 that permit access to a network file system 236 using non-web-based methodologies. For certain embodiments, the storage module 206 may utilize the network-protocol based storage APIs 226 to access file system based on various network protocols including, for example, Network File System (NFS), Samba, file transfer protocol (FTP), and the like.

Figure 3:
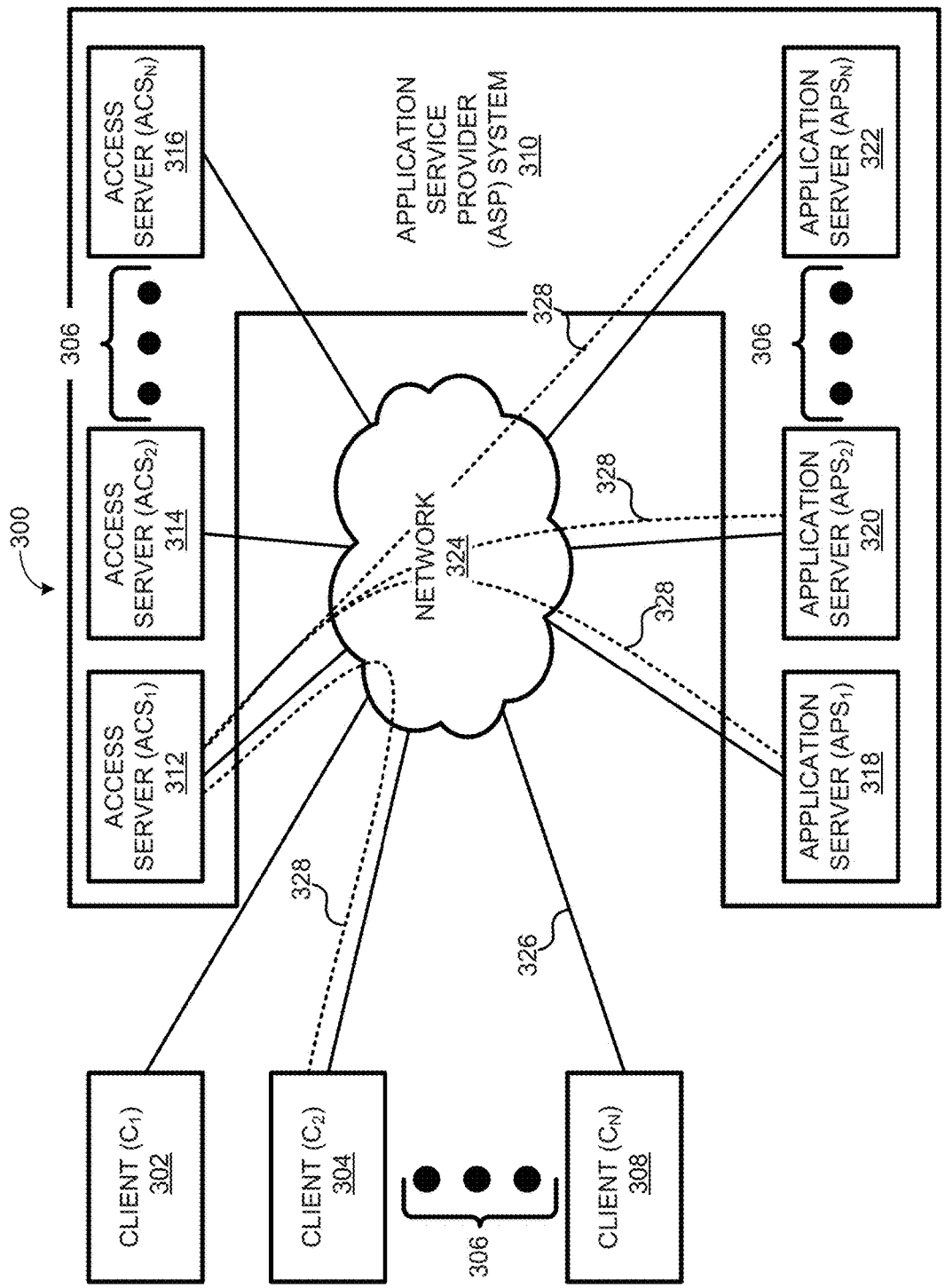
FIG. 3 is a block diagram illustrating an example environment utilizing an example system for supporting social productivity in accordance with various embodiments.

FIG. 3 is a block diagram illustrating an exemplary environment 300 utilizing an exemplary system for supporting social productivity in accordance with various embodiments. As shown, the exemplary environment 300 comprises clients $C_1$ to $C_n$ (represented by clients 302, 304, and 308), an application service provider (ASP) system 310, and a network 324 enabling communication between the clients 302, 304, and 308 and the ASP system 310 over network connections 326. Depending on the embodiment, the clients 302, 304, and 306 may be similar in function and implementation to the client 102, and the ASP system 310 may be similar in function and implementation to the ASP system 104, each of which was discussed in detail with reference to FIGS. 1 and 2. As such, in accordance with various embodiments described herein, the clients 302, 304, and 306 may comprise one or more digital device(s) configured to communicating with the ASP system 310 through the network 324, the ASP system 310 may comprise one or more server configured to provide the clients 302, 304, and 306 with access to files, applications, and social productivity features.

As further shown in FIG. 3, the functionality of the ASP system 310 may be implemented by way of access servers $ACS_1$ to $ACS_n$ (represented by access servers [ACSs] 312, 314, and 316), and application servers $APS_1$ to $APS_n$ represented by (application servers [APSs] 318, 320, and 322). Although a limited number of clients, ACSs, and APSs are depicted in FIG. 3, those skilled in the art will appreciate that there may be any number of clients, ACSs, and APSs. Ellipses 306 in FIG. 3 indicate that any number of clients, ACSs, and APSs could be present in the exemplary environment 300.

In some embodiments, the ACSs 312, 314, and 316 may implement some or all of the functionality provided by the access server module 204 as described in reference to FIG. 2A, and the APSs 318, 320, and 322 may implement some or all of the functionality provided by some or all of the storage module 206, the virtualization module 208, the application module 210, the context module 212, the workspace module 214, the dashboard module 216 and the message notification module 218 as described in reference to FIG. 2A. Specifically, according to some embodiments, the workload of providing some or all of the services or functionalities of the access server module 204 may be distributed amongst some or all of the ACSs 312, 314, and 316, and the workload of providing, while the workload of providing some or all of the services or functionalities of the storage module 206, the virtualization module 208, the application module 210, the context module 212, the workspace module 214, the dashboard module 216 and the message notification module 218 may be distributed amongst some or all of the APSs 318, 320, and 322. In some instances, the ACSs 312, 314, and 316 may utilize load balancing to distribute the workload amongst the available ACSs, and the APSs 318, 320, and 322 may utilize load balancing to distribute the workload amongst the available APSs. In various embodiments, one or more digital devices may manage and/or provide load balancing to any number of ACSs and/or any number of APSs. By distributing the workload amongst multiple ACSs and APSs, certain embodiments may provide acceptable performance (e.g., enough availability of computing resources to provide the requested applications with user-acceptable performance), scalability (e.g., near real-time user scalability according to demand or the number of users currently utilizing the ASP system 310 increases or decreases, or application scalability to provide more variety of applications operating on a variety of operating systems), and reliability (e.g., through redundancy of servers and components, or lower bandwidth per user) with respect to the ASP system 310.

In the example illustrated in FIG. 3, a dashed line 328 illustrates a virtual communication channel (hereafter referred to as "virtual communication channel 328") between the client 304 and the application servers 318, 320, and 322 established via the access server 312. In some embodiments, the virtual communication channel between the client 304 and the application servers 318, 320, and 322 may be implemented by way of one or more network connections 326 between the client 304 and the access server 312, and one or more networks connections 326 between the access server 312 and each of the application servers 318, 320, and 322. Alternatively, in some embodiments, the virtual communication channel between the client 304 and the application servers 318, 320, and 322 may be implemented by the access server 312 mediating one or more network connections 326 directly between the client 304 and each of the application servers 318, 320, and 322.

Once established, the virtual communication channel 328 enables data flow over the network connections 326 between the client 304 and the access server 312, and data flow between the client 304 and the application servers 318, 320, and 322 via the access server 312. Through such data flows, the client 304 may, for example, be serviced by the access server 312 (e.g., in accordance with the access server module 204 described in FIG. 2A) or obtain access to application services and social productivity features provided by each of the application servers 318, 320, and 322 (via the access server 312).

Figure 4:
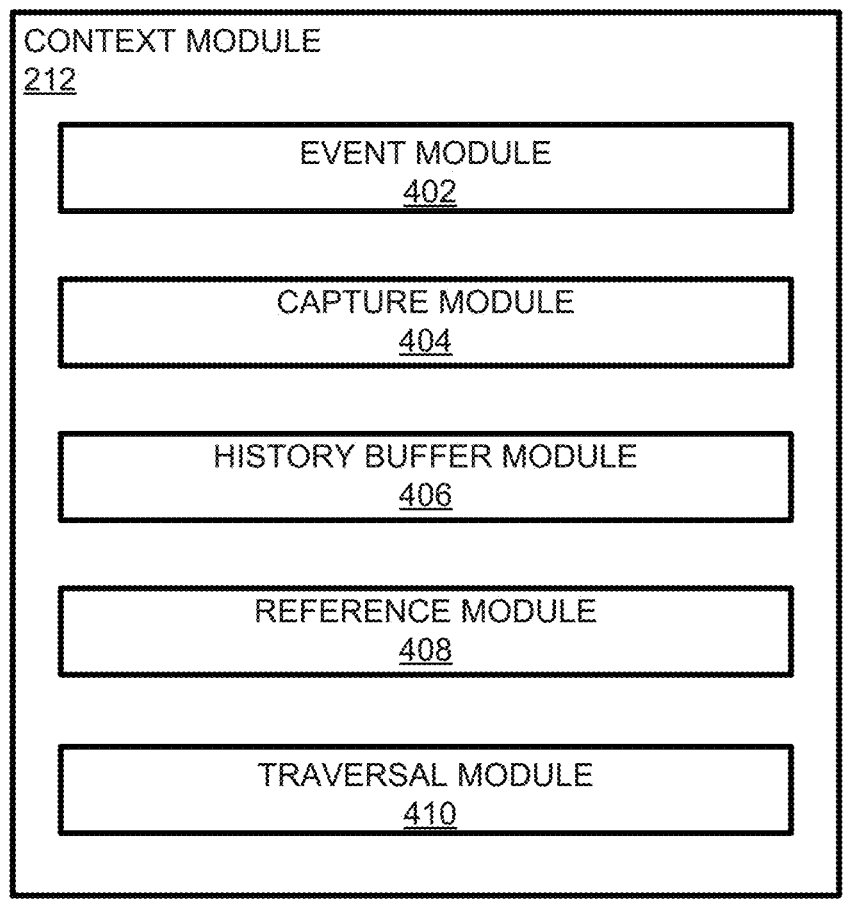
FIG. 4 is a block diagram illustrating an example context module that is part of an example system for supporting social productivity in accordance with various embodiments.

FIG. 4 is a block diagram illustrating an example context module 212 that is part of an example system for supporting social productivity in accordance with various embodiments. As shown, the context module 212 comprises an event module 402, a capture module 404, a history buffer module 406, a reference module 408, and a traversal module 410.

The event module 402 may be configured to detect an event that occurred with respect to a data content object accessible through the ASP system 104. The event may be one resulting from an action performed on the data content object through the ASP system 104 at a request of a first user at the client 102. As such, the event module 402 may determine events being performed on a data content object, by a user, using a data-content object processing application. As described herein, an event can comprise: an operation being performed on content of the data content object being accessed the ASP system 104 (e.g., reading, creating, modifying, removing, inserting, and moving content): creating, removing, uploading, or downloading the data content object through the ASP system 104; a user sharing the data content object with another user through the ASP system 104; or associating or disassociating the data content object to a workspace or a tag through the ASP system 104. Events can comprise a temporal-oriented, location-oriented, or relationship-oriented change for the data content object.

For certain embodiments, the event module 402 may detect an event with respect to a data content object by monitoring interactions between the client 102 and the ASP system 104 as the first user at the client 102 accesses a data content object through the ASP system 104. For example, as the client 102 requests an application controlled by the ASP system 104 to insert, move, delete, change, or otherwise access content in the data content object, the event module 402 can monitor such operation requests and detect event accordingly. For particular embodiments, the event module 402 may detect an event when an application remotely executing on behalf of the client 102 informs the event module 402 (or some other module of the ASP system 104) regarding operations being performed on content of the data content object at the request of the client 102. For instance, the application remotely executing on behalf of the client 102 may provide the event module 402 (or some other module of the ASP system 104) with a listing of such operations and/or changes resulting from such changes.

The capture module 404 may be configured to capture contextual information relating to the event detected by the event module 402, and to store the captured contextual information (e.g., indications for detected events) using the history buffer module 406. The contextual information can comprise user information, date information, time information, or location information in relation to the detected event. For some embodiment, the contextual information may comprise information provided by an application performing the action that results in the event. For example, where the application performing the action is one being controlled by the ASP system 104 and being executed on behalf of the first user at the client 102, the application may provide metadata relating to the action. In another example, the application may provide a listing of changes implemented to the data content object by the application at the request the first user at the client 102. The listing may comprise an array of changes implemented by the application, with the changes possibly being sorted according to time of implementation (e.g., oldest to most recent change). The application may provide such a listing of changes when the application is instructed (e.g., by the user at the client) to save the save/commit the changes implemented to the data content object to storage. As described herein, the saving or committing changes to the data content object to storage may involve uploading a resulting, changed data content object to a cloud-based storage service.

For some embodiments, the application may provide a listing of changes subsequent to the capture module 404 requesting such changes from the application (which may occur after an event has been detected). In this way, the capture module 404 may obtain an event indication and/or information by pulling information from the application. Additionally, in some embodiments, the application may provide a listing of changes to the capture module 404 without need for request by the capture module 404. In this way, the application can push an indication and/or information regarding an event to the capture module 404, possibly as the event is occurring at the application or soon after. Depending on the embodiment, the capture module 404 may receive event indications and/or information according to a schedule, based on satisfaction of certain conditions (e.g., occurrence of a specific type of event), or some combination thereof. It will be appreciated that the application may provide the capture module 404 with indications and/or information for events other than those relating to changes to a data content object.

In some embodiments, the event indications and/or information provided by an application to the capture module 404 may vary based on the features or capabilities of the application. For instance, the features or capabilities of a given application may determine the amount of information provided for events and/or for what event types the given application can provide an indication.

The capture module 404 may capture, and facilitate retention of, contextual information in relation to a data content object. As described herein, the retained contextual information can support various social productivity features provided by the ASP system 104, including those provided by the workspace module 214 or the dashboard module 216.

The history buffer module 406 may be configured to store contextual information captured by the capture module 404. Depending on the embodiment, the history buffer module 406 may maintain a separate history buffer for each data content object, a separate history buffer for each workspace, or an alternative configuration of history buffers (e.g., per a user interacting with a data content object). The history buffer module 406 may store contextual information for a data content object in a table (e.g., database table), where the table may have one or more of the following fields: file version field, operation sequence number field, object path field, operation field, operation data field, time field, user field, and change field.

The file version field may provide a modification time or a storage version number for the data content object relating to the contextual information being stored. The operation sequence number field may identify the historical version of the data content object relating to the contextual information being stored. The object path may provide a path (or some other identifier) to the data content object relating to the contextual information being stored. An example of the path may include "filename/section #/paragraph #" for a word processing document file, "filename/sheet #" for a spreadsheet document file, and "filename/slide #" for a presentation document file. The operation field may provide information identifying the operation performed on the data content object relating to the contextual information is being stored. Examples of operations that can be identified by the field can include insert, delete, change, read, and the like. The operation data field may provide data facilitating a redo operation, an undo operation, or some other complex operations with respect to the content of the data content object relating to the contextual information being stored. The time field may indicate the time for the event that resulted in the contextual information that being stored. The user field may indicate one or more users that caused the event relating to the contextual information that being stored. The change field may provide text, image, or some other type of content that presents or summarizes the effect (e.g., change), of the event, on the content of the data content object.

For some embodiments, some or all of the foregoing fields may facilitate operational transformations with respect to content of a data content objects associated with the contextual information. In various embodiments, some or all of the foregoing fields can be also used to uniquely identify a version of a data content object. For example, a unique object identifier can comprise an operation sequence number and an object path, which may facilitate use of the unique object identifier when accessing various versions of data content objects through the ASP system 104 (e.g., via the client 102 or via an API).

The history buffer module 406 may be configured to maintain and subsequently provide contextual information to support various social productivity features provided by the ASP system 104, including those provided by the workspace module 214 or the dashboard module 216. In various embodiment, the history buffer module 406 captures indications and/or information relating to various types of events that occur in association with a data content object.

For example, where the event is a change to the content of a data content object, the history buffer module 406 may store contextual information regarding the event a table having one or more of the following fields: a change type field, a position field, a summary field, a base version field, and a current version field. The change type field may indicate the type of content change (e.g., insert, update, delete, or move content) that occurred with respect to the data content object. The position field can provide data indicating the position in the content of the data content object where the change occurred. For some embodiments, such position information may be utilized when providing a reference to the location for the purposes of another user to traverse to the location. The summary field may provide a text-based description of the change implemented by the event. Depending on the embodiment, the description stored in the summary field may be user-defined, auto generated, or some combination thereof. The base version field may indicate previous version of the data content object before the change event. The current version field may indicate the version of the data content object immediately after the change event. In some embodiments, some or all of the foregoing fields may facilitate operational transformation with respect to content of data content objects relating to the change events.

In another example, where the data content object is a workspace object, the contextual information maintained may include events (e.g., changes) made to the workspace object and/or events that occur with respect to data content objects associated with the workspace object (e.g., change to a file or people object associated with a workspace corresponding to the workspace object).

The reference module 408 may be configured to provide a reference based on the contextual information, where the reference enables a second user (e.g., at another client) to traverse to a location in the data content object relating to the event. Once a reference is provided, it may be presented to the second user for review and/or traversal. For some embodiments, the reference may be a universal resource locator, or some other form of link, which when selected for traversal by a user at a client, can result in the ASP system 104 to instruct an application, being controlled by the ASP system 104 and being executed on behalf of the second user, to access the data content object and move to the location associated with the reference.

The traversal module 410 may be configured to receive a request from a second user (e.g., at another client) to traverse the reference to the location in the data content object relating to the event. In response to the request from the second user, the traversal module 410 may instruct an application to traverse to the location corresponding to the reference. For example, the second user can select to traverse the reference and cause the ASP system 104 to instruct an application, being controlled by the ASP system 104 and being executed on behalf of the second user, to access the data content object and move to the location referenced. Depending on the embodiment, the ASP system 104 may provide the second user with access to the application before, during, or after the traversal module 410 instructs the application to traverse to the location corresponding to the reference. Additionally, for some embodiments, the traversal module 410 may instruct the application through the use of one or more other modules of the ASP system 104 including, for example the access server module 204, the storage module 206, the virtualization module 208, and the application module 210.

Figure 5:
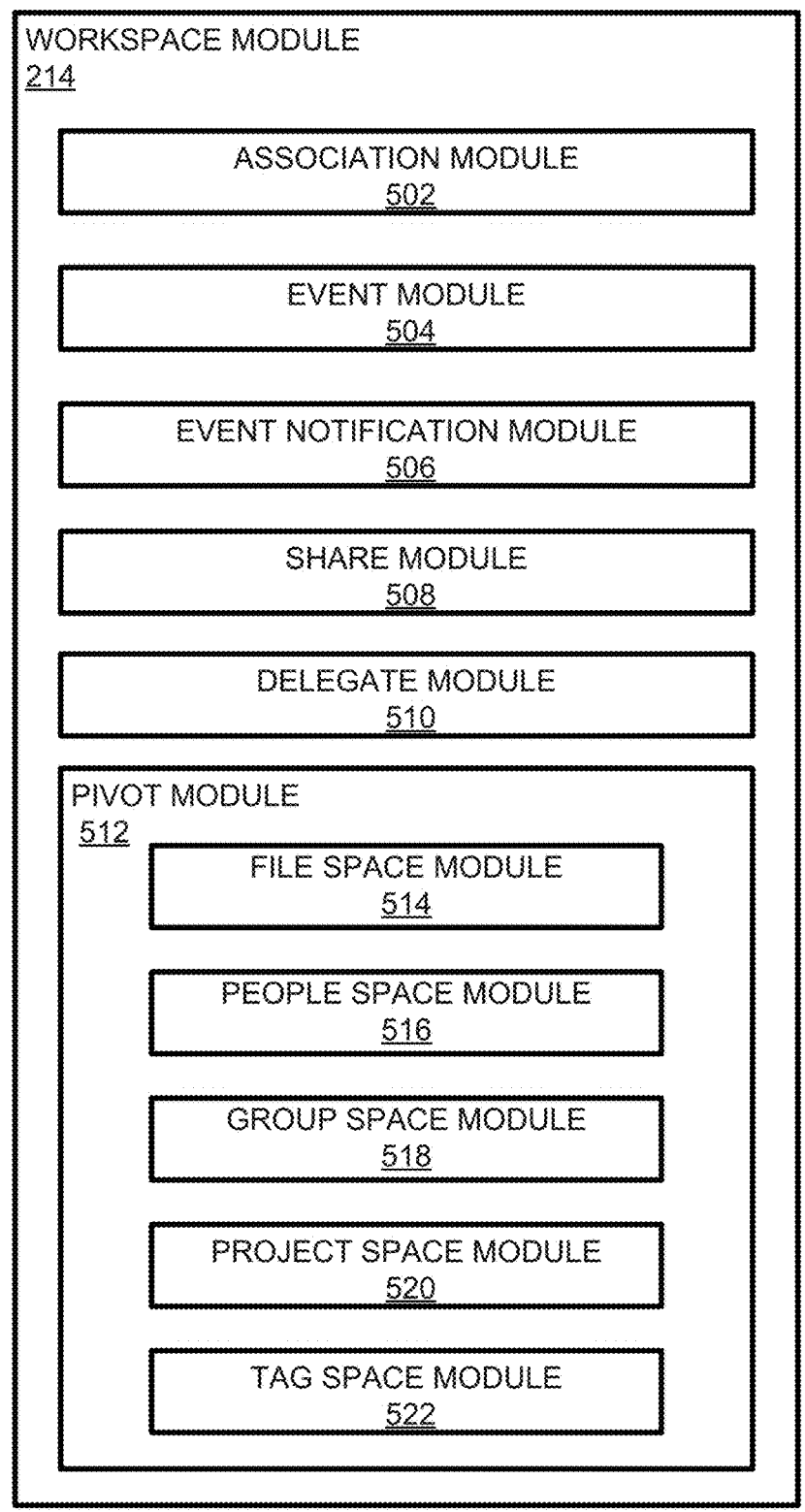
FIG. 5 is a block diagram illustrating an example workspace module that is part of an example system for supporting social productivity in accordance with various embodiments.

FIG. 5 is a block diagram illustrating an example workspace module 214 that is part of an example system for supporting social productivity in accordance with various embodiments. As shown, the workspace module 214 comprises an association module 502, an event module 504, an event notification module 506, a share module 508, a delegate module 510, and a pivot module 512.

The association module 502 may be configured to determine one or more users authorized and designated to receive a notification (e.g., from the event notification module 506) about events detected (e.g., by the event module 504) with respect to a data content object. Such a determination by the association module 502 may be based on association of the one or more users with the data content object. The association module 502 may be further configured to permit a user to associate a data content object, accessible through the ASP system 104, with workspace, or some other type of space. As described herein, a "workspace" can refer to a general space (e.g., system or user-created) that can hold all other types of spaces (e.g., file space, people space, group space, etc.), that can be associated with one or more data content objects of one or more types, and that can agnostically augment different types of data content objects accessed through the workspace. For some embodiments, workspaces can be associated with one or more users (e.g., through workspace sharing), and can be associated such that the users can have varying levels of access to data content objects accessible through the workspace. When accessing a workspace, a user can choose to access a data content object associated with the workspace, and the workspace may augment such access with contextual information historically gathered in relation to the data content object.

The event module 504 may be configured to detect an event that occurred with respect to the data content object. The event may be one resulting from an action performed on the data content object through the ASP system 104 at a request of a first user at the client 102. Additionally, the first user may be associated with the workspace.

As described herein, an event can comprise: an operation being performed on content of the data content object being accessed the ASP system 104 (e.g., reading, creating, modifying, removing, inserting, and moving content): creating, removing, uploading, or downloading the data content object through the ASP system 104; a user sharing the data content object with another user through the ASP system 104; or associating or disassociating the data content object to a workspace or a tag through the ASP system 104. Events can comprise a temporal-oriented, location-oriented, or relationship-oriented change for the data content object.

As also described herein, the event module 504 may detect an event with respect to a data content object by monitoring interactions between the client 102 and the ASP system 104 as the first user at the client 102 accesses a data content object through the ASP system 104. For example, as the client 102 requests an application controlled by the ASP system 104 to insert, move, delete, change, or otherwise access content in the data content object, the event module 504 can monitor such operation requests and detect event accordingly. Additionally, the event module 504 may detect an event when an application remotely executing on behalf of the client 102 informs the event module 504 (or some other module of the ASP system 104) regarding operations being performed on content of the data content object at the request of the client 102. For instance, the application remotely executing on behalf of the client 102 may provide the event module 504 (or some other module of the ASP system 104) with a listing of such operations and/or changes resulting from such changes.

The event notification module 506 may be configured to provide a notification for a data content object in connection with the event detected by the event module 504 (e.g., provide a data-content-object event notification). In some embodiments, providing a notification in connection with the event detected by the event module 504 may involve the event notification module 506: selecting one or more particular events in the history buffer (e.g., the history buffer module 406) for which notifications may be generated; and generating a data-content-object event notification identifying the one or more particular events performed on the first data content object.

In accordance with some embodiments, the notification provided by the event notification module 506 may include an event card comprising a unit of summarized information regarding the event in association with the data content object. Once generated, a card can be presented to a user through a workspace to inform them of an event in relation to a data content object. A card can comprise some or all of the contextual information captured in association with an event, a comment section configured to present or receive a comment in association with the event, or a secondary action (e.g., call of action) configured to be performed an operation with respect to the card at the request of the user perceiving the card (e.g., the percipient user). Some examples of secondary actions include, entering a comment in association with the first card (e.g., liking an event, liking an existing comment, or replying to a an existing comment); sharing the first card with another user, deferring presentation of the first card (e.g., defer based on time, date, or another event), assigning a task associated with the event to another user.

According to some embodiments, a card may generated according to a model comprising: an avatar image representing a user associated with an event; one or more users (e.g., actors) causing the event; a listing of one or more activities (e.g., verbs) relating to the event (e.g., "User 1 performed Activities A, B, and C"); an identifier for the data content object; a summary for the event; a comment entered in association with the event; secondary actions (e.g., calls to action) associated with the card (e.g., dismiss to archive card, defer card to another time, delete card, or accept card to indicate that card was accepted or otherwise acted upon); a date stamp for when the card was presented and/or when the event occurred; or noise controls configured to permit the user to adjust visibility of the current card and/or other cards. The summary of the event may include may include text, images or other content describing the event and may also include references/links to the location in the content relating to the event. Additionally, for some embodiments, the summary may be auto-generated by the event notification module 506 when the event notification module 506 provides the card in response to an event. The noise controls can adjust or bypass one or more criteria that determine which event cards are presented for a user and/or when certain events are presented to the user.

The share module 508 may be configured to share the workspace (or some other space) with the second user at the request of the first user. The sharing of the space or content to the second user can also result in the event module 504 detecting the share event and/or the event notification module 506 issuing a notification relating to the share event.

The share module 508 may be further configured to share at least a portion of content in the data content object with another user at the request of the first user. For some embodiments, the sharing of a space or content of the data content object can result in the second user being granted some level of access to the shared space or content, possibly where such access did not already exist. For example, where a first user shares a portion of content with a file object with a second user, the first user may provide the second user with some level of access to the shared content portion. For instance, the second user may be provided with read and/or write access to only the shared portion of the file object, or read access to all content of the file object but read and write access to the shared portion of the file object. In a further example, where a share event provides the second user with some level of editing access to a data content object, edits performed under such level of access may be maintained in a separate version associated with the user, and may be incorporated into the original version after approval by another user (e.g., the first user and/or the user owning the data content object).

Further, the sharing of the space or content to the second user can result in the second user being associated with the space or content. Based on such an association, the second user may begin to receive cards relating to events that occur with respect to the shared space or content. When the first user shares a space or content of the data content object with the second user, the first user can implement access limitations that can govern the second user's access to the space or content, including limitations that determine whether the second user can share the shared space or content with a third user.

The delegate module 510 may be configured to delegate a task to another user (e.g., the second user) in association with at least a portion of content in the data content object. For some embodiments, the delegation of the task may result in the other user receiving the task (e.g., description, sender, etc.) and a copy of the portion of content associated with the task. In response to the task, the other user may subsequently access the copied portion in accordance with the task and/or perform an action with respect to the task. For some embodiments, the response may comprise an action with respect to the task, such as acceptance, rejection, completion or deferment of the task. The response may also comprise the copied content portion as revised by the other user, where the copied content portion as revised is intended to replace portion of the content associated with the task.

Subsequently, the delegate module 510 may receive the response to the task from the other user (e.g., the second user), and act according to the response received. Where the response comprises an action with respect to the task, the first user's status of the task will be updated accordingly. Where the response comprises content (e.g., copied content portion as revised), the delegate module 510 may integrate the content from the response into the portion of content associated with the task, possibly by replacing the original portion of content with the content from the response.

When a first user delegates a task to another user in association with a portion of content in a data content object, the other user may be limited to providing a response for only that portion of content. The integration of the response into the corresponding portion may only affect the portion associated with the task.

For some embodiment, the delegation of the task by the delegate module 510 may result in the other user receiving the task (e.g., description, sender, etc.) and a share to the portion of content associated with the task. Accordingly, when the other user accesses the shared portion of content, the first user may be informed of such access. Additionally, when the other user accesses the shared portion of content and performs changes on the shared portion of content, such changes may be instantly reflected in the content of the data content object. As discussed herein, when a share to a portion of content in a data content object is provided to another user through the delegate module 510, the share may have limitations that restrict the other user's access to the shared portion and/or to the remainder of the content of the data content object.

Upon receiving a form of response, the workspace module 214 may inform the first user at the client 102 regarding the response received from the other user (e.g., the second user). Where the response is integrated into the original portion of the content associated with the task, the workspace module 214 may further inform the first user of the integration.

As described herein, the first user at the client 102 can choose to access one or more data content objects through the perspective of spaces associated with different types of data content objects (e.g., file space, people space, group space, project space, tag space, etc.). The pivot module 512 may be configured to pivot between spaces being provided to the client 102 according to the type of data content object being accessed. For example, when a user chooses to access a collection of different types of data content objects through the perspective of a single workspace, the pivot module 512 can pivot from a workspace to a specific space when the user selects a data content object associated with the space (e.g., pivot to file space when a data content object that is a file is selected by the first user). Using the pivot module 512, the first user can also choose to pivot between a specific space and a general workspace. As shown, the pivot module 512 comprises a file space module 514 configured to access data content objects that are files, a people space module 516 configured to access data content objects relating to people, a group space module 518 configured to access data content objects relating to groups of people, a project space module 520 configured to access data content objects relating to a project, and a tag space module 522 configured to access data content objects relating to tags. Those skilled in the art will appreciate that other spaces may be included in various embodiments for other types of data content objects, including new spaces for data space object created by third-party providers.

Figure 6:
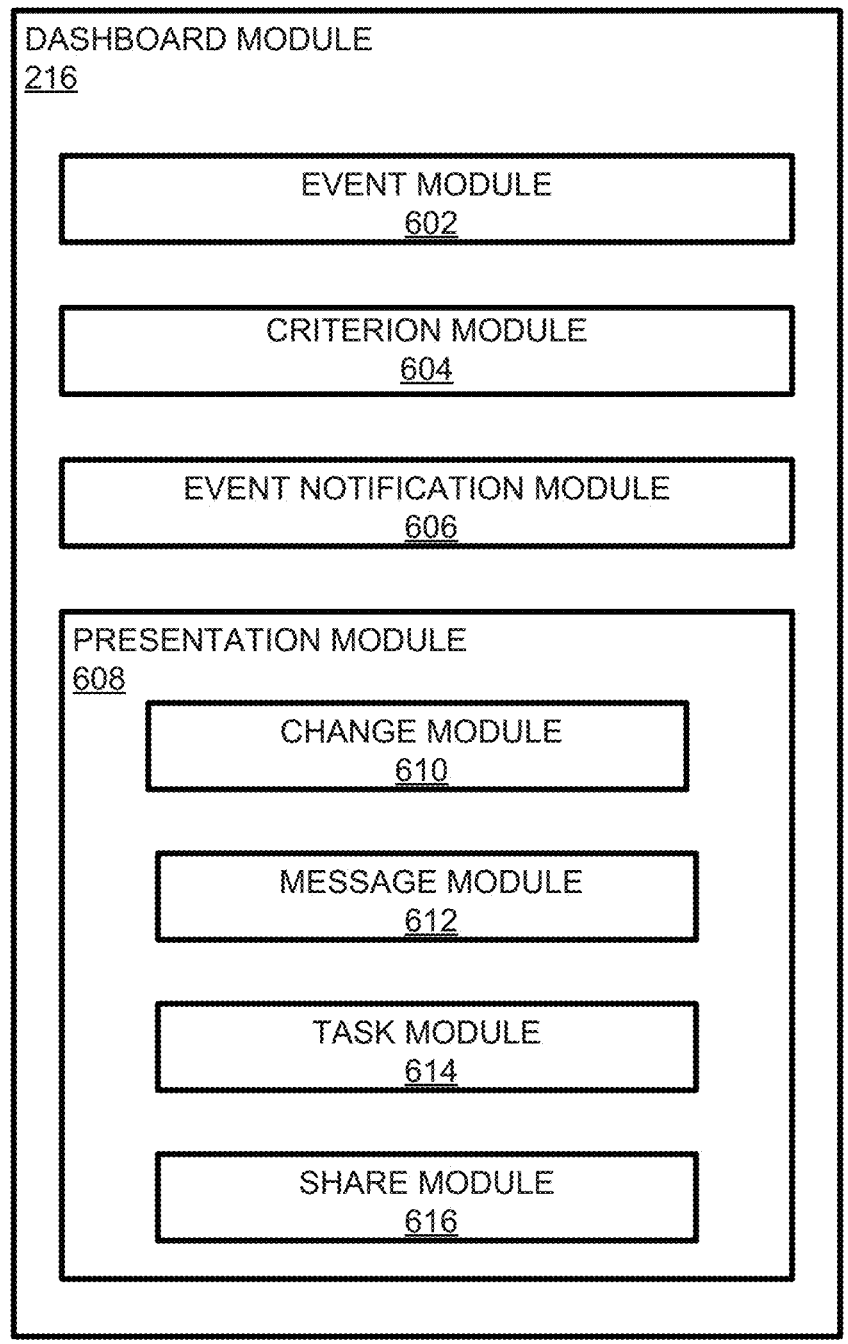
FIG. 6 is a block diagram illustrating an example dashboard module that is part of an example system for supporting social productivity in accordance with various embodiments.

FIG. 6 is a block diagram illustrating an example dashboard module 216 that is part of an example system for supporting social productivity in accordance with various embodiments. As described herein, a dashboard can be included with a workspace and can be configured to assist users in productively navigating issues and items of relevance regarding data content objects access through the workspace, for example to create, present, publish or share content in data content objects (e.g., documents, spreadsheets and presentations). As shown, the dashboard module 216 comprises an event module 602, a criterion module 604, an event notification module 606, and a presentation module 608, which enable the dashboard module 216 to provide or otherwise facilitate presentation of a dashboard in association with a workspace.

The event module 602 may be configured to detect an event that occurred with respect to the data content object. The event may be one resulting from an action performed on the data content object through the ASP system 104 at a request of a first user at the client 102. As described herein, an event can comprise: an operation being performed on content of the data content object being accessed the ASP system 104 (e.g., reading, creating, modifying, removing, inserting, and moving content): creating, removing, uploading, or downloading the data content object through the ASP system 104; a user sharing the data content object with another user through the ASP system 104; or associating or disassociating the data content object to a workspace or a tag through the ASP system 104. Events can comprise a temporal-oriented, location-oriented, or relationship-oriented change for the data content object.

As described herein, the event module 602 may detect an event with respect to a data content object by monitoring interactions between the client 102 and the ASP system 104 as a first user at the client 102 accesses a data content object through the ASP system 104. For example, as the client 102 requests an application controlled by the ASP system 104 to insert, move, delete, change, or otherwise access content in the data content object, the event module 602 can monitor such operation requests and detect event accordingly. Additionally, the event module 602 may detect an event when an application remotely executing on behalf of the client 102 informs the event module 602 (or some other module of the ASP system 104) regarding operations being performed on content of the data content object at the request of the client 102. For instance, the application remotely executing on behalf of the client 102 may provide the event module 602 (or some other module of the ASP system 104) with a listing of such operations and/or changes resulting from such changes.

The criterion module 604 may be configured to determining whether an attribute of the first event satisfies a criterion. For example, the criterion module 604 may determine whether the one or more particular event indications satisfy a threshold condition permitting notification (e.g., before the event notification module 606 generates an data-content-object event notification). As described herein, an attribute of the event evaluated for a criterion can include, for example, attributes of the data content object relating to the event (e.g., type of data content object, size, owner, date created, date modified, etc.), the type of event, the time of the event, the date of the event, the user causing the event, the identity of the application involved in the event, and the type of application involved in the event.

To determining whether an attribute of the first event satisfies a criterion, the criterion module 604 may first identify the criterion by which the attribute is evaluated. According to some embodiments, the criterion may be identified according to a second user currently accessing the dashboard and reviewing the event cards being presented by the dashboard. In some embodiments, the identification of the criterion can be based on the preferences or user settings of the second user or the user second user's past activities with respect to data content objects accessible through the ASP system 104.

Though the example of FIG. 6 is generally described in terms of a single event attribute and a single criterion, those skilled in the art will appreciate various embodiments may involve two or more event attributes and/or two or more criteria. Additionally, though the one or more criteria used by the criterion module 604 may be identified based on the second user, it should be understood that one or more criteria used by the criterion module 604 may be identified by default (e.g., one or more criteria applied system-wide) and/or by other factors (e.g., current system load).

Through one or more criteria, the criterion module 604 can implement one or more threshold conditions (e.g., based on time, date, count of event, type of event, frequency of event, etc.) for determining relevancy of data content objects and events when presenting related event cards on a dashboard.

In one example, a threshold condition may be defined by or evaluated according to a numerical value that controls the granularity of the threshold condition. For example, for a numerical value that ranges between 1 and 10, a numerical values closer to 1 can cause the threshold condition to be adjusted such that the dashboard module 216 presents more events regarding data content objects, and a numerical values closer to 10 can cause the threshold condition to be adjusted such that the dashboard module 216 presents less events regarding data content objects.

Additionally, certain threshold conditions can be evaluated by the criterion module 604 from the perspective of the second user. For example, a threshold condition, implemented by criteria, may define such user-based relevancy conditions as: did the second user recently create the data content object, did the second user recently change the data content object; has the second user commented on the data content object; has the second user reviewed the content of the data content object; or has the second user collaboratively worked with another user that has changed or otherwise accessed the data content object. Those skilled in the art would understand that other threshold condition, particular those from the perspective of the second user, are also possible.

Where the criterion module 604 determines the attribute of the event satisfies the criterion, the event notification module 606 may provide a notification for a data content object in connection with an event detected by the event module 602 (e.g., provide a data-content-object event notification). In accordance with some embodiments, the notification provided by the event notification module 606 may include a first event card (hereafter, "first card") relating to the event and configured to be presented to the second user at a second client. As described herein, "card" and "event card" can refer to a unit of summarized information regarding an event in association with a data content object. Once generated, a card can be presented to a user through a dashboard to inform them of an event in relation to a data content object. A card can comprise some or all of the contextual information captured in association with an event, a comment section configured to present or receive a comment in association with the event, or a secondary action (e.g., call of action) configured to be performed an operation with respect to the card at the request of the user perceiving the card (e.g., the percipient user). Some examples of secondary actions include, entering a comment in association with the first card (e.g., liking an event, liking an existing comment, or replying to a an existing comment); sharing the first card with another user, deferring presentation of the first card (e.g., defer based on time, date, or another event), and assigning a task associated with the event to another user.

According to some embodiments, a card may generated according to a model comprising: an avatar image representing a user associated with an event; one or more users (e.g., actors) causing the event; a listing of one or more activities (e.g., verbs) relating to the event (e.g., "User 1 performed Activities A, B, and C"); an identifier for the data content object; a summary for the event; a comment entered in association with the event; secondary actions (e.g., calls to action) associated with the card (e.g., dismiss to archive card, defer card to another time, delete card, or accept card to indicate that card was accepted or otherwise acted upon); a date stamp for when the card was presented and/or when the event occurred; or noise controls configured to permit the user to adjust visibility of the current card and/or other cards. The summary of the event may include may include text, images or other content describing the event and may also include references/links to the location in the content relating to the event. Additionally, for some embodiments, the summary may be auto-generated by the event notification module 606 when the event notification module 606 provides the card in response to an event. The noise controls can adjust or bypass one or more criteria that determine which event cards are presented for a user and/or when certain events are presented to the user.

In some embodiments, providing a notification in connection with the event detected by the event module 602 may involve: the event notification module 606 selecting one or more particular events in the history buffer (e.g., the history buffer module 406) for which notifications may be generated; the criterion module 604 determining whether the one or more particular event indications satisfy a threshold condition permitting notification; and the event notification module 606 generating a data-content-object event notification identifying the one or more particular events performed on the first data content object.

The presentation module 608 may be configured to present the first event card through a dashboard, where the dashboard is configured to present the second user with events relating to other data content objects in conjunction with the first event card. According to some embodiments, the dashboard may be provided to and accessed by any user at a client and currently accessing the ASP system 104. Additionally, as described herein, the dashboard may vary according to the user accessing the dashboard and one or more criteria associated with the user (which can determine the relevant event cards to be presented on the dashboard).

Depending on the embodiment, the presentation module 608 may present the dashboard through a graphical user interface (GUI) that enables various visual arrangements of event cards to be presented through the dashboard. For example, the presentation module 608 may be configured to visually arrange the event cards in the dashboard (e.g., tiling event cards, stack event cards, arranging event cards in columns or rows) according to card categories and/or relevance to the user perceiving the dashboard. As described herein, the criterion module 604 may determine what event cards are relevant for presentation on the dashboard by the presentation module 608.

As shown the presentation module 608 comprises a change module 610, a message module 612, a task module 614, and a share module 616, each of which can determine the event cards to be presented through the dashboard. The change module 610 may be configured to identify and present event cards relating to changes to data content objects relevant to the user accessing the dashboard. The message module 612 may be configured to identify and present event cards relating to electronic communication relevant to the user accessing the dashboard. The task module 614 may be configured to identify and present event cards relating to delegated tasks and data content objects relevant to the user accessing the dashboard. The share module 616 may be configured to identify and present event cards relating to shared data content objects relevant to the user accessing the dashboard. As described herein, relevancy of a data content object and/or an event can be determined in accordance with the one or more criteria imposed by the criterion module 604.

Figure 7:
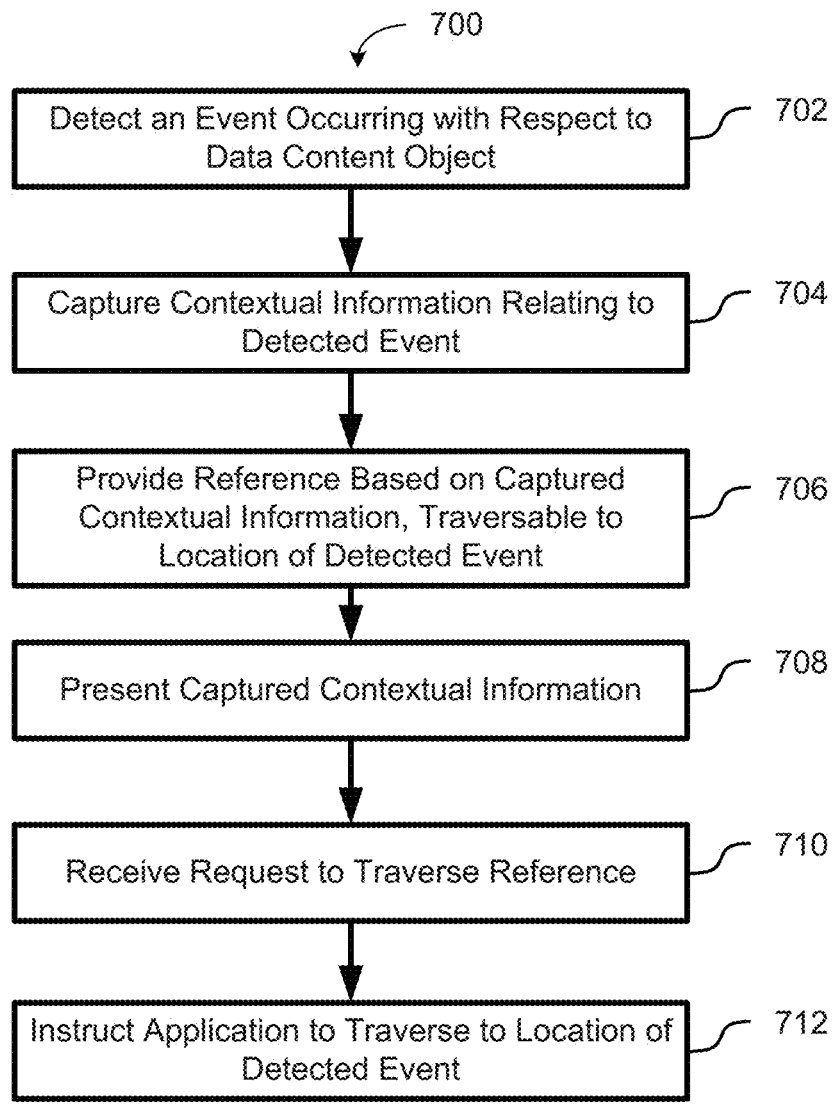
FIG. 7 is a flowchart illustrating an example method for providing context capture that supports social productivity in accordance with various embodiments.

FIG. 7 is a flowchart illustrating an example method 700 for providing context capture that supports social productivity in accordance with various embodiments. As shown, the method 700 can begin at step 702, with the event module 402 detecting an event that occurred with respect to a data content object accessible through the ASP system 104. The event may be one resulting from an action performed on the data content object through the ASP system 104 at a request of a first user at the client 102.

At step 704, the capture module 404 may be configured to capture contextual information relating to the event detected by the event module 402. According to some embodiments, the capture module 404 may store the captured contextual information using the history buffer module 406, which may subsequently provide contextual information upon request.

At step 706, the reference module 408 may be configured to provide a reference based on the contextual information, where the reference enables a second user (e.g., at another client) to traverse to a location in the data content object relating to the event.

At step 708, the ASP system 104 may present captured contextual information through an event card presented through a workspace being provided by the workspace module 214 or through a dashboard presented by the dashboard module 216. With the contextual information, the reference provided by the reference module 408 may be presented in the event card, thereby permitting the second user to select the reference for traversal to the event location.

At step 710, the traversal module 410 may be configured to receive a request from the second user (e.g., at another client) to traverse the reference to the location in the data content object relating to the event. In response to the request from the second user, at step 712, the traversal module 410 may instruct an application to traverse to the location corresponding to the reference. For example, the second user can select to traverse the reference and cause the ASP system 104 to instruct an application, being controlled by the ASP system 104 and being executed on behalf of the second user, to access the data content object and move to the location referenced. Depending on the embodiment, the ASP system 104 may provide the second user with access to the application before, during, or after the traversal module 410 instructs the application to traverse to the location corresponding to the reference. Additionally, for some embodiments, the traversal module 410 may instruct the application through the use of one or more other modules of the ASP system 104 including, for example the access server module 204, the storage module 206, the virtualization module 208, and the application module 210.

Though the steps of method 700 may be depicted and described in a certain order, those skilled in the art will appreciate that the order in which the steps are performed may vary between embodiments. Additionally, those skilled in the art will appreciate that the components described above with respect to the method 700 are merely examples of components that may be used with the method 700, and that other components may also be utilized in some embodiments.

Figure 8:
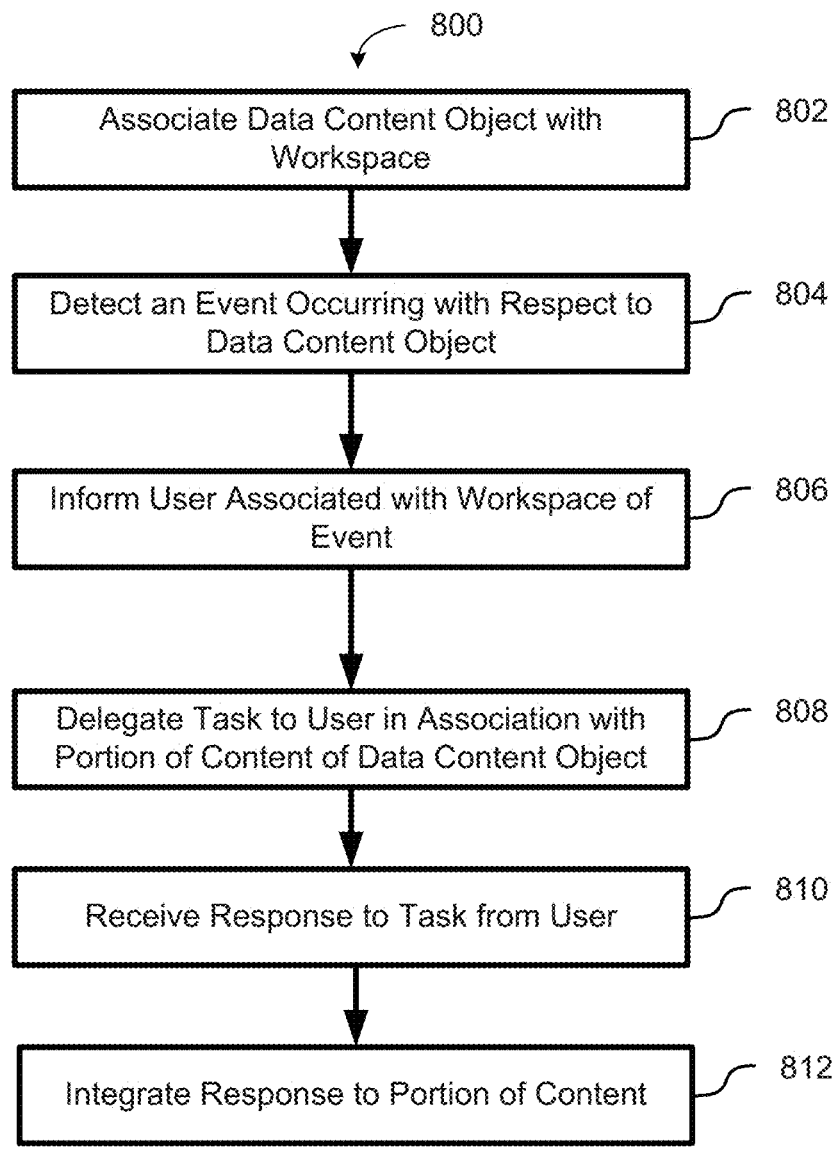
FIG. 8 is a flowchart illustrating an example method for a workspace that supports social productivity in accordance with various embodiments.

FIG. 8 is a flowchart illustrating an example method 800 for a workspace that supports social productivity in accordance with various embodiments. As shown, the method 800 can begin at step 802, with the association module 502 associating a data content object, accessible through the ASP system 104, with workspace, or some other type of space.

At step 804, the event module 504 may detect an event that occurred with respect to the data content object. The event may be one resulting from an action performed on the data content object through the ASP system 104 at a request of a first user at the client 102. Additionally, the first user may be associated with the workspace of step 802.

At step 806, the event notification module 506 may be configured to inform a second user associated with the workspace regarding the event detected by the event module 504. According to some embodiments, the second user may be associated with the workspace when the share module 508 shares the workspace with the second user, possibly based on a request from the first user at the client 102. Additionally, for some embodiments, the event notification module may inform the second user of the detected event by providing an event card relating to the event detected by the event module 504.

At step 808, the delegate module 510 may be configured to delegate a task to another user (e.g., the second user) in association with at least a portion of content in the data content object. For some embodiments, the delegation of the task may result in the other user receiving the task (e.g., description, sender, etc.) and a copy of the portion of content associated with the task. In response to the task, the other user may subsequently access the copied portion in accordance with the task and/or perform an action with respect to the task. For some embodiments, the response may comprise an action with respect to the task, such as acceptance, rejection, completion or deferment of the task. The response may also comprise the copied content portion as revised by the other user, where the copied content portion as revised is intended to replace portion of the content associated with the task.

At step 810, the delegate module 510 may receive the response to the task from the other user (e.g., the second user), and act according to the response received. Where the response comprises an action with respect to the task, the first user's status of the task will be updated accordingly. Where the response comprises content (e.g., copied content portion as revised), at step 812, the delegate module 510 may integrate the content from the response into the portion of content associated with the task, possibly by replacing the original portion of content with the content from the response.

For some embodiment, the delegation of the task by the delegate module 510 (at step 808) may result in the other user receiving the task (e.g., description, sender, etc.) and a share to the portion of content associated with the task. Accordingly, when the other user accesses the shared portion of content, the first user may be informed of such access. Additionally, when the other user accesses the shared portion of content and performs changes on the shared portion of content, such changes may be instantly reflected in the content of the data content object. As discussed herein, when a share to a portion of content in a data content object is provided to another user through the delegate module 510, the share may have limitations that restrict the other user's access to the shared portion and/or to the remainder of the content of the data content object.

Though the steps of method 800 may be depicted and described in a certain order, those skilled in the art will appreciate that the order in which the steps are performed may vary between embodiments. Additionally, those skilled in the art will appreciate that the components described above with respect to the method 800 are merely examples of components that may be used with the method 800, and that other components may also be utilized in some embodiments.

Figure 9:
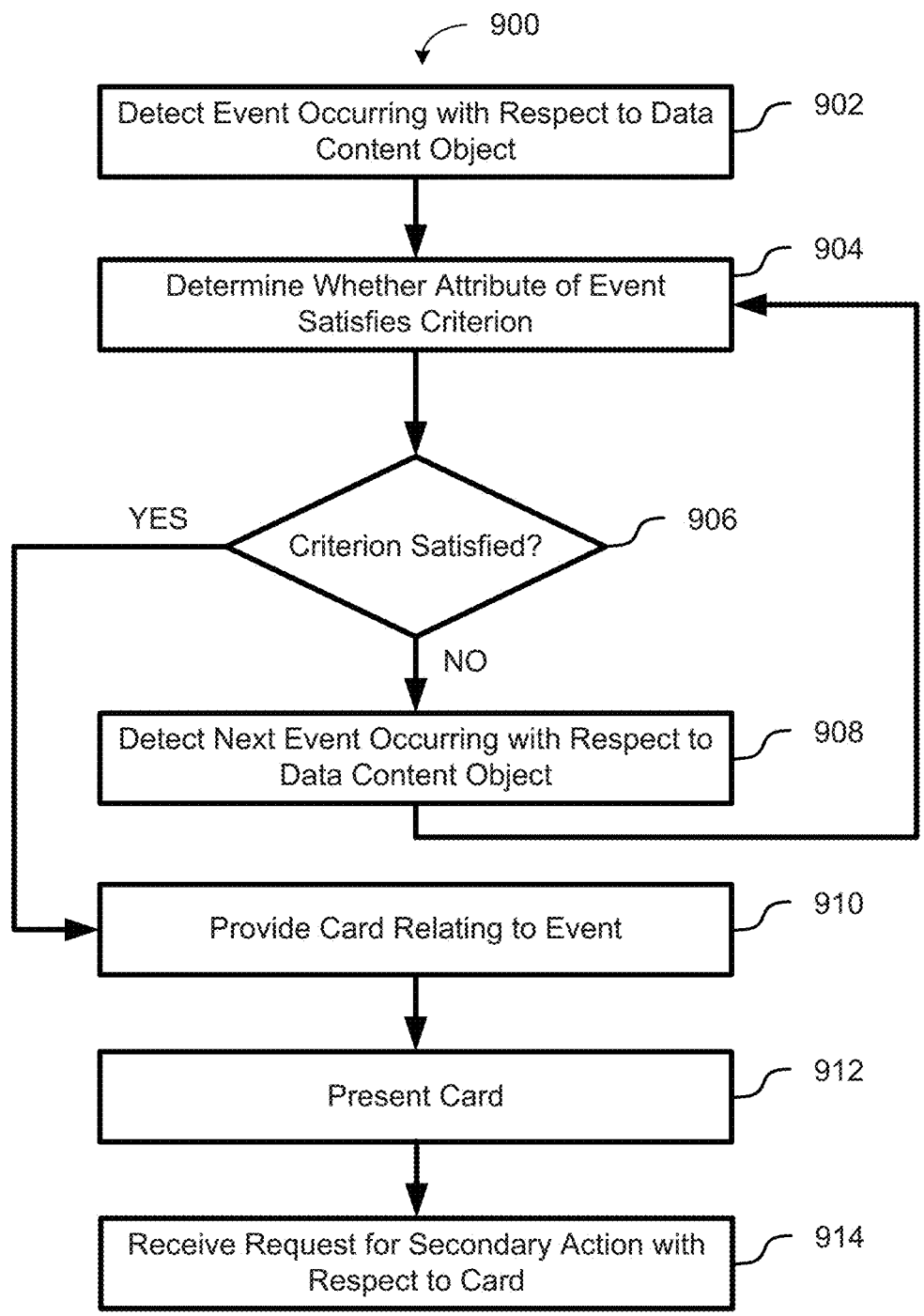
FIG. 9 is a flowchart illustrating an example method for a dashboard that supports social productivity in accordance with various embodiments.

FIG. 9 is a flowchart illustrating an example method 900 for a dashboard that supports social productivity in accordance with various embodiments. As shown, the method 900 can begin at step 902, where the event module 602 may detect an event that occurred with respect to the data content object. The event may be one resulting from an action performed on the data content object through the ASP system 104 at a request of a first user at the client 102.

At step 904, the criterion module 604 may determine whether an attribute of the first event satisfies a criterion. To determine whether an attribute of the first event satisfies a criterion, the criterion module 604 may first identify the criterion by which the attribute is evaluated. According to some embodiments, the criterion may be identified according to a second user currently accessing the dashboard and reviewing the event cards being presented by the dashboard. Additionally, in some embodiments, the identification of the criterion can be based on the preferences or user settings of the second user or the user second user's past activities with respect to data content objects accessible through the ASP system 104.

If, at decision point 906, the attributed is determined to not satisfy the criterion, the method 900 proceeds to step 908. At step 908, the event module 602 may detect a next event that occurred with respect to the data content object or another data content object. After step 908, method 900 can return to step 904.

If, at decision point 906, the attributed is determined to satisfy the criterion, the method 900 proceeds to step 910. At step 910, the event notification module 606 may provide a first card relating to the event and configured to be presented to the second user at a second client. At step 912, the presentation module 608 may present the first event card through a dashboard configured to present the second user with events relating to other data content objects in conjunction with the first event card. As described herein, a card can comprise some or all of the contextual information captured in association with an event, a comment section configured to present or receive a comment in association with the event, or a secondary action (e.g., call of action) configured to be performed an operation with respect to the card at the request of the user perceiving the card (e.g., the percipient user).

At step 914, the event notification module 606 may receive a request for a secondary action with respect to the first card and perform the request accordingly. Some examples of secondary actions include, entering a comment in association with the first card (e.g., liking an event, liking an existing comment, or replying to a an existing comment); sharing the first card with another user, deferring presentation of the first card (e.g., defer based on time, date, or another event), and assigning a task associated with the event to another user.

Though the steps of method 900 may be depicted and described in a certain order, those skilled in the art will appreciate that the order in which the steps are performed may vary between embodiments. Additionally, those skilled in the art will appreciate that the components described above with respect to the method 900 are merely examples of components that may be used with the method 900, and that other components may also be utilized in some embodiments.

Figure 10:
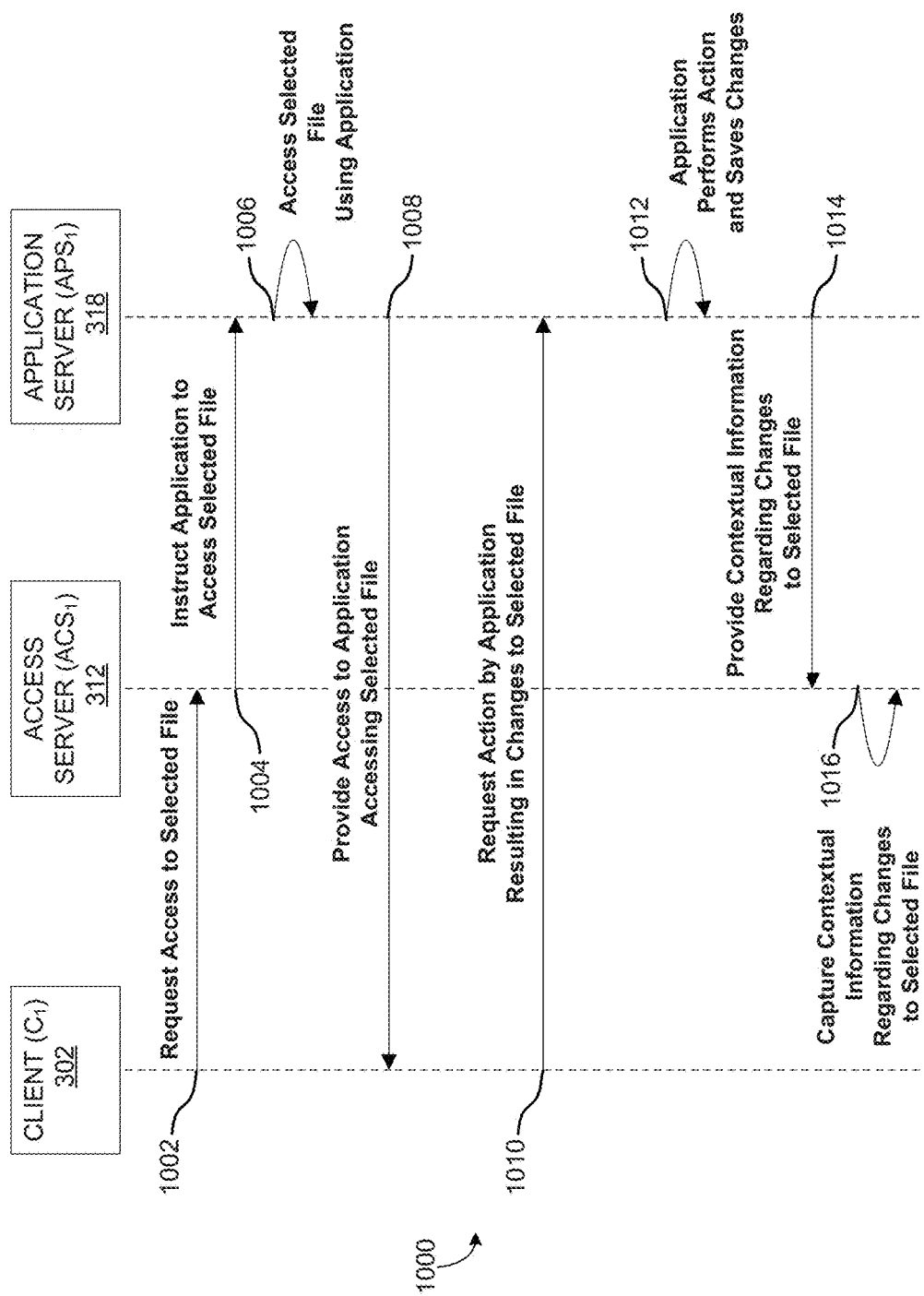
FIG. 10 is a flowchart illustrating an example method for capturing context information, from a virtualized application, that supports social productivity in accordance with various embodiments.

FIG. 10 is a flowchart illustrating an example method 1000 for capturing context information, from a virtualized application, that supports social productivity in accordance with various embodiments. For illustrative purposes, the method 1000 is depicted as involving the client ($C_1$) 302, the access server ($ACS_1$) 312, and the application server ($APS_1$) 318. In accordance with some embodiments, the method 1000 can be utilized by the ACS server 312 to gather activity regarding files, or other types of data content objects, being accessed by an application executing on the application server 318 on behalf of the client 302.

At step 1002, the client 302 may request the access server 312 for access to a selected file. Where an application compatible the selected file is not already executing, the access server 312 may arrange for an instantiation of an application the compatible with the selected file to be invoked on the application server 318. Once an application compatible with the file is executing on the application server 318 (hereafter, the executing application), at step 1004, the access server 312 may instruct the executing application access (e.g., open) the selected file.

In response the instruction, step 1006, the execution application on the application server 318 may access (e.g., open) the selected file. For some embodiments, the selected file may be accessed from a cloud-based storage service accessible by the executing application via the access server 312.

Subsequent to accessing the selected file, at step 1008, the application server 318 may provide the client 302 with access to the executing application. For some embodiments, the access by the client 302 to the executing application on the application server 318 may be facilitated through the access server 312.

At step 1010, the client 302 may request the executing application on the application server 318 to perform actions that result in change to the selected file. For some embodiments, the request from the client 302 to the executing application on the application server 318 may be facilitated through the access server 312.

At step 1012, the executing application on the application server 318 may perform the actions, requested by the client 302, on the selected file. The executing application may further save the changes that result in the selected file. The executing application may save the changes by saving a changed version of the selected file locally and then uploading the change version of the select file to the cloud-based storage service from which the selected file originated.

At step 1014, the executing application on the application server 318 may provide the access server 312 with contextual information regarding the changes to the selected file. The contextual information provided by the executing application may comprise a listing of the changes implemented to the selected file, the types of changes implemented, metadata resulting from the changes, and/or operational transformation information relating to the changes. In accordance with some embodiments, the contextual information may be provided to the access server 312 upon request of the access server 312. For some embodiments, the request may be facilitated by a function call compatible with the application server 318 and/or the executing application. The function call may be one from an application programming interface (API) compatible with the application server 318 and/or the executing application.

At step 1016, the access server 312 may capture the contextual information regarding the changes to selected file, which can include the contextual information received from the executing application on the application server 318. In accordance with some embodiments, the access server 312 may store and maintain the captured contextual information in a history buffer. The history buffer utilized may be one exclusively used for contextual information collected with respect to the selected file. Based on the contextual information captured, the access server 312 may cause an event card relating to the changes to be presented in the workspaces and dashboards of those users associated with the selected file.

Figure 11:
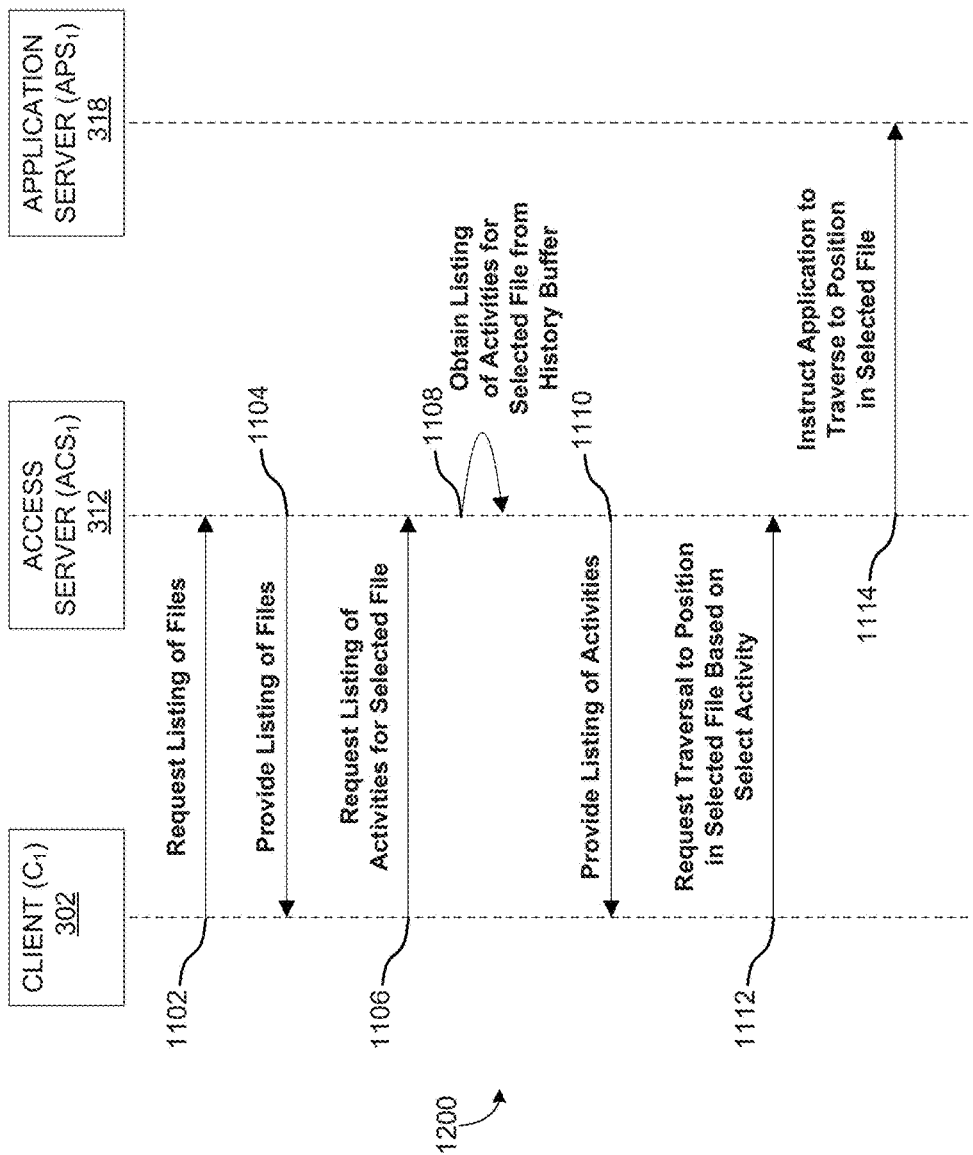
FIG. 11 is a flowchart illustrating an example method for traversing to a position related to an event in accordance with various embodiments.

FIG. 11 is a flowchart illustrating an example method 1100 for traversing to a position related to an event in accordance with various embodiments. For illustrative purposes, the method 1100 is depicted as involving the client ($C_1$) 302, the access server ($ACS_1$) 312, and the application server ($APS_1$) 318. In accordance with some embodiments, the method 1100 can be utilized by the ACS server 312 to traverse to a position in files, or another type of data content object, being accessed by an application executing on the application server 318 on behalf of the client 302. The positions in files can those relating to events that have occurred with respect to those files.

At step 1102, the client 302 may request a listing of files available for access through the access server 312. At step 1104, the access server 312 may provide the listing of files requested. At step 1106, the client 302 may request the access server 312 to provide a listing of activities for a file selected from the listing provided at step 1104. In response, at step 1108, the access server 312 may obtain a listing of activities, for the selected from, from the contextual information stored in association with the selected file. As described herein, the contextual information may be stored in a history buffer related to (e.g., dedicated to) the selected file.

Included in the listing of activities are positions in the content of the selected file relating to the listed activities. To ensure that the positions of the activities are accurate and current, during step 1108, the access server 312 may also utilize an operational transformation (OT) engine configured to update the position information contained in the listing of activities. According to some embodiments, the access server 312 facilitate this update, the access server 312 may fetch all activities and changes relating to the selected file, and pass all activities and changes to the OT engine. The OT engine may scan the activities and changes passed and update changes according to the OT engine logic. Subsequently, the OT engine may return the updated position information to the access server 312. According to some embodiments, where the client 302 is requesting a listing of activities for a certain section (e.g., page N) of the selected file rather than for the entirety of the selected file, the access server 312 may need to filter and provide the listing of activities accordingly, particularly after the OT engine has updated the position information.

At step 1110, the access server 312 may provide the client 302 with the listing of activities requested in relation to the selected file. The provided listing of activities can include, for example, information for positions in the selected file where activity occurred, a listing of changes that occurred in the selected file, and visualization of the changes that occurred in the selected file. For some embodiments, the position information provided in the listing of activities may be similar in function and/or structure to the references described herein.

At step 1112, based on the position information provided in the listing of activities, the client 302 may request the access server 312 to traverse to a position in the selected file relating to a select activity provided in the listing of activities. At step 1114, the access server 312 may respond by instruction the application executing on behalf of the client 302 to access the selected file and traverse to the position in the selected file.

Figure 12:
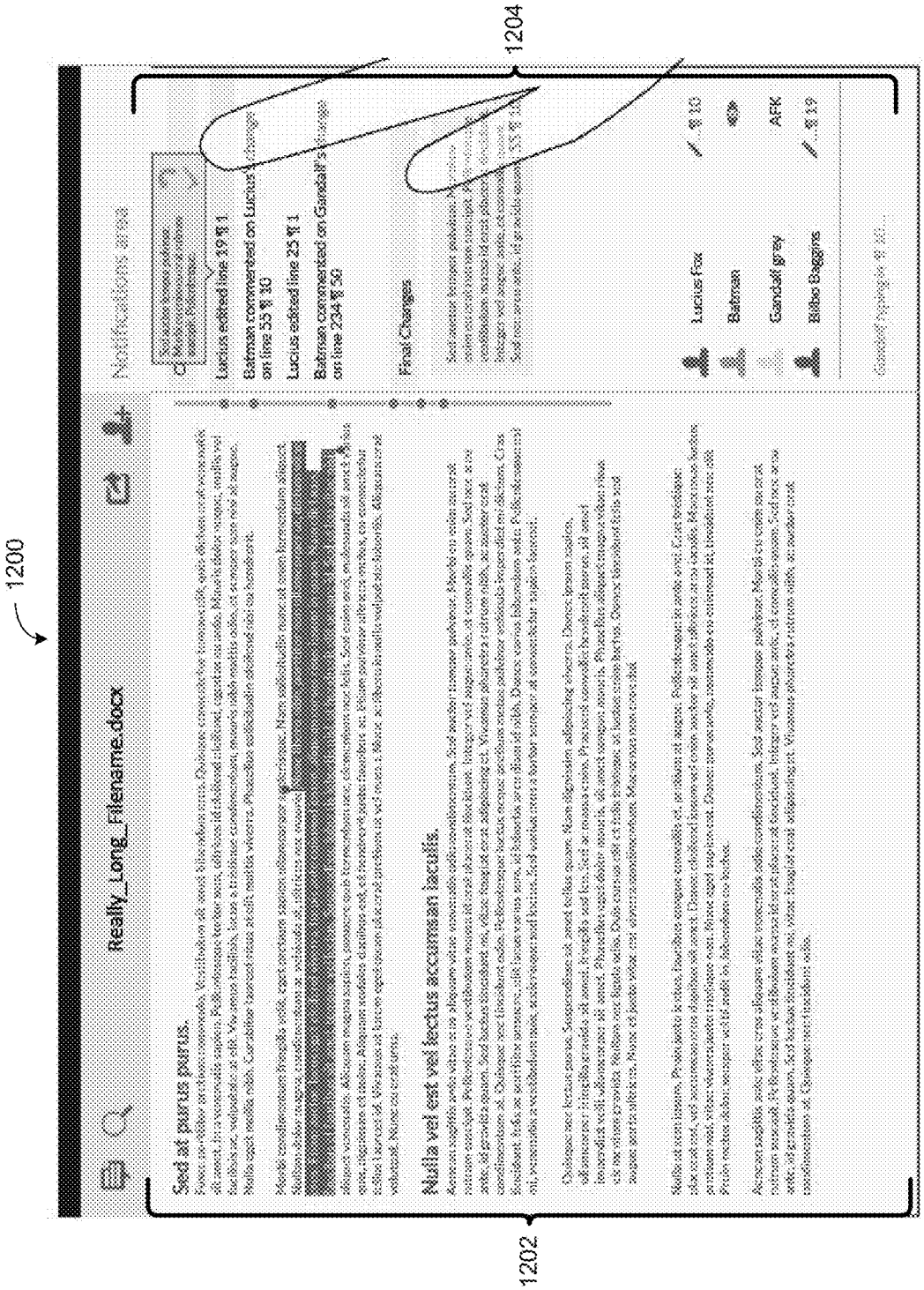
FIG. 12 is a screenshot of an example interface for accessing a data content object that is a file and presenting context in accordance with various embodiments.

FIG. 12 is a screenshot of an example interface 1200 for accessing a data content object that is a file and presenting context in accordance with various embodiments. As shown, the interface 1200 comprises a content pane 1202 for viewing content from the file. The access to content through content pane 1202 may be provided by an application remotely executing on behalf of a client (e.g., at the application server 318) and accessing the file on behalf of a user. Additionally, the interface 1200 comprises a context configured to provide contextual information in relation to the file being accessed through the content pane 1202. As shown, the interface 1200 may present various types of event cards and other notification that can provide the user with contextual information as the content is accessed. In this way, various embodiments can provide contextual information regarding a data content object while accessing content of the data content object. For some embodiments, the interface 1200 may be provided by a workspace while the file is being accessed through the ASP system 104.

Figure 13:
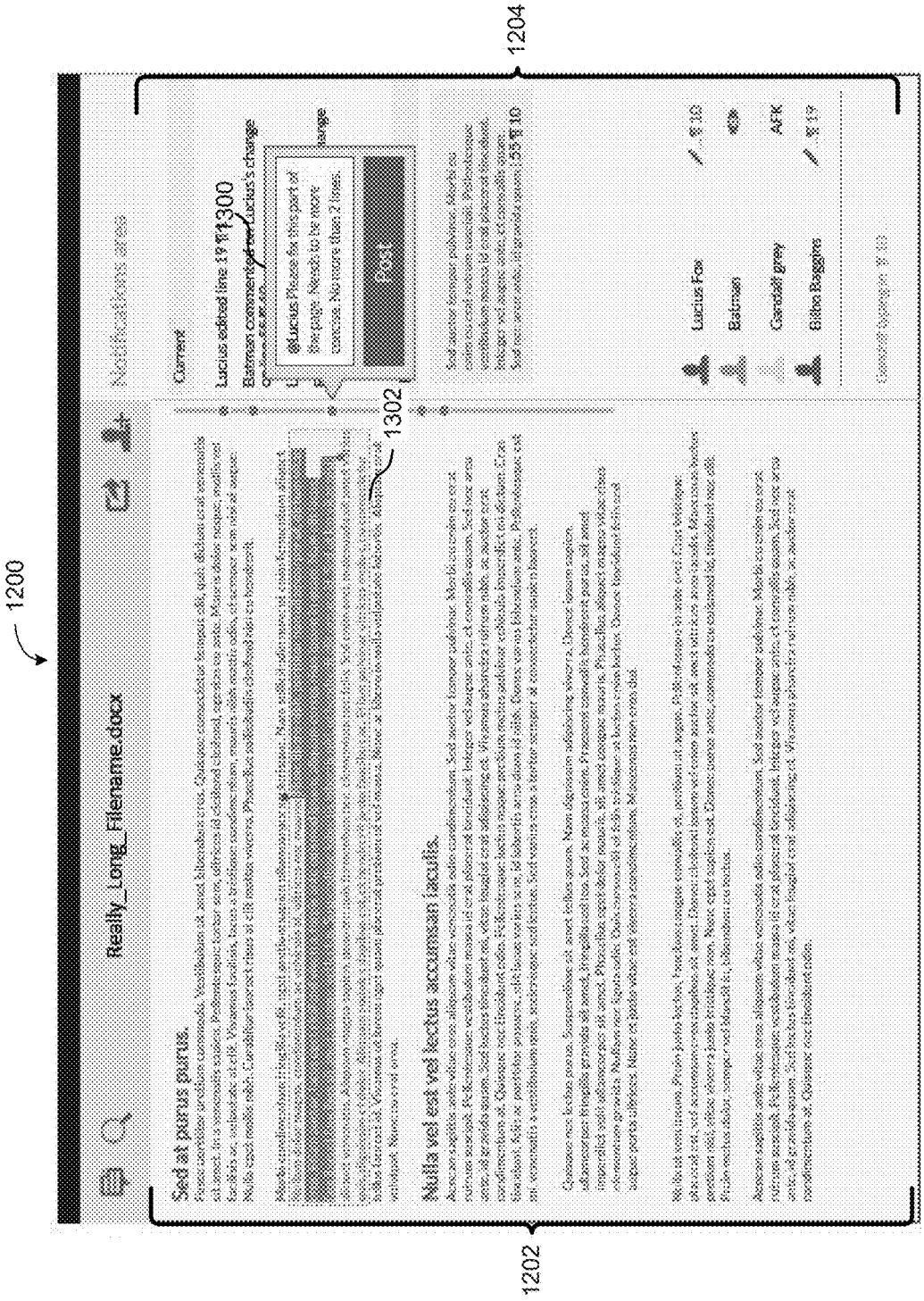
FIG. 13 is a screenshot of an example interface for accessing a data content object that is a file and presenting context in accordance with various embodiments.

FIG. 13, like FIG. 12, presents a screenshot of the interface 1200 accessing a data content object that is a file and presenting context in accordance with various embodiments. In FIG. 13, the interface 1200 is presenting a comment interface 1300, which may be configured receive and associate a comment with a portion 1302 of content contained in the file currently being accessed in the content pane 1202. In some embodiments, entering a comment through the comment interface 1300 may result in a comment being created, maintained, and associated with the file externally to content of the file and/or externally to the application being used to access the file through the content pane 1202. The comment created by the comment interface 1300 may be one stored and maintained by embodiments in the contextual information for the file being accessed through the content pane 1202.

Figure 14:
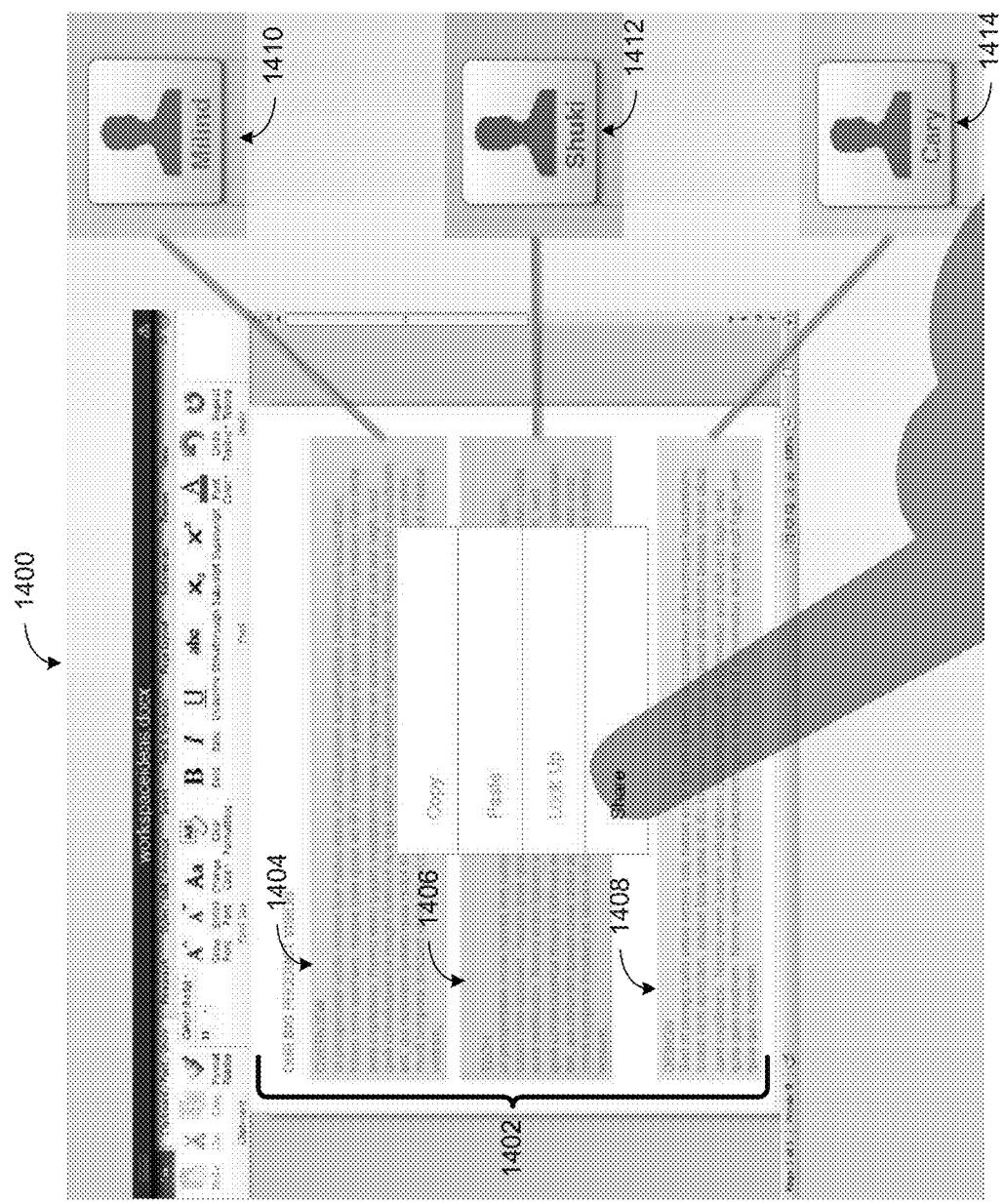
FIG. 14 is a screenshot of an example interface for accessing a data content object that is a file and for delegating portions of content of data content object in accordance with various embodiments.

FIG. 14 is a screenshot of an example interface 1400 for accessing a data content object that is a file and for delegating portions of content of data content object in accordance with various embodiments. As shown, through the interface 1400, a user can select portions of content being accessed through a content pane 1402. The user can then select to share various portions of the content in the content pane 1402 with one or more users. In FIG. 14 the user chose three different portions 1404, 1406, and 1408 of content in the file with three different users 1410, 1412, and 1414. In accordance with some embodiments, the user may share the different portions 1404, 1406, and 1408 in association with tasks relating to those portions. For example, the user may task each of users 1410, 1412, and 1414 with editing their respective, shared portions 1404, 1406, and 1408 of content. Additionally, for some embodiments, the user can utilize share different portions of content of a file such that the users receiving the share can use different means of access (e.g., word processing application, web-based word processing application, instant messaging, etc.) when accessing their respective shared portion.

Figure 15:
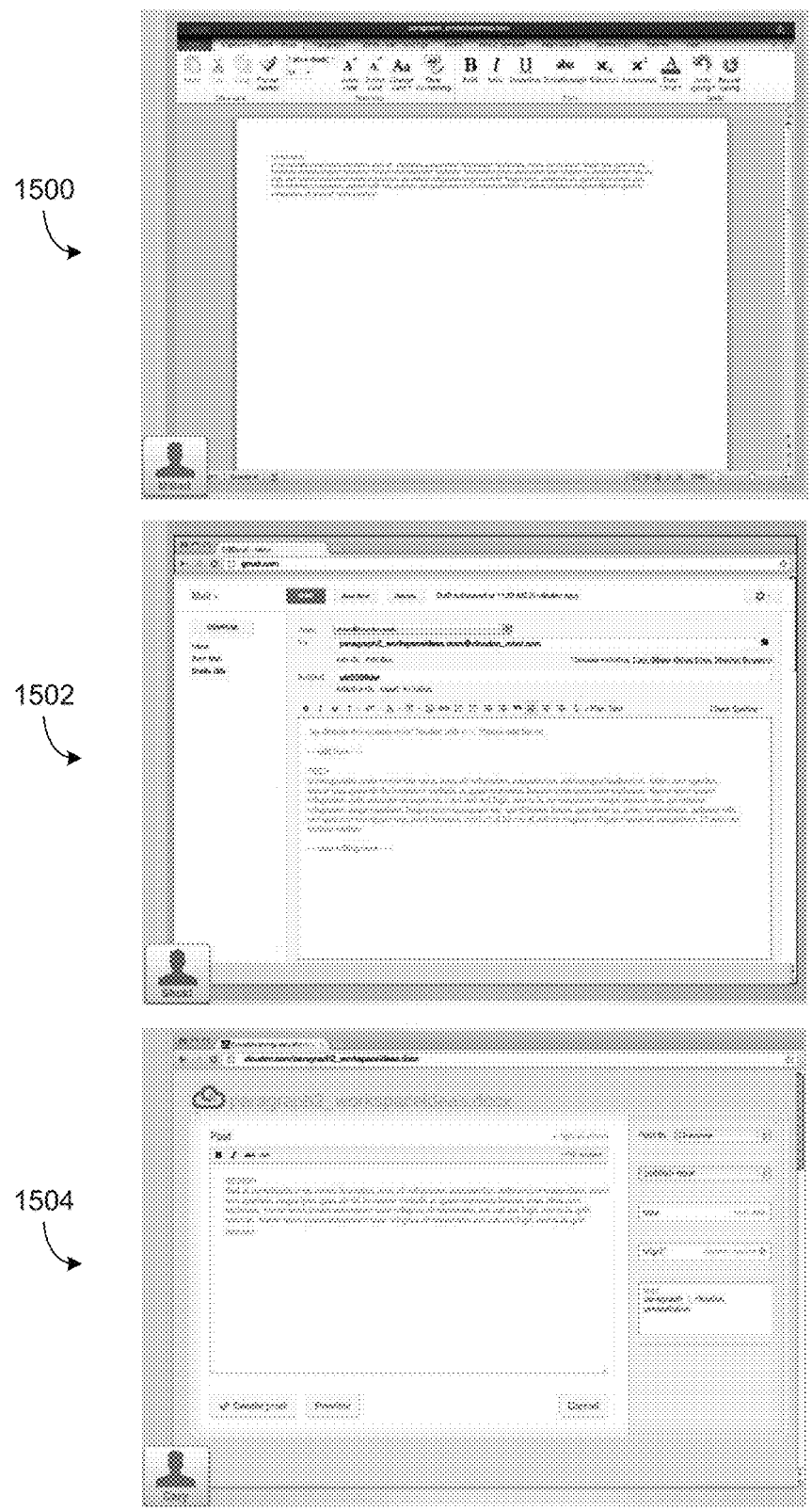
FIG. 15 provides screenshots of example interfaces for accessing shared portions of content of a data content object file that is a file in accordance with various embodiments.

FIG. 15 is a screenshots of example interfaces 1500, 1502, and 1504 each respectively accessing portions 1404, 1406, and 1408 of content shared by a user through the interface 1400 of FIG. 14. As shown, each of the interfaces 1500, 1502, and 1504 is access its respective portion using a different means of access. For example, the user of interface 1500 is accessing its shared portion 1404 through a word processing application. The user of interface 1502 is accessing its shared portion 1406 through a web-based e-mail account. The user of interface 1504 is access its shared portion 1408 through a web-based word processing interface. According to some embodiments, when the users of interfaces 1500, 1502, and 1504 individual save and submit changes to their respective shared portions, those changes will be integrated into and reflected by the original content of the file being accessed through the interface 1400.

Figure 16:
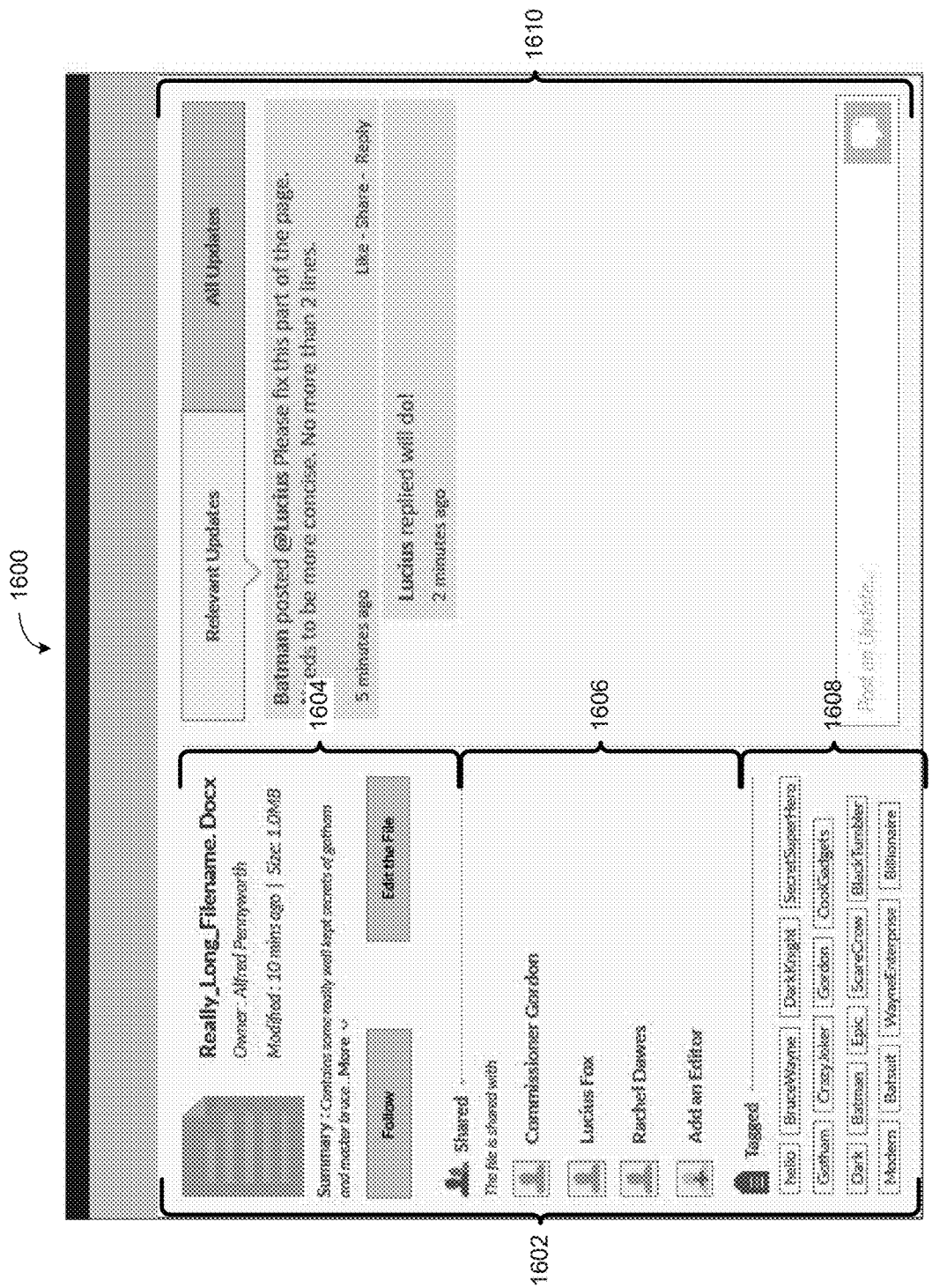
FIG. 16 is a screenshot of an example interface for accessing a space in association with a data content object that is a file in accordance with various embodiments.

FIG. 16 is a screenshot of an example interface 1600 for accessing a space in association with a data content object that is a file in accordance with various embodiments. As shown, the interface 1600 comprises a properties pane 1602 and an activity stream pane 1610 for the file being accessed through the interface 1600. The properties pane 1602 includes a section 1604 that provides general information regarding the file, such as filename, file owner, time since last modified, size of the file, and a summary of the file. The section 1604 also includes options that permit the user to access and edit the file, and follow the events relating to the file. In accordance with some embodiments, when a user selects to follow the file through interface 1600, events relating to the file may begin appearing in the user's dashboard and/or in spaces accessed by the user. The properties pane 1602 also includes a section 1606 that lists the users having shared access to the file, and a section 1608 that lists tags currently associated with the file.

The activity stream pane 1610 may be configured to present events (e.g., event cards) in relation to the file current being accessed through space represented by the interface 1600. As shown, the activity stream pane 1610 is presenting comments in relation to the file. In accordance with some embodiments, where references to data content objects are presented in association with events, selecting any of those references may result in the user traversing to the data content object and accessing the data content object through a space or an application capable of accessing the content of the reference data content object.

Figure 17:
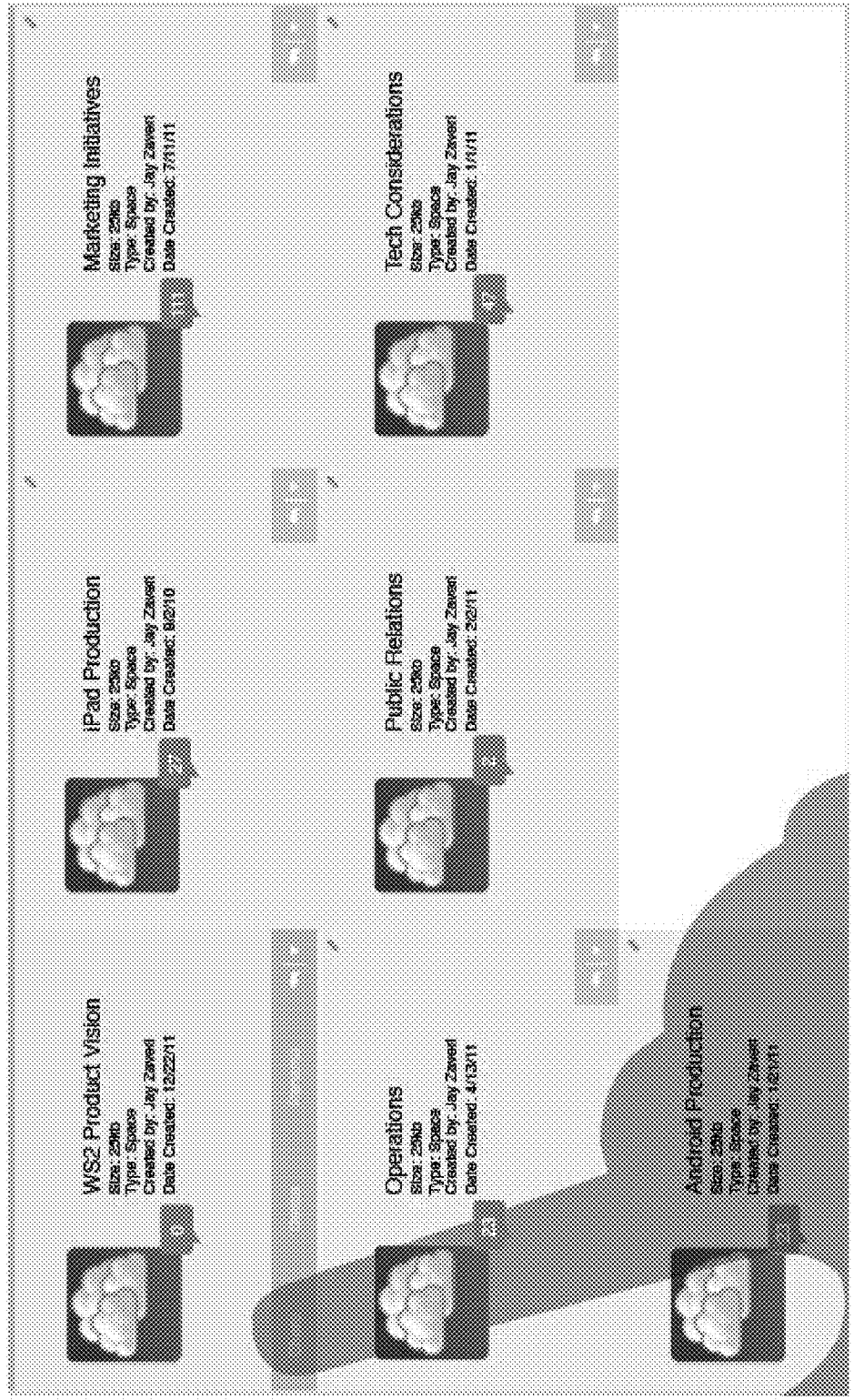
FIG. 17 is a screenshot of an example interface for accessing a listing of workspaces in accordance with various embodiments.
Figure 18:
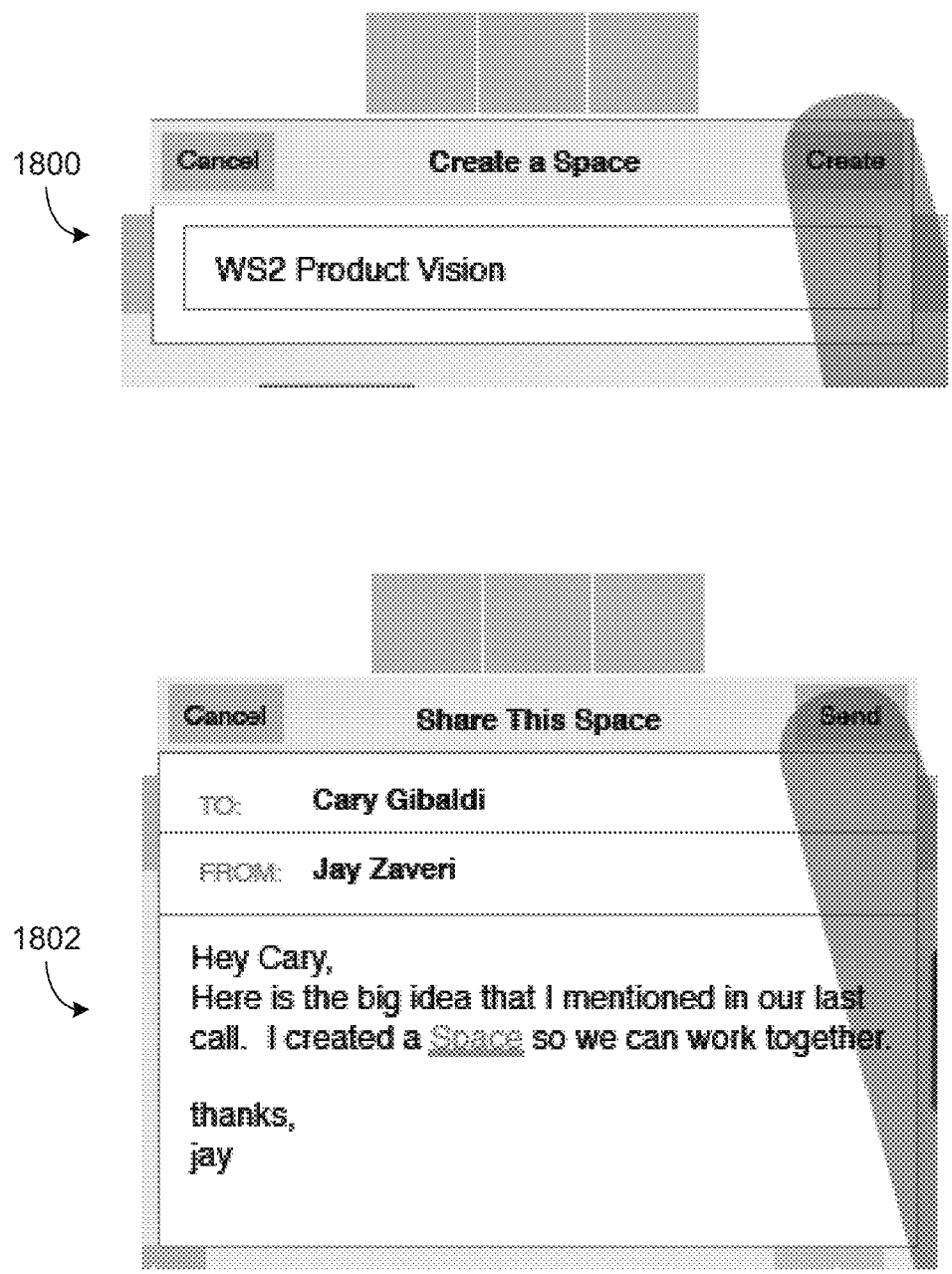
FIG. 18 provides screenshots of example interfaces for creating and sharing workspaces in accordance with various embodiments.

FIG. 17 is a screenshot of an example interface 1700 for accessing a listing of workspaces in accordance with various embodiments. As shown, the interface 1700 presents a listing of workspaces that a user can share, delete, rename, or access from the interface 1700. In accordance with some embodiments, selecting any one of the workspaces list can result in the user being provided with an interface that accesses the selected workspace. More regarding such an interface is discussed with respect to FIG. 19, which depicts an example interface for accessing a workspace in accordance with various embodiments. For some embodiments, the interface 1700 can enable a user to quickly create a new workspace organizing and facilitating collaborative efforts with respect to one or more data content objects (e.g., files). FIG. 18 provides a screenshot of an example interface 1800 for creating a new workspace, and provides a screenshot of an example interface 1802 for sharing an existing workspace with another user.

Figure 19:
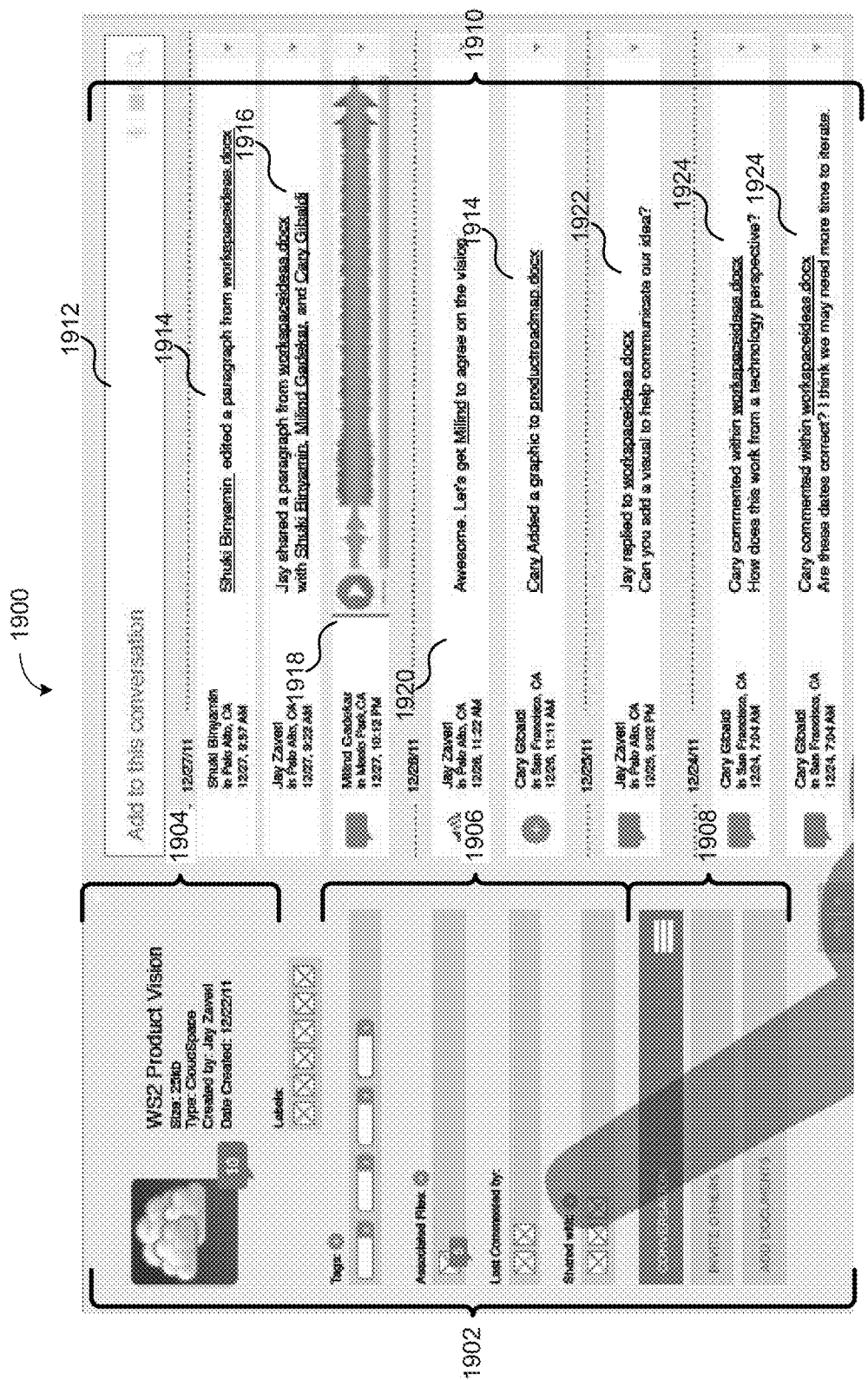
FIG. 19 is a screenshot of an example interface for accessing a workspace in accordance with various embodiments.

FIG. 19 is a screenshot of an example interface 1900 for accessing a workspace in accordance with various embodiments. As shown, the interface 1900 comprises a properties pane 1902 and an activity stream pane 1910 for the workspace being accessed through the interface 1900. The properties pane 1902 includes a section 1904 that provides general information regarding the workspace, such workspace name, cumulative data size of the data content objects associated with the workspace, the creator of the workspace, and the date of creation. The properties pane 1902 includes a section 1906 that lists tags associated with the workspace, files (or other types of data content objects) associated with the workspace, users that last commented regarding the workspace, and users having shared access to the workspace. The properties pane 1902 also includes a section 1908 that provides a user with an option view conversations regarding the workspace, an option to invite other users to the workspace (e.g., associating other users with the workspace), and an option to add other document to the workspace (e.g., associating other data content objects with the workspace).

The activity stream pane 1910 may be configured to present events (e.g., event cards) in relation to the workspace current being accessed through space represented by the interface 1900. Events relating to the workspace can include events relating to the users and/or data content objects (e.g., files) associated with the workspace). In FIG. 19, the activity stream pane 1910 is presenting a listing of events that includes: events 1914 relating to changes to files associated with the workspace; an event 1916 relating to a paragraph of a file, associated with the workspace, being shared with multiple users; an event 1918 relating to an audio comment being posted in association with the workspace; an event 1920 regarding a comment being posted in association with the workspace; an event 1922 relating to a conversation (e.g., e-mail or instance message) reply sent in association with the workspace; and events 1924 regarding to comments created within a file associated with the workspace.

The user may add to the conversation by leaving a text, audio, or video message through field 1912 of the interface 1900. Additionally, as shown, the listing of events includes one or more references to access other data content objects references in the events.

Figure 20:
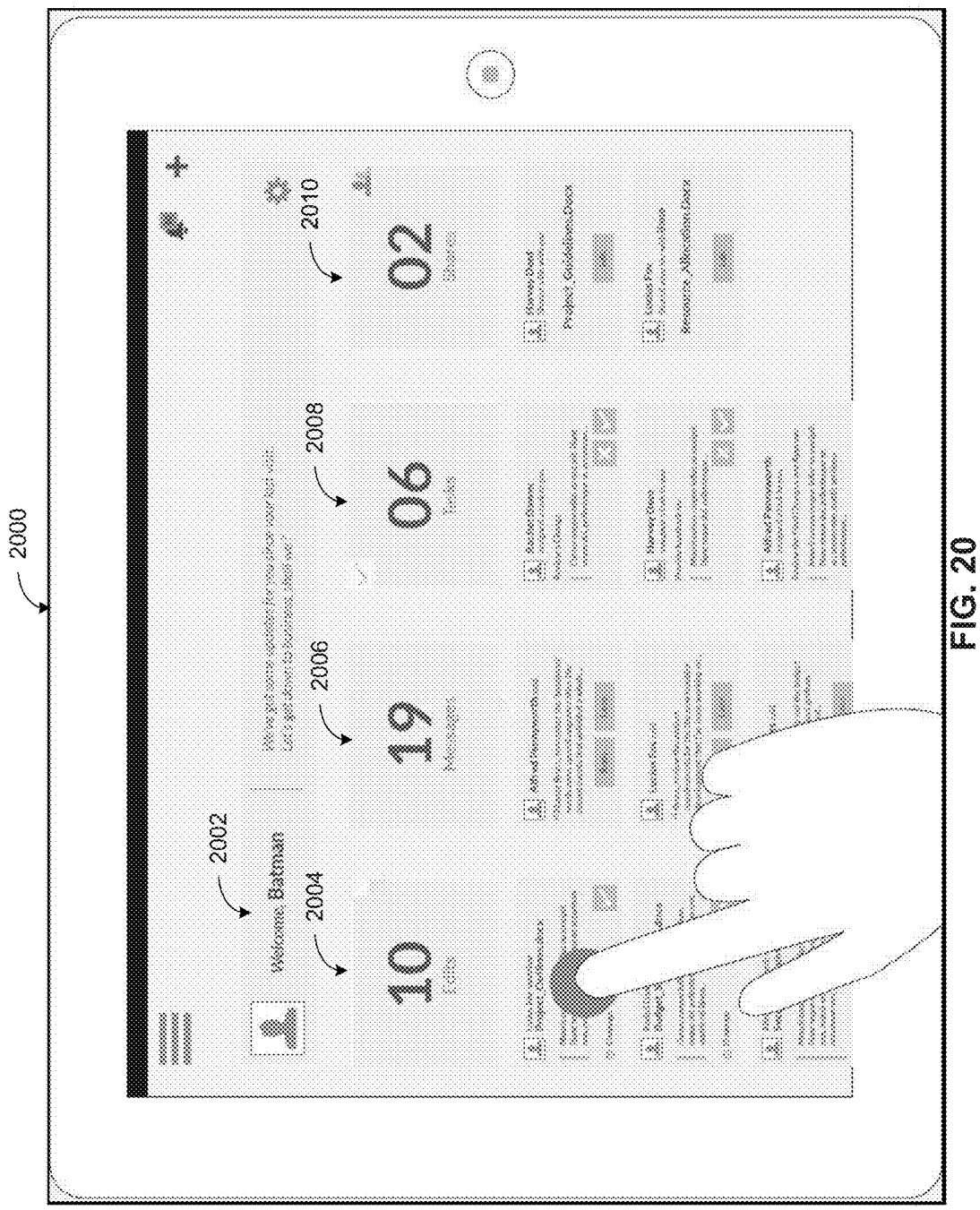
FIG. 20 is a screenshot of an example dashboard interface in accordance with various embodiments.

FIG. 20 is a screenshot of an example dashboard interface 2000 in accordance with various embodiments. In accordance with some embodiments, the dashboard interface may be provided to a user in association with one or more workspaces that provide the dashboard with event information. As shown, the dashboard interface 2000 identifies the user 2002 currently accessing the dashboard. As described herein, one or more criteria may determine the events of relevance to presented through the dashboard interface 2000. Additionally, the one or more criteria utilized in determining the relevance of events may be based on the user currently access the dashboard.

In FIG. 20, the dashboard interface 2000 comprises columns that can present events gathered from one or more workspaces in connection with one or more data content objects associated with those workspaces. The dashboard interface 2000 presents a change column 2004, a message column 2006, a task and reminder column 2008, and a shared document column 2010. Those skilled in the art will appreciate that for some embodiments, the interface for a dashboard may include more or less columns of than those presented in FIG. 20, and of varying types.

The change column 2004 may be configured to collect and present events relating to changes that occurred in files (e.g., documents) relevant to the user accessing the dashboard interface 2000. Examples of threshold conditions that can determine relevance of files to the user can include: did the user recently create the data content object, did the user recently change the data content object; has the user commented on the data content object; has the user reviewed the content of the data content object; and has the user collaboratively worked with another user that has changed or otherwise accessed the data content object.

The message column 2006 may be configured to collect and present messages sent in association with files or workspaces relevant to the user accessing the dashboard interface 2000. For some embodiments, the messages present may include those sent through an internal messages system, or those sent through external communication means. Examples of external communications means can include e-mail, instant chat messaging, mobile text messaging, or messaging through a social network (e.g., Twitter®). An example of an internal messaging system can include one where messaging is facilitated by referencing a message with an identifier that uniquely identifies a user in the workspace and/or dashboard environment (e.g., using the @ symbol with a username) provided by the ASP system 104.

The task and reminder column 2008 may be configured to collect and present the user with tasks that have been assigned to the user through a workspace (or other type of space) provided by the ASP system 104. The task and reminder column 2008 may be further configured to collect and present the user with reminder relating to data content objects relevant to the user. According to some embodiments, any data content object accessible through a workspace can be associated with a task or a reminder, and such tasks and reminders can be presented through the task and reminder column 2008.

The shared document column 2010 may be configured to collect and present documents shared with the user. Additionally, the shared document column 2010 can present a variety of non-document data content objects shared amongst users. A data content object presented in the shared document column 2010 may include one directly shared between users, or one indirectly shared by way of the data content object's association to a workspace that is shared between users.

For some embodiments, each column may provide event cards from an order based on relevance (e.g., most relevant to least relevant). Additionally, each column may provide a count indicating the number of event cards that need to be addressed by the user (e.g., by way of a second action associated with an event card). By doing so, some embodiments can enable or encourage a user to be more productive by keeping the count close to or at zero. As described herein, as a secondary action, a user may dismiss, defer, delete or accept an event card presented in the dashboard. In some embodiments, the events presented in each of the columns of the dashboard can be filtered according to user preferences (e.g., categories) or user provided keywords.

Figure 21:
FIG. 21 provides screenshots of example event cards for an example dashboard in accordance with various embodiments.

FIG. 21 provides screenshots of example event cards 2100, 2102, 2104, and 2106 for an example dashboard in accordance with various embodiments. The event card 2100 presents an event regarding file "BUDGET-FY13.docx" being opened by user "Abel Cunningham." In addition to providing the time elapsed since the event, the event card 2100 permits a user reviewing the event to post a comment in association with the event.

The event card 2102 presents an event regarding "Abel Cunningham" sharing a file with four other users. In addition to providing the time elapsed since the event, the event card 2102 permits a user reviewing the event to post a comment in association with the event.

The event card 2104 presents an event regarding 4 users editing the "BUDGET-FY13.docx." The event card 2104 also indicates that it is the top event card on a stack of related event cards that have been collapsed (e.g., due space limitations on the dashboard or user preference). The stack of event card may be related based on their association to a common data content object (e.g., file). The event card 2104 may permit a user to expand some or all of the event cards (e.g., See All) in the stack of the event cards. The event card 2106 presents the stack of event cards when the event card 2104 is expanded.

Figure 22:
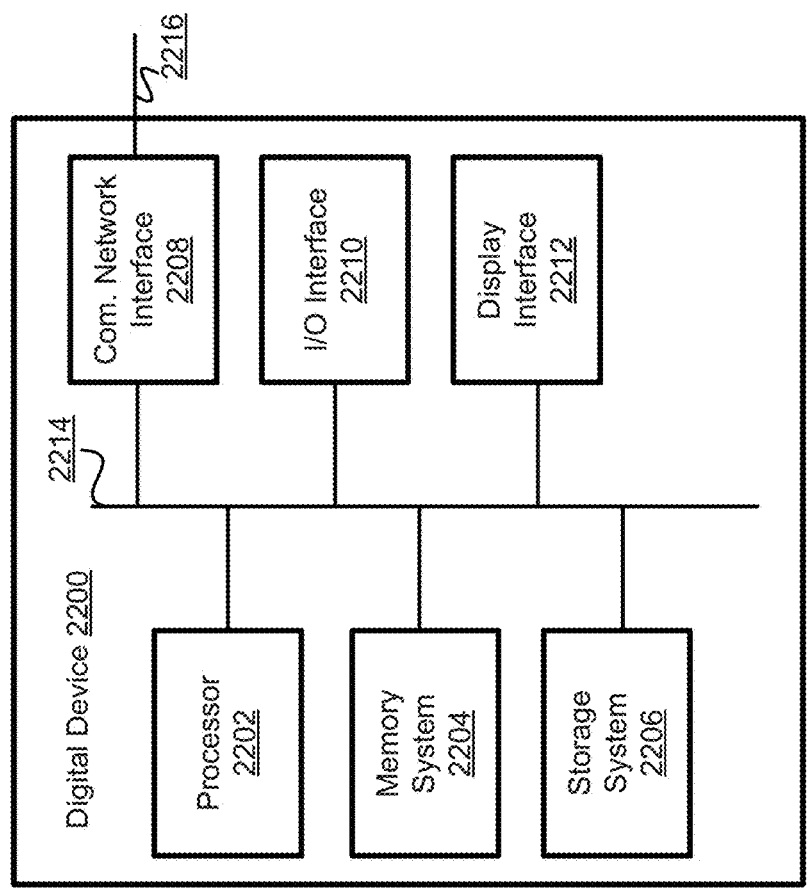
FIG. 22 is a block diagram illustrating an exemplary digital device that can be utilized in the implementation of various embodiments.

FIG. 22 is a block diagram of an exemplary digital device 2200. The digital device 2200 comprises a processor 2202, a memory system 2204, a storage system 2206, a communication network interface 2208, an I/O interface 2210, and a display interface 2212 communicatively coupled to a bus 2214. The processor 2202 is configured to execute executable instructions (e.g., programs). In some embodiments, the processor 2202 comprises circuitry or any processor capable of processing the executable instructions.

The memory system 2204 is any memory configured to store data. Some examples of the memory system 2204 are storage devices, such as RAM or ROM. The memory system 2204 can comprise the ram cache. In various embodiments, data is stored within the memory system 2204. The data within the memory system 2204 may be cleared or ultimately transferred to the storage system 2206.

The storage system 2206 is any storage configured to retrieve and store data. Some examples of the storage system 2206 are flash drives, hard drives, optical drives, and/or magnetic tape. In some embodiments, the digital device 2200 includes a memory system 2204 in the form of RAM and a storage system 2206 in the form of flash data. Both the memory system 2204 and the storage system 2206 comprise computer readable media which may store instructions or programs that are executable by a computer processor including the processor 2202.

The communication network interface (com. network interface) 2208 can be coupled to a network (e.g., network 324) via the link 2216. The communication network interface 2208 may support communication over an Ethernet connection, a serial connection, a parallel connection, or an ATA connection, for example. The communication network interface 2208 may also support wireless communication (e.g., 802.11 a/b/g/n, WiMax). It will be apparent to those skilled in the art that the communication network interface 2208 can support many wired and wireless standards.

The optional input/output (I/O) interface 2210 is any device that receives input from the user and output data. The optional display interface 2212 is any device that is configured to output graphics and data to a display. In one example, the display interface 2212 is a graphics adapter.

It will be appreciated by those skilled in the art that the hardware elements of the digital device 2200 are not limited to those depicted in FIG. 22. A digital device 2200 may comprise more or less hardware elements than those depicted. Further, hardware elements may share functionality and still be within various embodiments described herein. In one example, encoding and/or decoding may be performed by the processor 2202 and/or a co-processor located on a GPU (e.g., an NVIDIA® GPU).

As stated above, various embodiments monitor operations performed by users (actors or acting users) on one or more data content objects to determine whether the operations are relevant to other users (targets or target users) and whether the relevant operations meet certain notification threshold conditions for notifying the targets of the relevant operations. In some embodiments, the notification system obtains a notification threshold condition for a particular target and monitors the operations performed by actors on data content objects to determine relevance of each operation to the target and to determine whether one or more relevant operations meet the notification threshold condition. If so, the notification system notifies the target.

In some embodiments, operations on a data content object may include authoring actions such as reading, saving, deleting/erasing, editing, creating, publishing, unpublishing etc., social actions such as liking, sending/sharing, adding/removing, following/unfollowing, etc., organizational actions such as tagging, deferring, reminding, searching, trashing, etc., and/or workflow actions such as rejecting/declining/accepting/approving, assigning, reviewing/signing, commenting, resolving, @mentioning, taking/giving ownership, etc. Other operations on a data object are also possible.

The notification system evaluates scoring factors associated with each operation to generate a relevance score for a target. In some embodiments, the notification system may evaluate scoring factors for only certain types of operations, such as authoring operations involved in collaborative editing of a data content object (e.g., deleting, modifying, adding, etc.) and not organizational, social and/or workflow operations as described above. Scoring factors may include the identity of the data content object being interacted with, the actor performing the operation, the subsection/subpart of the data content object being interacted with, the number of operations with the data content object, the relationship between the actor and the target, the particular workflow to which the data content object belongs, the organization (enterprise) to which the data content object belongs, etc. Example subsections/subparts of a parent data content object may include a page, slide, sheet, paragraph, line, word, table, row, column, cell, header, footer, equation, formula, chart, shape, list, table of contents, link, synthetic content objects, and/or the like. The term "data content object" herein is used to include subsections/subparts of an parent data file. In other words, a data content object may be a table within a document, a slide within a presentation, a paragraph within a document, an image within a video, etc.

Figure 23:
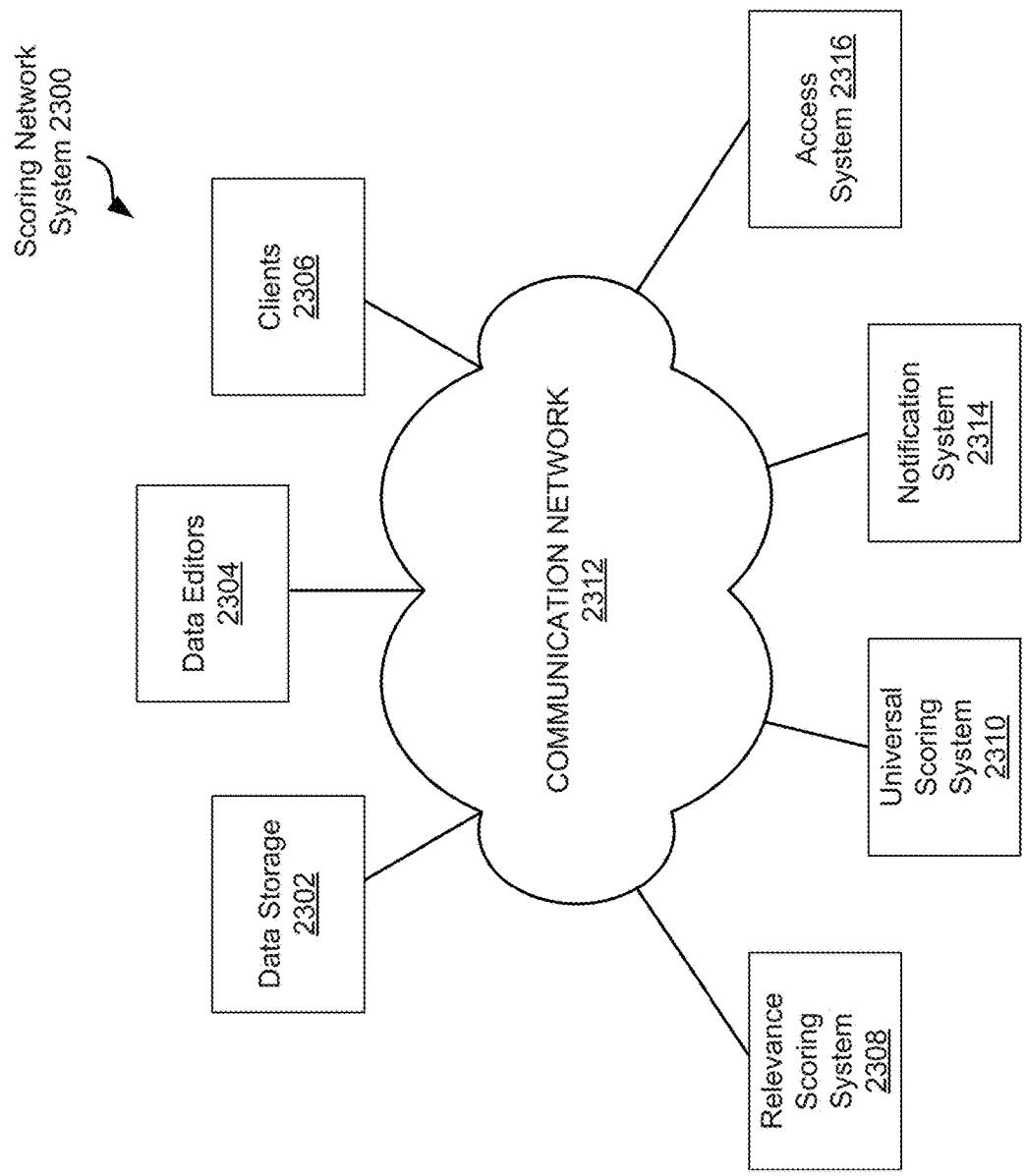
FIG. 23 is a block diagram showing an example network scoring system for supporting social productivity in accordance with various embodiments.

Various relevance scoring techniques may be used to determine whether one or more operations merit generating a notification for a target. FIGS. 24-29 below describe an example relevance scoring system capable of generating a relevance score that indicates the level of relevance of an operation to a target. FIGS. 30-34 below describe a universal scoring system capable of scoring persons (including actors), data content objects, and the edges (interactions/relationships) therebetween. An access system may generate a person/object graph capable of assisting with research, data analysis, etc. FIG. 23 below describe an example environment in which the example relevance scoring system, the universal scoring algorithm, the notification system, and the access system may operate.

FIG. 23 is a block diagram showing an example scoring network system 2300 for supporting social productivity in accordance with various embodiments. Scoring network system 2300 includes data storage 2302, data editors 2304, clients 2306, relevance scoring system 2308, universal scoring system 2310, notification system 2314, and access system 2316, each coupled to computer network 2312. Relevance scoring system 2308 and notification system 2314 may be a part of message notification module 218, workspace module 214, and/or dashboard module 216.

Data storage 2302 may include local storage (native to a client) and/or cloud-based storage (e.g., Dropbox, Box, or Google® Docs) capable of storing data content objects (e.g., documents, spreadsheets, presentations, images, videos, etc.). Data storage 2302 may include database server 106 and/or file server 108.

Data editors 2304 may include content management systems (text editors, video editors, image editors, spreadsheet editors, etc.) capable of interacting with data content objects. As noted above, operations of an actor may include authoring actions such as reading, saving, deleting/erasing, editing, creating, publishing, unpublishing etc., social actions such as liking, sending/sharing, adding/removing, following/unfollowing, etc., organizational actions such as tagging, deferring, reminding, searching, trashing, etc., and/or workflow actions such as rejecting/declining/accepting/approving, assigning, reviewing/signing, commenting, resolving, @mentioning, taking/giving ownership, etc. Example data editors 2304 may include native applications and/or cloud-based applications such as those supported by Google® Docs. Data editors 2304 interface with data storage 2302.

Clients 2306 may include any digital device, such as the digital device illustrated in FIG. 22, capable of cooperating with data editors 2304 and/or data storage 2302 to enable a user to operate on (interact with) data content objects.

Relevance scoring system 2308 includes hardware, software and/or firmware capable of generating a relevance score, e.g., to assist notification system 2314 with determining whether to notify a target of one or more operations of an actor on a data content object.

Universal scoring system 2310 includes hardware, software and/or firmware capable of generating importance scores of objects, persons and the edges therebetween, e.g., to assist access system 2316 with providing information to researchers, data analysts, etc.

Notification system 2314 includes hardware, software and/or firmware capable of evaluating the relevance scores generated by relevance scoring system 2308 against relevance threshold conditions to determine relevance values, e.g., binary values (relevant or not relevant) or range values (between 1 and 10). Notification system 2314 evaluates the operations and associated relevance values against notification threshold conditions to determine whether to notify a target of one or more operations. In some embodiments, notification system 2314 may be only interested in particular operation types, e.g., authoring operations associated with collaborative editing of a data content object.

Figure 31:
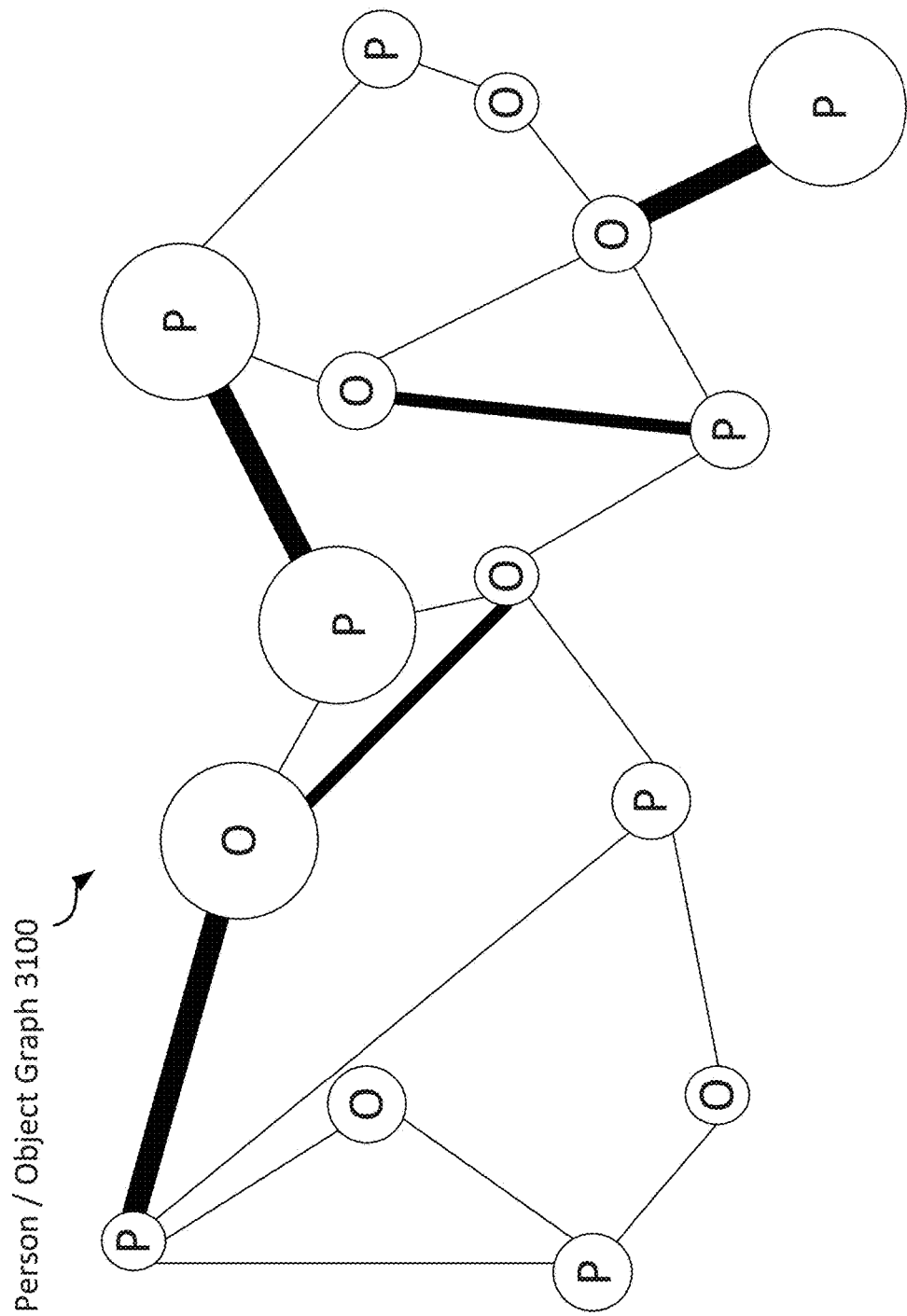
FIG. 31 shows an example person/object graph in accordance with various embodiments.

Access system 2316 includes hardware, software and/or firmware capable of presenting and navigating the importance scores of the data content objects, persons and the edges therebetween. FIG. 31 depicts an example a person/object graph generated by access system 2316. In some embodiments, access system 2316 will generate a person/object graph for a particular workspace, e.g., for only the data content objects and persons involved in a single activity, for a particular enterprise, e.g., for only the data content objects and persons belonging to the enterprise, etc. Access system 2316 may be used to assist a project manager to determine the most important person(s) involved in the project and the most important date content object(s) involved in the project. Access system 2316 may be used to assist an enterprise leader or consultant to determine the most important person(s) involved in the enterprise, the most important activities, and/or the most important data content object(s) involved in the enterprise.

Figure 24:
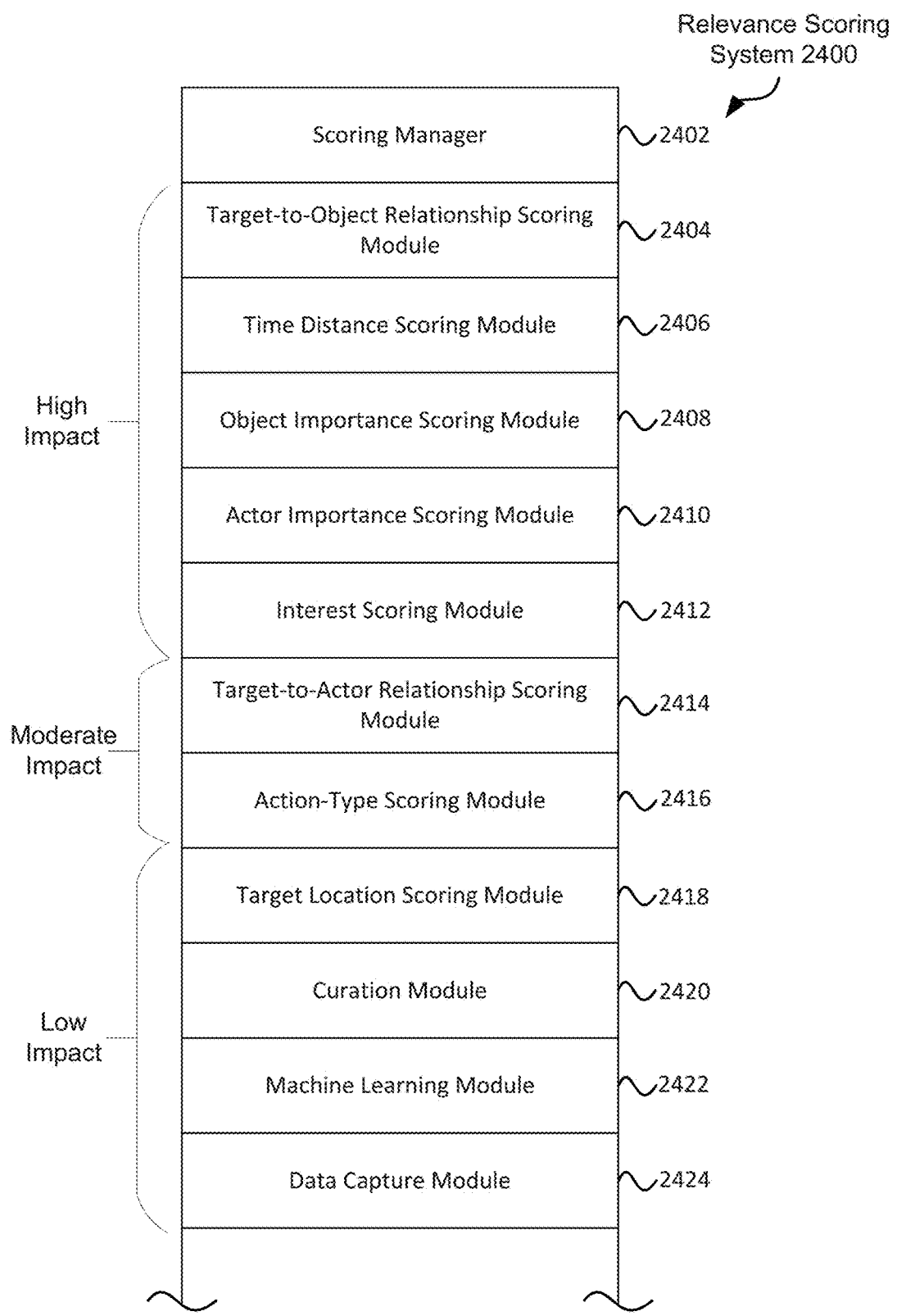
FIG. 24 is a block diagram showing an example relevance scoring system in accordance with various embodiments.

FIG. 24 is a block diagram showing example relevance scoring system 2400 in accordance with various embodiments. Relevance scoring system 2400 includes scoring manager 2402, target-to-object relationship scoring module 2404, time distance scoring module 2406, object importance scoring module 2408, actor importance scoring module 2410, interest scoring module 2412, target-to-actor relationship scoring module 2414, action-type scoring module 2416, target location scoring module 2418, curation module 2420, machine learning module 2422, and data capture module 2424.

Scoring manager 2402 includes hardware, software and/or firmware capable of interacting with each of the other modules to assist in generating the relevance score. Scoring manager 2402 may apply weights to each of the scores from each of the other scoring modules to generate the relevance score. For example, scoring manager 2402 may apply high impact weights to the scores generated by target-to-object relationship scoring module 2404, time distance scoring module 2406, object importance scoring module 2408, and interest scoring module 2412. Scoring manager 2402 may apply moderate impact weights to the scores generated by target-to-actor relationship scoring module 2414, actor importance scoring module 2418, and action-type scoring module 2416. Scoring manager 2402 may apply low impact weights to the score generated by target location scoring module 2418. It will be appreciated that the weights may be modified by curation module 2420 and/or by machine learning module 2422. It will be appreciated that scoring manager 2402 may be configured, curated and/or learn to increase and/or decrease the weights of certain scores. In some cases, scoring manager 2402 may be configured, curated and/or learn to ignore certain scores, such as the target location score. In some embodiments, scoring manager 2402 may be configured, curated and/or learn to add other scoring factors and/or modify (including remove) existing scoring factors to assist in the generation of a more accurate relevance score.

Target-to-object relationship scoring module 2404 includes hardware, software and/or firmware capable of generating a target-to-object (T_O) score based on the relationship between the target and the data content object being interacted with. Various scoring factors can be used to generate the T_O score, such as the number of times and/or frequency the target has operated on the data content object, the recency since the target has operated on the data content object, the amount of time the target has spent operating on the data content object, whether the target created the data content object, the importance of the data content object, the size of the data content object, etc. In some embodiments, target-to-object relationship scoring module 2404 cooperates with time distance scoring module 2406, object importance scoring module 2408, and/or actor importance module 2412. FIG. 26 shows example T_O scoring in accordance with various embodiments.

Time distance scoring module 2406 includes hardware, software and/or firmware capable of generating a time distance (T_D) score. Various scoring factors can be used to generate the T_D score, such as the amount of time that passed since the target last interacted with the data content object (such as the particular subsection/subpart of the integral whole data file), with a parent object of the data content object, with any data content object belonging to the same workspace as the data content object, with any user sharing the data content object, with any user belonging to the same workspace, and/or the like.

Object importance scoring module 2408 includes hardware, software and/or firmware capable of generating an object importance (O_I) score. Various scoring factors can be used to generate the O_I score, such as the number of people that share the data content object, the number of interactions with and/or the frequency of operations occurring on the data content object, the average/median/total score of the actors operating on the data content object, the time since the last interaction with the data content object, the total time all actors have spent on the data content object, the total time all actors have spent on the data content object in a set time period (e.g., week, month, etc.), the total time all actors with a high importance score operated on the data content object, etc. Notably, the O_I score may be associated with a subsection/subpart of a whole data file. That is, different sections of the whole data file may have different O_I scores.

Actor importance scoring module 2410 includes hardware, software and/or firmware capable of generating an actor importance (A_I) score. Various scoring factors can be used to generate the A_I score, such as the total number of other users that the actor knows, the position the actor holds in an enterprise, the number of data content objects that is shared with the actor, the number or frequency of operations that the actor takes, the time since the last operation by the actor on the data content object, the time since the last operation by the actor on any data content object within the same workspace as the data content object, the number of data content objects the actor has created, the number of data content objects that the actor has created within the workspace, the number of data content objects that the actor has created within the enterprise, and/or the like.

Interest scoring module 2412 includes hardware, software and/or firmware capable of generating an interest (I) score. Various scoring factors can be used to evaluate the I score, including categorical likes/dislikes, workspace likes/dislikes, action-type likes/dislikes, etc. Interest scoring module 2412 may obtain a schedule and/or hierarchy of the target's likes/dislikes, and use the schedule and/or hierarchy to generate the I score.

Target-to-actor relationship scoring module 2414 includes hardware, software and/or firmware capable of generating a target-to-actor (T_A) score. Various scoring factors can be used to generate the T_A score, such as the level of contact between the target and the actor, the business relationship between the target and the actor, the number of data content objects that the target and the actor share, the number of data content objects that the target and actor share within the workspace to which the data content object belongs, the number of contacts or frequency of contact that the target and actor have with each other, the number of degrees of separation between the target and the actor, the importance of the actor, the number of important data content objects (see object importance) that the actor shares, the number of important data content objects that the actor operated on during a set time period, and/or the like. In various embodiments, target-to-actor relationship scoring module 2414 cooperates with time distance scoring module 2406, object importance scoring module 2408, and/or actor importance scoring module 2410. FIG. 27 shows example target-to-actor relationship scoring in accordance with various embodiments.

Figure 28:
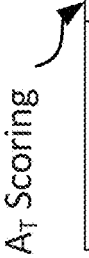
FIG. 28 is a table showing example action-type scoring in accordance with various embodiments.

Action-type scoring module 2416 includes hardware, software and/or firmware capable of generating an action-type (A_T) score. Various scoring factors can be used to generate the A_T score, such as an action identifier, the action type, and/or the like. For example, action-type scoring module 2416 may use a prioritization schedule to generate the A_T score. Action-type scoring module 2416 may generate the A_T score based on whether the action-type is an authoring actions (such as reading, saving, deleting/erasing, editing, creating, publishing, unpublishing, etc.), a social action (such as liking, sending/sharing, adding/removing, following/unfollowing, etc.), an organizational action (such as tagging, deferring, reminding, searching, trashing, etc.) and/or a workflow action (such as rejecting/declining/accepting/approving, assigning, reviewing/signing, commenting, resolving, @mentioning, taking/giving ownership, etc.). In some embodiments, action-type scoring module 2416 may value authoring actions more highly. In some embodiments, action-type module 2416 may care only about authoring-type actions, and may score the authoring-type actions based on the authoring action type. FIG. 28 shows example action-type scoring in accordance with various embodiments.

Target location scoring module 2418 includes hardware, software and/or firmware capable of generating a target location (T_L) score. Various scoring factors can be used to generate the T_L score, such as the distance from the subject matter being discussed in the data content object, the distance from the enterprise that generated the data content object, the distance between the actor and the target, etc.

Curation module 2420 includes hardware, software and/or firmware capable of enabling a user to curate various parts of the scoring algorithm, e.g., to modify weights (impact) of the various scores from the various modules, add additional scoring factors to the scoring algorithm, modify (including delete) existing scoring factors in the scoring algorithm, etc. Curation module 2420 may also be capable of enabling the user to provide feedback regarding the notifications being received. In some embodiments, curation module 2420 may request the user to indicate binary feedback, e.g., relevant or not relevant. In some embodiments, curation module 2420 may request the user to indicate range feedback, e.g., a relevance score between 1 and 10.

Machine learning module 2422 includes hardware, software and/or firmware capable of automatically modifying the scoring algorithm based on feedback and/or user behavior. In some embodiments, as the target receives notifications, the target may provide feedback through curation module 2420. In some embodiments, as the target receives notifications, the target may make various choices, e.g., the target may navigate to the section associated with the operation, read the notification before filing it, read the notification before deleting it, delete the notification without reading it, etc. Machine learning module 2422 may use the target's feedback and/or behavior to assist it in modifying weights of existing scoring factors, identifying new scoring factors to add to the relevance algorithm, modifying (including removing) existing scoring factors from the scoring algorithm, and/or the like.

Data capture module 2424 includes hardware, software and/or firmware capable of capturing (e.g., intercepting, retrieving, obtaining, requesting, etc.) the various scoring factors needed by the scoring modules, curation module 2420 and machine learning module 2422. Data capture module 2424 may capture scoring factors by monitoring at data storage 2302 operations on the various data content objects, monitoring at data editors 2304 operations on the various data content objects, monitoring at clients 2306 operations on the various data content objects, retrieving scoring factors from history buffers that store past/current operations occurring on the data content objects, retrieving scoring factors from data storage 2302, retrieving scoring factors from data editors 2304, retrieving scoring factors from search engines, retrieving scoring factors from enterprise systems, requesting scoring factors from the users, retrieving scoring factors from user devices, retrieving scoring factors from social networks, retrieving scoring factors from telephone carrier networks, etc. Additional details of data capture module 2424 are described below with reference to FIG. 25.

In some embodiments, scoring manager 2402 generates the relevance score according to the following formula: Relevance Score=f {H(T_O+T_D+I)+M(T_A+A_T)+L(T_L)}, where H is a high impact weight, M is a moderate impact weight and L is a low impact weight.

Figure 25:
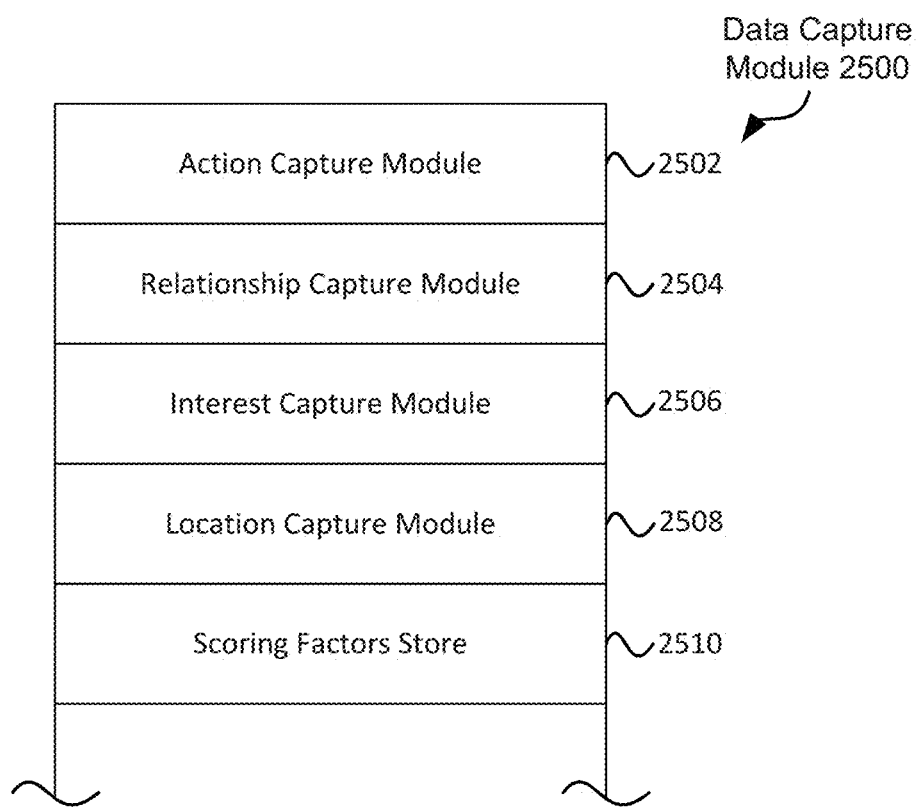
FIG. 25 is a block diagram showing an example data capture module in accordance with various embodiments.

FIG. 25 is a block diagram showing example data capture module 2424 in accordance with various embodiments. Data capture module 2424 includes action capture module 2502, relationship capture module 2504, interest capture module 2506, and/or location capture module 2508.

Action capture module 2502 includes hardware, software and/or firmware capable of monitoring at data storage 2302, at data editors 2304 and/or at client 2306 operations on the various data objects; retrieving scoring factors from history buffers storing the operations occurring on the data content objects; retrieving scoring factors from data storage 2302; and/or retrieving scoring factors from data editors 2304. Example scoring factors that action capture module 2502 may capture include how many data content objects are shared between an actor and a target, the number of operations and/or frequency of operations that an actor and/or target has operated on a data content object, the time distances, creator information associated with data content objects, and/or the like.

Relationship capture module 2504 includes hardware, software and/or firmware capable monitoring at data storage 2302, at data editors 2304 and/or at client 2306 operations on the various data objects; retrieving scoring factors from history buffers storing the operations occurring on the data content objects; retrieving information from search engines, enterprise systems, and/or social networks; monitoring user activities at clients 2306; and/or requesting information from the users, etc. Example scoring factors that relationship capture module 2506 may capture include the number of users an actor knows, the number of important persons that a user knows, the position a person holds in an enterprise, the level of contact between an actor and a target, the number of shared contacts an actor and a target have, the degrees of separation between an actor and a target, and/or the like.

Interest capture module 2506 includes hardware, software and/or firmware capable of monitoring at data storage 2302, at data editors 2304 and/or at client 2306 operations on the various data objects; retrieving scoring factors from history buffers storing the operations occurring on the data content objects; retrieving information from search engines, enterprise systems, and/or social networks; monitoring user activities at clients 2306; and/or requesting information from the users. Example scoring factors that interest capture module 2506 may capture include a general likes and/or dislikes of a user.

Location capture module 2508 includes hardware, software and/or firmware capable of retrieving location information from user devices, enterprises, and/or telephone carrier networks; parsing data content objects and searching online maps for location information; and/or the like. Example scoring factors that location capture module 2508 may capture include the location of the target, the distance between the actor and the target, the distance between the target and the enterprise, etc.

Scoring factors store 2510 stores the scoring factors captured, possibly for a predetermined time or indefinitely to assist action capturing module 2502, relationship capture module 2504, interest capture module 2506, and/or location capture module 2508 with determining various scoring factors involving historical changes, statistical analysis, and/or the like.

FIG. 26 is a table showing example T_O scoring in accordance with various embodiments. As shown, per some various embodiments of the scoring algorithm, if the target has recently interacted with the object and the object has a high O_I score, then the T_O score may be in the high range. If the target has recently interacted with the object but the object has a low O_I score, then the T_O score may be in the medium high range. If the target created the object but has not interacted with the objected recently, then the T_O score may be middle range. If the target owns the object or its parent object (file, folder, account, and/or the like), then the T_O score may be in the low range. In some embodiments, the delineation of recency may be first set by a user using curation module 2420 and thereafter modified using machine learning module 2422.

FIG. 27 is a table showing example target-to-actor relationship scoring in accordance with various embodiments. As shown, per some various embodiments of the scoring algorithm, if the target and actor have regular direct contact, then the T_A score may be high. If the target and actor do not have regular direct contact, but the target and actor share many documents and/or contacts, then the T_A score may be middle range. If the target and actor do not have regular direct contact and do not share many documents and/or contacts, but they are connected even through several degrees of separation, then the T_A score may be low.

FIG. 28 is a table showing example action-type scoring in accordance with various embodiments. As shown, per some various embodiments of the scoring algorithm, the A_T score may be based on the action type. As shown, 12 different actions have been prioritized in the order of (1) remind, (2) assign/@mention, (3) reject/decline, (4) delete/erase, (5) accept/approve, (6) review/sign, (7) add, (8) defer, (9) comment, (10), read, (11) publish, (12) create. The prioritization order may reflect a corresponding T_A score, such that the higher the action-type is on the list, the higher it's A_T score is.

Figure 29:
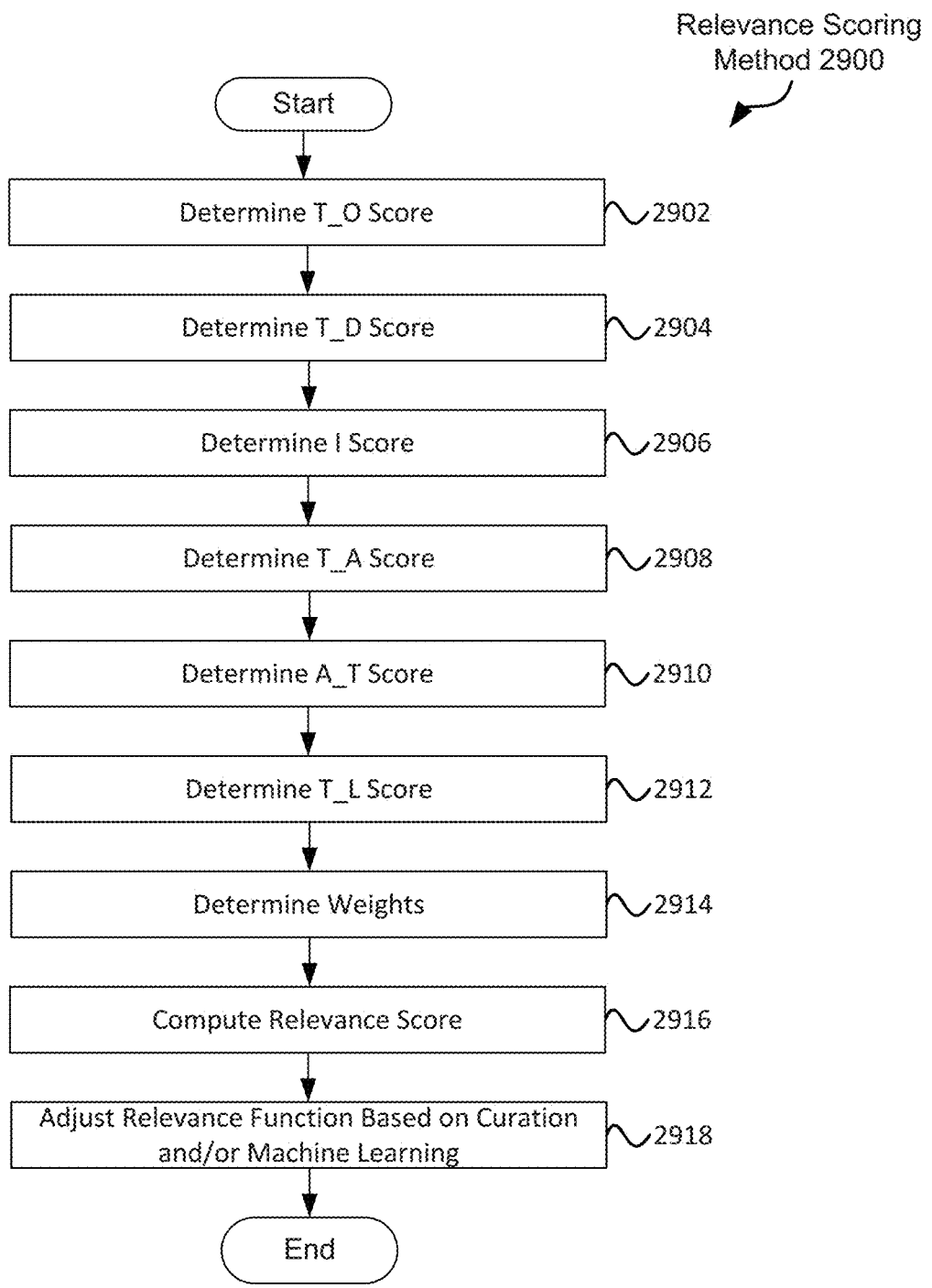
FIG. 29 is a flowchart showing an example relevance scoring method in accordance with various embodiments.

FIG. 29 is a flowchart showing example relevance scoring method 2900 in accordance with various embodiments. Relevance scoring method 2900 begins in step 2902 with target-to-object relationship scoring module 2904 determining the T_O score. Time distance scoring module 2406 in step 2904 determines the T_D score. Interest scoring module 2412 in step 2906 determines the I score. Target-to-actor relationship scoring module 2414 in step 2908 determines the T_A score. Action-type scoring module 2416 in step 2910 determines the A_T score. Target location scoring module 2418 in step 2912 determines the T_L score. Scoring manager 2402 in step 2914 determines the impact weights and in step 2916 computes the relevance score. In some embodiments, scoring manager 2402 applies the formula: Relevance Score=f {H(T_O+T_D+I)+M(T_A+A_T)+L (T_L)}, where H is a high impact weight, M is a moderate impact weight and L is a low impact weight. Curation module 2420 and machine learning module 2422 in step 2918 adjust the relevance function, e.g., the relevance factors and/or weights, based on feedback and/or user behavior. Method 2900 then ends.

Figure 30:
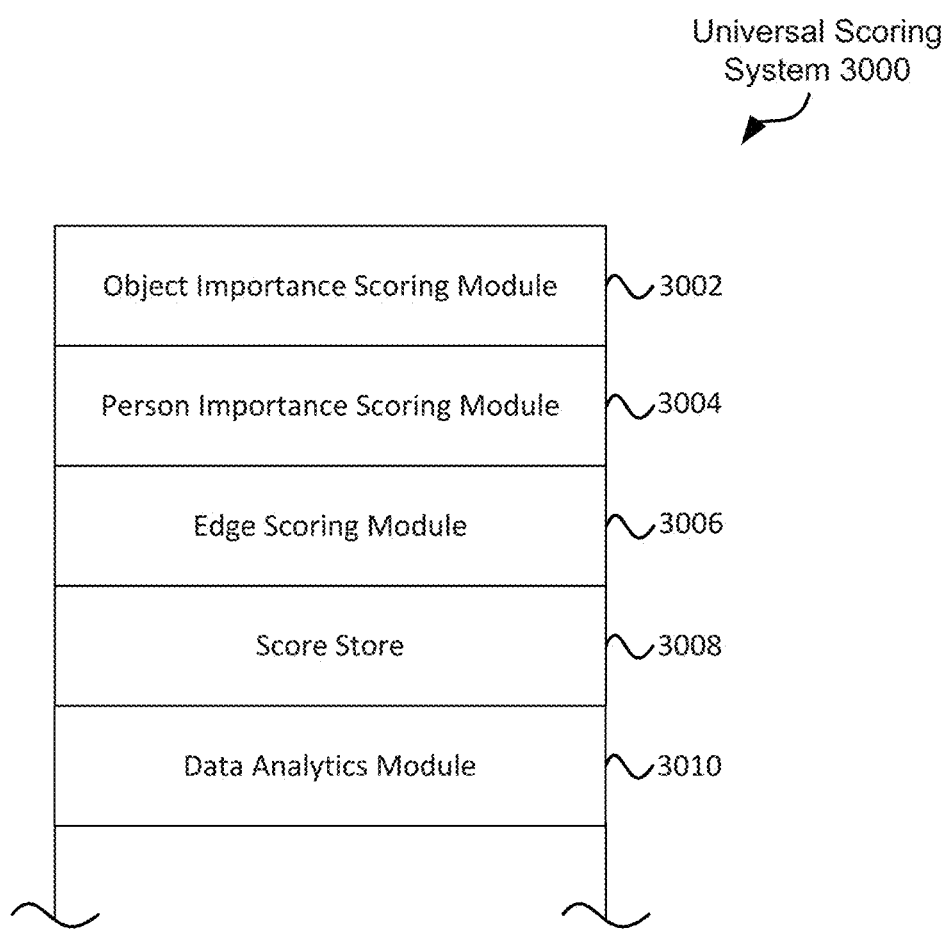
FIG. 30 is a block diagram showing an example universal scoring system in accordance with various embodiments.

FIG. 30 is a block diagram showing example universal scoring system 3000 in accordance with various embodiments. Universal scoring system 3000 includes object importance scoring module 3002, person importance scoring module 3004, edge scoring module 3006, score store 3008, and data analytics module 3010. In some embodiments, universal scoring system 3000 will generate the various scores for a particular workspace, for a particular enterprise, for a particular group of enterprises, etc. That way, the universal scoring system 3000 can assist a project leader, enterprise leader, consultant, etc. to identify the most important persons to a workspace or enterprise, most important data content objects to the workspace or enterprise, the most important projects to an enterprise, etc.

Object importance scoring module 3002 includes hardware, software and/or firmware capable of generating an object importance (O_I) score in accordance with various embodiments. Object importance scoring module 3002 may be the same or similar as the object importance scoring module 2408. Various scoring factors can be used to generate the O_I score, such as the number of people that share the data content object, the number of interactions with and/or the frequency of operations occurring on the data content object, the average/median/total score of the actors operating on the data content object, the time since the last interaction with the data content object, the total time all actors have spent on the data content object, the total time all actors have spent on the data content object in a set time period (e.g., week, month, etc.), the total time all actors with a high importance score operated on the data content object, etc. Notably, the O_I score may be for a subsection/subpart of a whole data file. That is, different sections of the whole data file may have different O_I scores.

Person importance scoring module 3004 includes hardware, software and/or firmware capable of generating an actor importance (P_I) score. Person importance scoring module 3004 may be the same or similar to actor importance scoring module 2410 (although not based on a particular operation currently being performed by an actor). Various scoring factors can be used to generate the P_I score, such as the total number of other users that the actor knows, the position the actor holds in an enterprise, the number of data content objects that is shared with the actor, the number or frequency of operations that the actor takes, the time since the last operation by the actor on the data content object, the time since the last operation by the actor on any data content object within the same workspace as the data content object, the number of data content objects the actor has created, the number of data content objects that the actor has created within the workspace, the number of data content objects that the actor has created within the enterprise, and/or the like.

Edge scoring module 3006 includes hardware, software and/or firmware capable of generating an edge (E) score. Various scoring factors can be used to generate the E score, such as the number or frequency of operations occurring therebetween (e.g., between a person and an data content object, between two persons, and/or between two data content objects), the number or frequency of operations occurring therebetween during a set time period, the average/median/total score of the actions therebetween, the time since the last action therebetween, person/object locations, interest therebetween, etc.

Score store 3008 stores the scores generated by object importance scoring module 3002, person importance scoring module 3004, and edge scoring module 3006.

Data analytics module 3010 includes hardware, software and/or firmware capable of analyzing the scores, e.g., to generate the person/object graph of FIG. 31, to help identify most important persons, most important objects, most important relationships therebetween, etc.

FIG. 31 shows example person/object graph 3100 in accordance with various embodiments. As shown, the size of each object representation depends on the data content object's importance score, which as discussed below may be based on such scoring factors as the number of people that share the data content object, the number of interactions with and/or the frequency of operations occurring on the data content object, the average/median/total score of the actors operating on the data content object, the time since the last interaction with the data content object, the total time all actors have spent on the data content object, the total time all actors have spent on the data content object in a set time period, etc. The size of each person representation depends on the person's importance score, which as discussed below may be based on such scoring factors as the total number of other users that the actor knows, the position the actor holds in an enterprise, the number of data content objects that is shared with the actor, the number or frequency of operations that the actor takes, the time since the last operation by the actor on any data content object, the number of data content objects the actor has created, and/or the like. An edge represents that at least one operation exists between a person and a data content object, between two persons, and/or between two data content objects. The size of each edge representation may be based on an edge score therebetween. The edge score may be based on such factors as the number or frequency of operations occurring therebetween, the number or frequency of operations occurring therebetween during a set time period, the average/median/total score of the actions therebetween, the time since the last action therebetween, person/object locations, interest therebetween, etc.

Figure 32:
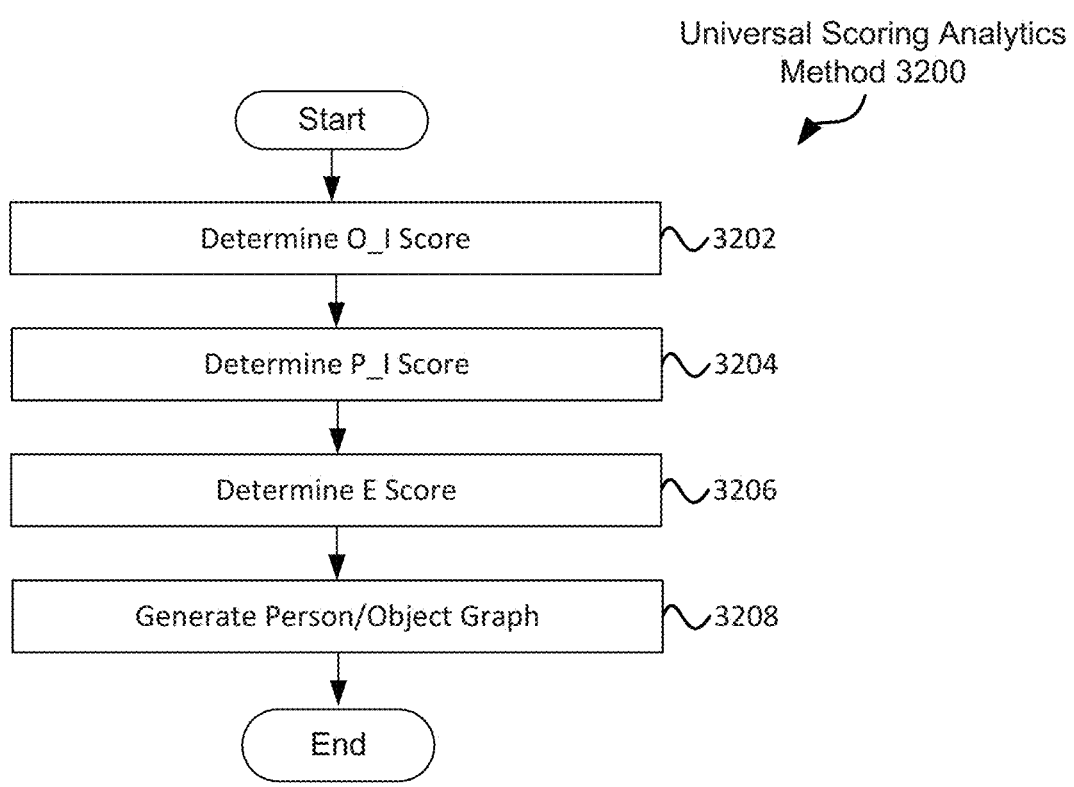
FIG. 32 is flowchart showing a universal scoring analytics method in accordance with various embodiments.

FIG. 32 is flowchart showing universal scoring analytics method 3200 according to some embodiments. Method 3200 begins in step 3202 with object importance scoring module 3002 determining the O_I score. Person importance scoring module 3004 in step 3204 generates the P_I score. Edge scoring module 3006 in step 3206 generates the E score. Data analytics module 3010 or access system 2316 in step 3208 generates person/object graph 3100. Method 3200 then ends.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the invention(s) presented herein. These and other variations upon the exemplary embodiments are intended to be covered by the present invention(s).

The invention claimed is:

1. A system comprising:
a workspace associated with one or more data content objects and at least two users, the one or more data content objects being stored in data storage, the workspace enabling one or more acting users of the at least two users to use one or more data editors to perform one or more operations on the one or more data content objects;

a data capture module configured to capture scoring factors associated with one or more operations performed by the one or more acting users on the one or more data content objects, the scoring factors including a number of times a target user has previously performed operations on the one or more data content objects and types of interactions between the target user and the one or more acting users, the target user being possibly interested in receiving a notification about the one or more operations performed by the one or more acting users;

a relevance scoring module configured to evaluate the scoring factors associated with the one or more operations performed by the one or more acting users to generate a relevance score associated with the target user and associated with the one or more operations performed by the one or more acting users, where the relevance scoring module generates a relevance score based on a first weighted score and a second weighted score, the first weighted score generated by applying a first weighting factor to a first score representing the number of times a target user has previously performed operations on the one or more data content objects, the second weighted score generated by applying a second weighting factor to a second score generated representing the types of interactions between the target user and the one or more acting users, where the second weighting factor is different than the first weighting factor; and a notification module configured to provide a notification to the target user upon satisfaction of a notification threshold condition, satisfaction of the notification threshold condition being based on identification of one or more particular operations performed by the one or more acting users that satisfy one or more relevance threshold conditions, satisfaction of the one or more relevance threshold conditions being based on the relevance score associated with the one or more operations performed by the one or more acting users, the notification being about the one or more particular operations performed by the one or more acting users that satisfy the one or more relevance threshold conditions.

2. The system of claim 1, wherein the data storage includes cloud storage.

3. The system of claim 1, wherein the text editors include a cloud-based text editor.

4. The system of claim 1, wherein at least one of the one or more data content objects is a subsection of a whole file.

5. The system of claim 4, wherein the subsection is a table.

6. The system of claim 1, wherein the scoring factors further include at least one of an amount of time that passed since the target user performed operations on the one or more data content objects, a number of persons that share the one or more data content objects, information associated with an interest of the target user, a level of contact between the target user and the one or more acting users, an importance value of the one or more acting users, or type information associated with the one or more operations performed by the one or more acting users.

7. The system of claim 1, wherein the relevance scoring engine applies weights to each of the scoring factors.

8. The system of claim 7, further comprising a machine learning engine that monitors user feedback to modify the weights.

9. The system of claim 1, further comprising a machine learning engine that monitors user feedback to modify the scoring factors upon which the relevance score is generated.

10. The system of claim 1, wherein the data capture module cooperates with the data storage to capture the scoring factors.

11. The system of claim 1, wherein the data capture module cooperates with the text editors to capture the scoring factors.

12. The system of claim 1, wherein the data capture module cooperates with a history buffer that stores the scoring factors or information upon which the scoring factors may be generated.

13. A method comprising:
enabling one or more acting users associated with a workspace to use one or more data editors to perform one or more operations on one or more data content objects associated with the workspace, the one or more data content objects being stored in data storage;
capturing scoring factors associated with one or more operations performed by the one or more acting users on the one or more data content objects, the scoring factors including a number of times a target user has previously performed operations on the one or more data content objects and types of interactions between the target user and the one or more acting users, the target user being possibly interested in receiving a notification about the one or more operations performed by the one or more acting users;
evaluating the scoring factors associated with the one or more operations performed by the one or more acting users to generate a relevance score associated with the one or more operations performed by the one or more acting users, where the relevance score is generated based on a first weighted score and a second weighted score, the first weighted score generated by applying a first weighting factor to a first score representing the number of times a target user has previously performed operations on the one or more data content objects, the second weighted score generated by applying a second weighting factor to a second score generated representing the types of interactions between the target user and the one or more acting users, where the second weighting factor is different than the first weighting factor;
determining whether one or more particular operations performed by the one or more acting users that satisfy one or more relevance threshold conditions, satisfaction of the one or more relevance threshold conditions being based on the relevance score associated with the one or more operations performed by the one or more acting users;
determining whether a notification threshold condition has been satisfied based on the identification of one or more particular operations performed by the one or more acting users that satisfy one or more relevance threshold conditions; and
providing a notification to the target user upon satisfaction of the notification threshold condition, the notification being about the one or more particular operations performed by the one or more acting users that satisfy the one or more relevance threshold conditions.

14. The method of claim 13, wherein at least one of the one or more data content objects is a subsection of a whole file.

15. The method of claim 13, wherein the scoring factors further include at least one of an amount of time that passed since the target user performed operations on the one or more data content objects, a number of persons that share the one or more data content objects, information associated with an interest of the target user, a level of contact between the target user and the one or more acting users, an importance value of the one or more acting users, or type information associated with the one or more operations performed by the one or more acting users.

16. The method of claim 13, wherein the evaluating the scoring factors associated with the one or more operations performed by the one or more acting users to generate the relevance score includes applying weights to each of the scoring factors.

17. The method of claim 13, wherein the capturing scoring factors associated with one or more operations performed by the one or more acting users on the one or more data content objects includes cooperating with the data storage to capture the scoring factors.

18. The method of claim 13, wherein the capturing scoring factors associated with one or more operations performed by the one or more acting users on the one or more data content objects includes cooperating with the text editors to capture the scoring factors.

19. The system of claim 1, wherein the capturing scoring factors associated with one or more operations performed by the one or more acting users on the one or more data content objects includes cooperating with a history buffer that stores the scoring factors or information upon which the scoring factors may be generated.

20. A non-transitory computer-readable medium storing program code for causing a computer to perform the steps of:
enabling one or more acting users associated with a workspace to use one or more data editors to perform one or more operations on one or more data content objects associated with the workspace, the one or more data content objects being stored in data storage;
capturing scoring factors associated with one or more operations performed by the one or more acting users on the one or more data content objects, the scoring factors including a number of times a target user has previously performed operations on the one or more data content objects and types of interactions between the target user and the one or more acting users, the target user being possibly interested in receiving a notification about the one or more operations performed by the one or more acting users;
evaluating the scoring factors associated with the one or more operations performed by the one or more acting users to generate a relevance score associated with the one or more operations performed by the one or more acting users, where the relevance score is generated based on a first weighted score and a second weighted score, the first weighted score generated by applying a first weighting factor to a first score representing the number of times a target user has previously performed operations on the one or more data content objects, the second weighted score generated by applying a second weighting factor to a second score generated representing the types of interactions between the target user and the one or more acting users, where the second weighting factor is different than the first weighting factor;
determining whether one or more particular operations performed by the one or more acting users that satisfy one or more relevance threshold conditions, satisfaction of the one or more relevance threshold conditions being based on the relevance score associated with the one or more operations performed by the one or more acting users;

determining whether a notification threshold condition has been satisfied based on the identification of one or more particular operations performed by the one or more acting users that satisfy one or more relevance threshold conditions; and providing a notification to the target user upon satisfaction of the notification threshold condition, the notification being about the one or more particular operations performed by the one or more acting users that satisfy the one or more relevance threshold conditions.

\* \* \* \* \*